(12) United States Patent
Yang et al.

(10) Patent No.: US 11,868,558 B2
(45) Date of Patent: Jan. 9, 2024

(54) ELECTRONIC DEVICE AND A METHOD OF MANUFACTURING THE SAME

(71) Applicant: Samsung Display Co., Ltd., Yongin-Si (KR)

(72) Inventors: Sung-Jin Yang, Cheonan-si (KR); Hyunsik Park, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 38 days.

(21) Appl. No.: 17/750,455

(22) Filed: May 23, 2022

(65) Prior Publication Data

US 2022/0391066 A1    Dec. 8, 2022

(30) Foreign Application Priority Data

Jun. 7, 2021  (KR) .......................... 10-2021-0073214

(51) Int. Cl.
   *G06F 3/041*     (2006.01)
   *G06F 3/044*     (2006.01)

(52) U.S. Cl.
   CPC ........ *G06F 3/04164* (2019.05); *G06F 3/0445* (2019.05); *G06F 3/0446* (2019.05); *G06F 2203/04103* (2013.01); *G06F 2203/04111* (2013.01)

(58) Field of Classification Search
   CPC .. G06F 3/0445; G06F 3/0446; G06F 3/04164; G06F 2203/04103; G06F 2203/04111
   USPC ....................................................... 345/173
   See application file for complete search history.

(56) References Cited

U.S. PATENT DOCUMENTS

| | | | |
|---|---|---|---|
| 9,477,358 B2 | 10/2016 | Lee et al. | |
| 10,013,097 B2 | 7/2018 | Choung et al. | |
| 10,658,434 B2 | 5/2020 | Song et al. | |
| 2011/0057893 A1 | 3/2011 | Kim et al. | |
| 2016/0026293 A1* | 1/2016 | Kim ...................... | G06F 3/0446 345/173 |
| 2018/0175116 A1* | 6/2018 | Song ..................... | G06F 3/0412 |

FOREIGN PATENT DOCUMENTS

| | | |
|---|---|---|
| KR | 10-1082293 | 11/2011 |
| KR | 10-2018-0070218 | 6/2018 |
| KR | 10-2116483 | 5/2020 |
| KR | 10-2204110 | 1/2021 |

* cited by examiner

*Primary Examiner* — Mark Edwards
(74) *Attorney, Agent, or Firm* — F. Chau & Associates, LLC

(57) ABSTRACT

An electronic device including: a display panel; and an input sensor disposed on the display panel, wherein the input sensor is configured to sense an external input, the input sensor including: a first sensing electrode including a plurality of first mesh lines; and a second sensing electrode including a plurality of second mesh lines insulated from the first mesh lines and a bridge pattern overlapping the first mesh lines, and wherein the first mesh lines include a plurality of metal layers, the first mesh lines include a first portion overlapping the bridge pattern and a second portion that does not overlap the bridge pattern, wherein the first portion includes an outermost metal layer including a material different from a material of an outermost metal layer of the second portion, and wherein the outermost metal layers of the first and second portions are adjacent to a display surface of the electronic device.

25 Claims, 32 Drawing Sheets

< Mode 1 >

< Mode 2 >

< Mode 2 >

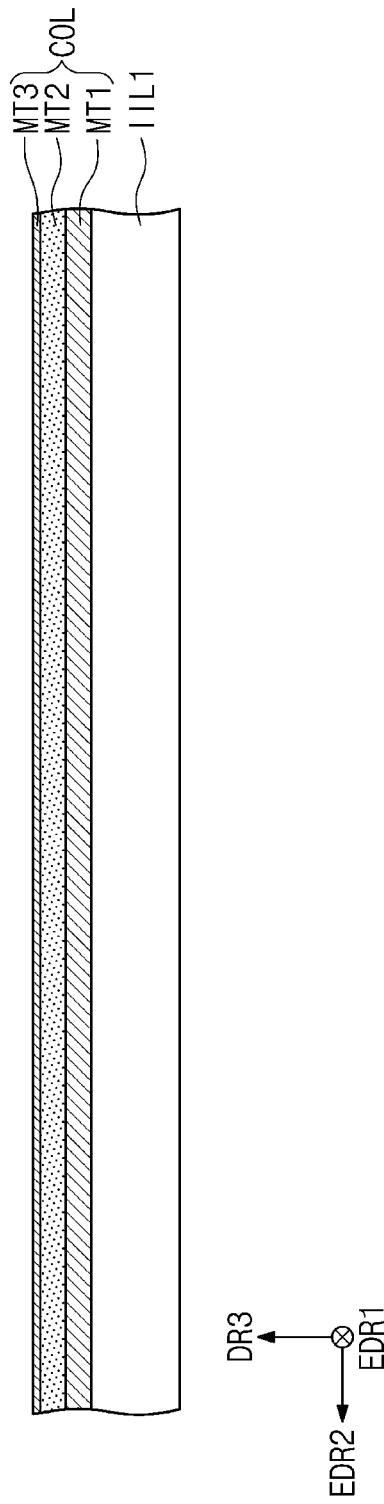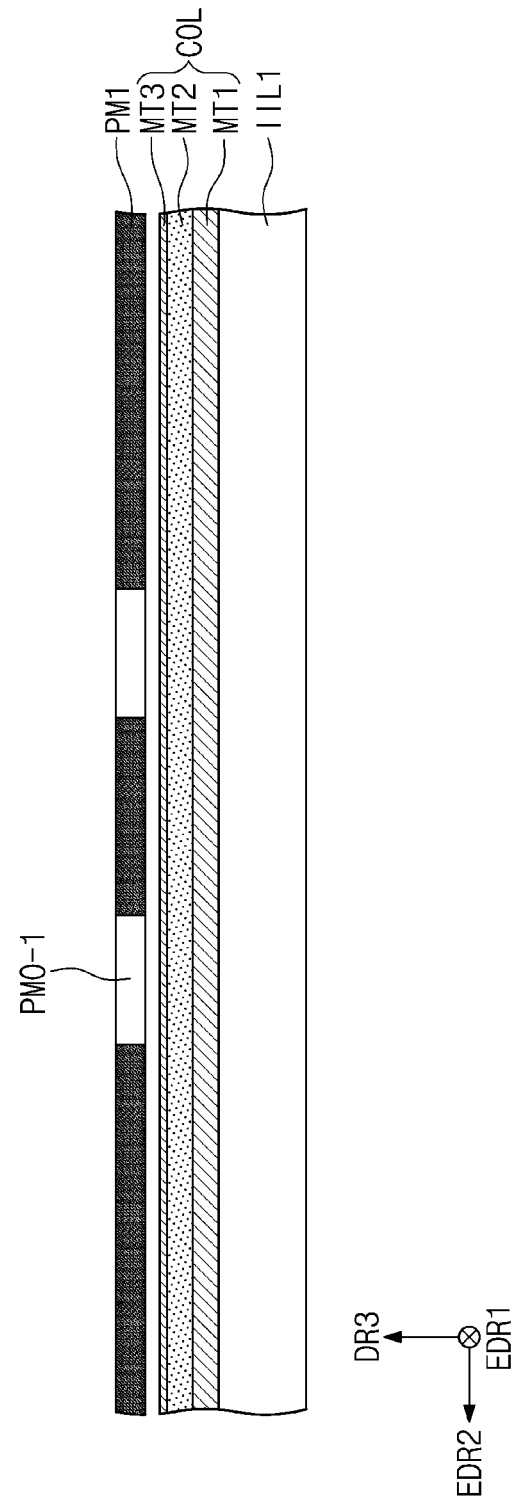

ELECTRONIC DEVICE AND A METHOD OF MANUFACTURING THE SAME

CROSS-REFERENCE TO RELATED APPLICATION

This U.S. non-provisional patent application claims priority under 35 U.S.C. § 119 to Korean Patent Application No. 10-2021-0073214, filed on Jun. 7, 2021, the disclosure of which is incorporated by reference herein in its entirety.

1. TECHNICAL FIELD

The present disclosure relates to an electronic device and a method of manufacturing the same. More particularly, the present disclosure relates to an electronic device including an input sensor and a method of manufacturing the electronic device.

2. DESCRIPTION OF THE RELATED ART

A display device is an output device for presentation of information in visual form. Various display devices are applied to multimedia electronic devices, such as televisions, mobile phones, tablet computers, navigation units, and game units. The electronic devices may include an input sensor that senses external inputs, thereby allowing users to easily and intuitively input information or commands.

The input sensor may sense a touch or pressure generated by a user's body. The input sensor may also sense touch input from an active pen.

SUMMARY

The present disclosure provides an electronic device with increased reliability by preventing a sensor disconnection.

The present disclosure provides a method of manufacturing the electronic device with increased reliability.

Embodiments of the present disclosure provide an electronic device including: a display panel; and an input sensor disposed on the display panel, wherein the input sensor is configured to sense an external input, the input sensor including: a first sensing electrode including a plurality of first mesh lines; and a second sensing electrode including a plurality of second mesh lines insulated from the first mesh lines and a bridge pattern overlapping the first mesh lines, and wherein the first mesh lines include a plurality of metal layers, the first mesh lines include a first portion overlapping the bridge pattern and a second portion that does not overlap the bridge pattern, wherein the first portion include an outermost metal layer including a material different from a material of an outermost metal layer of the second portion, and wherein the outermost metal layers of the first and second portions are adjacent to a display surface of the electronic device.

The first mesh lines include first, second, and third metal layers, the outermost metal layer of the first portion corresponds to the second metal layer, and the outermost metal layer of the second portion corresponds to the third metal layer.

The first metal layer includes a same material as a material of the third metal layer.

The second metal layer includes a material different from a material of the first and third metal layers.

The second metal layer includes gold, silver, copper, platinum, aluminum, or alloys thereof.

The third metal layer is thinner than the first metal layer and the second metal layer.

The first mesh lines are disposed on a same layer as the second mesh lines.

The input sensor further includes a first insulating layer and a second insulating layer, which are disposed between the first mesh lines and the bridge pattern, the first insulating layer includes a first hole overlapping the first portion, and the second insulating layer covers the first hole.

The second mesh lines include a first line and a second line, which overlap the bridge pattern, and the first line and the second line are spaced apart from each other with the first portion interposed therebetween.

The first insulating layer further includes a second hole overlapping the first line and a third hole overlapping the second line, and the second insulating layer further includes a first contact hole overlapping the second hole and a second contact hole overlapping the third hole.

The second insulating layer further includes a first contact hole and a second contact hole, and the first hole overlaps each of the first line and second line, and the first contact hole overlaps each of the first hole and the first line, and the second contact hole overlaps each of the first hole and the second line.

The second hole has a size equal to a size of the third hole.

The second hole has a size different from a size of the third hole.

The first contact hole is provided in plural, and the first contact holes overlap the second hole.

Each of the first contact hole and the second hole is provided in plural, and the first contact holes correspond to the second holes, respectively.

Embodiments of the present disclosure provide an electronic device including: a display panel; and an input sensor disposed on the display panel, wherein the input sensor is configured to sense an external input, the input sensor including: a first sensing electrode including a plurality of first mesh lines; a second sensing electrode including a plurality of second mesh lines insulated from the first mesh lines and a bridge pattern overlapping the first mesh lines; a first insulating layer disposed between the first sensing electrode and the bridge pattern and including a first hole; and a second insulating layer disposed between the first sensing electrode and the bridge pattern and including a first contact hole, and wherein the bridge pattern is connected to the second mesh lines via the first contact hole, and wherein the first hole overlaps the bridge pattern or the first mesh lines.

The first hole extends in a first direction and has a width greater than a width of the bridge pattern in the first direction.

The first mesh lines include first, second, and third metal layers, and the third metal layer does not overlap the first hole.

Embodiments of the present disclosure provide a method of manufacturing an electronic device including: forming a first conductive layer including first, second, and third metal layers on a display panel; patterning the first conductive layer to form first and second mesh lines; forming a first inorganic layer on the first and second mesh lines; forming a first hole through the first inorganic layer to expose a first portion of the first mesh lines and a second hole through the first inorganic layer to expose a second portion of the second mesh lines; removing the third metal layer of the first portion and the third metal layer of the second portion; forming a second inorganic layer on the first inorganic layer; forming a first contact hole through the second inorganic layer to expose the second portion; and forming a bridge pattern on the second inorganic layer to cover the first contact hole.

The third metal layer of the first portion and the third metal layer of the second portion are simultaneously removed in the forming of the first and second holes.

Embodiments of the present disclosure provide an input sensor including: a base layer; first sensing electrodes disposed on the base layer, second sensing electrodes crossing the first sensing electrodes; and a bridge pattern electrically connected to two of the second sensing electrodes, wherein at least one of the first sensing electrodes includes a first portion overlapped by the bridge pattern and including first and second metal layers, and a second portion not overlapped by the bridge pattern and including the first and second metal layers and a third metal layer.

The input sensor further includes an insulating layer disposed between the first portion and the bridge pattern.

The second sensing electrodes include the first and second metal layers, wherein the second metal layer of the second sensing electrodes contacts the bridge pattern.

The second sensing electrodes include the third metal layer and the third metal layer of the second sensing electrodes is overlapped by an insulating layer.

The second metal layer and the third metal layer include different materials from each other.

According to the above, the electrode of the input sensor is prevented from being corroded, damaged, and disconnected. In addition, hillocks are prevented from occurring in the second metal layer. Thus, the reliability of the input sensor is increased.

BRIEF DESCRIPTION OF THE DRAWINGS

The above and other features of the present disclosure will become readily apparent by reference to the following detailed description when considered in conjunction with the accompanying drawings wherein:

FIGS. 15A, 15B and 15C are cross-sectional views showing the manufacturing method of the electronic device according to an embodiment of the present disclosure;

DETAILED DESCRIPTION OF THE EMBODIMENTS

Figure 1:
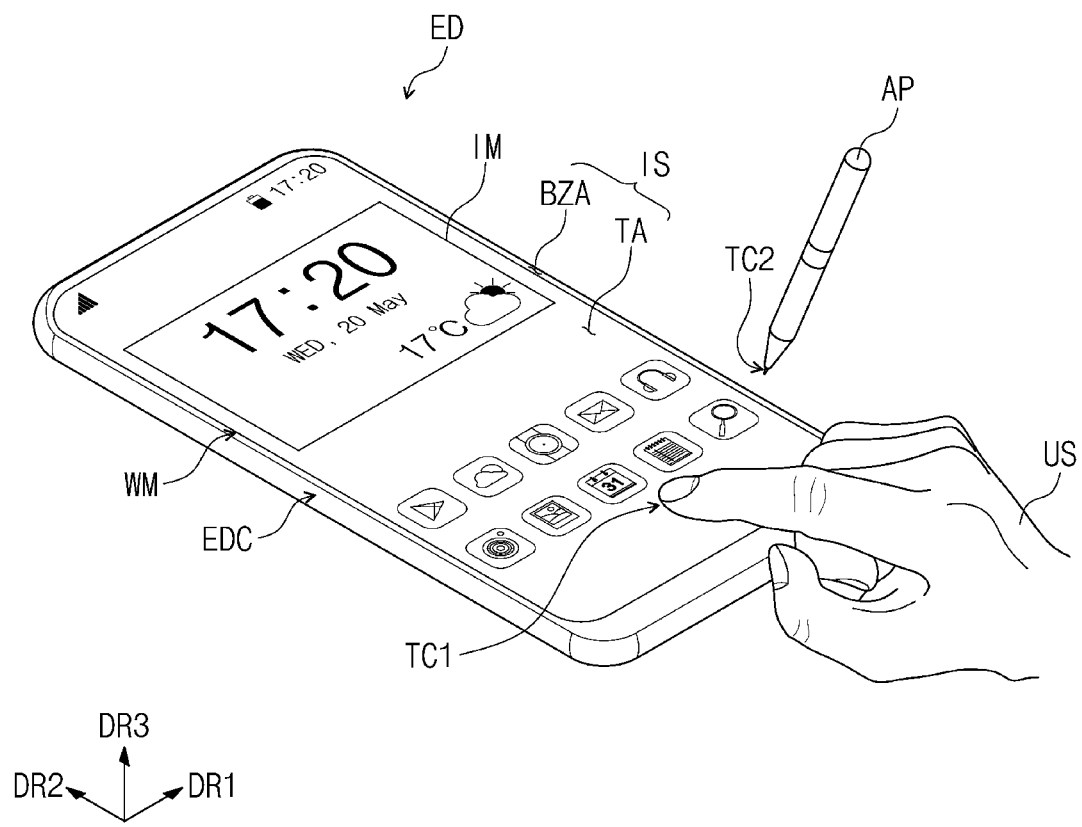
FIG. 1 is a perspective view showing an electronic device according to an embodiment of the present disclosure.

The present disclosure may be variously modified and realized in many different forms, and thus specific embodiments will be exemplified in the drawings and described in detail hereinbelow. However, the present disclosure should not be limited to the specific disclosed forms, and be construed to include all modifications, equivalents, or replacements included in the spirit and scope of the present disclosure.

In the present disclosure, it will be understood that when an element or layer is referred to as being "on", "connected to" or "coupled to" another element or layer, it can be directly on, connected or coupled to the other element or layer or intervening elements or layers may be present.

Like numerals may refer to like elements throughout. In the drawings, the thickness, ratio, and dimension of components may be exaggerated for effective description of the technical content. As used herein, the term "and/or" includes any and all combinations of one or more of the associated listed items.

It will be understood that, although the terms first, second, etc. may be used herein to describe various elements, these elements should not be limited by these terms. These terms are used to distinguish one element from another element. Thus, a first element discussed below could be termed a second element. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as shown in the figures.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described with reference to the accompanying drawings.

Figure 2:
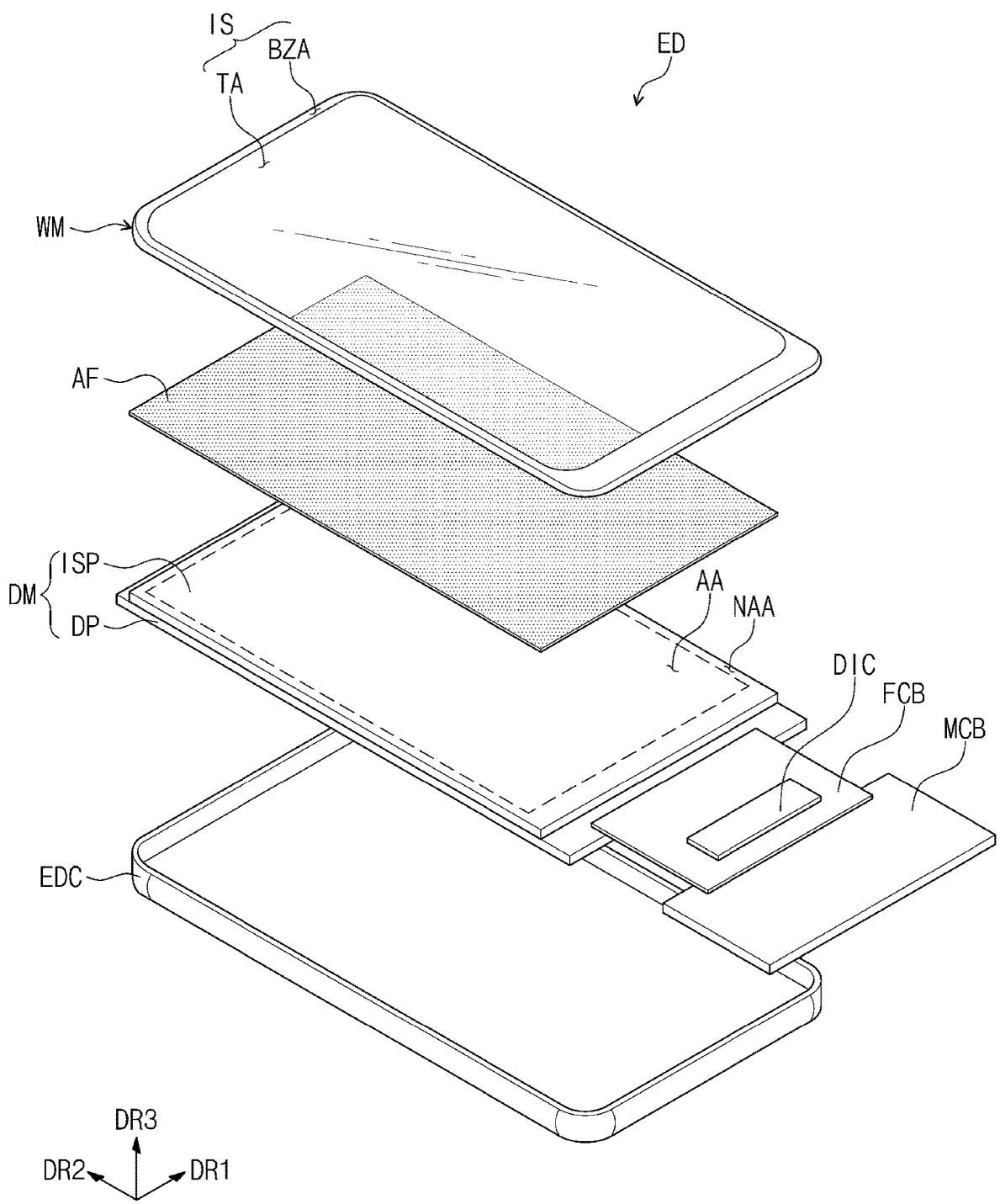
FIG. 2 is an exploded perspective view showing an electronic device according to an embodiment of the present disclosure.
Figure 3A:
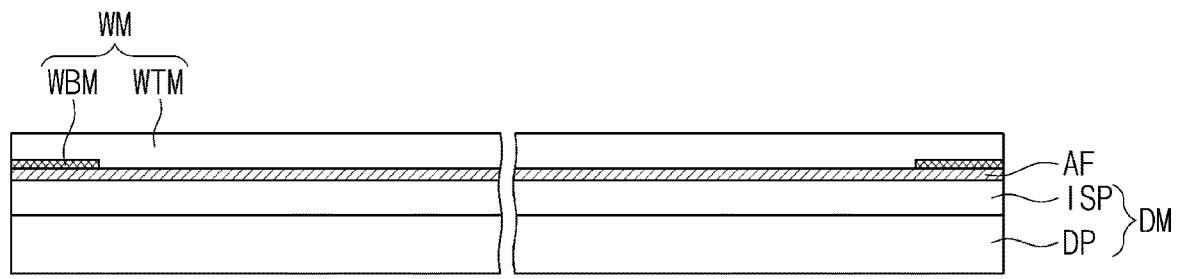
FIGS. 3A and 3B are cross-sectional views showing electronic devices according embodiments of the present disclosure.
Figure 3A:
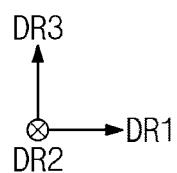
Figure 3B:
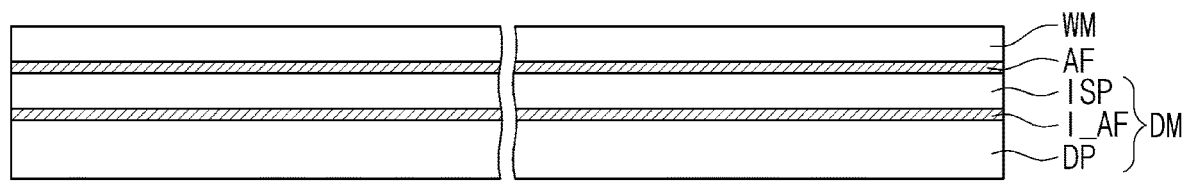
Figure 3B:
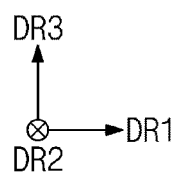

FIG. 1 is a perspective view showing an electronic device ED according to an embodiment of the present disclosure. FIG. 2 is an exploded perspective view showing the electronic device ED according to an embodiment of the present disclosure. FIGS. 3A and 3B are cross-sectional views showing electronic devices ED according to embodiments of the present disclosure.

The electronic device ED may be activated in response to electrical signals. The electronic device ED may be applied to various embodiments of the present disclosure. As an example, the electronic device ED may be applied to a large-sized electronic item, such as a television set, an outdoor billboard, etc., and a small and medium-sized electronic item, such as a mobile phone, a tablet computer, a car navigation unit, a game unit, etc., but it should not be limited thereto or thereby. The electronic device ED may also be applied to other electronic devices.

Referring to FIG. 1, the electronic device ED may display an image IM toward a third direction DR3 through a display surface IS that is substantially parallel to a plane formed by a first direction DR1 and a second direction DR2. The third direction DR3 may be substantially parallel to a normal line direction of the display surface IS. The display surface IS through which the image IM is displayed may correspond to a front surface of the electronic device ED. The image IM may include a still image as well as a video. FIG. 1 shows a clock widget and application icons as representative examples of the image IM.

In the present embodiment, front (or upper) and rear (or lower) surfaces of each member may be described with respect to a direction in which the image IM is displayed. The front and rear surfaces may be opposite to each other in the third direction DR3, and a normal line direction of each of the front and rear surfaces may be substantially parallel to the third direction DR3. A separation distance in the third direction DR3 between the front surface and the rear surface may correspond to a thickness of a member (or a unit) of the electronic device ED.

Directions indicated by the first, second, and third directions DR1, DR2, and DR3 are relative to each other and may be changed in other directions. Hereinafter, the directions indicated by the first, second, and third directions DR1, DR2, and DR3 may be assigned with the same reference numerals in the following descriptions.

FIG. 1 shows the electronic device ED including the flat display surface IS as a representative example. However, a shape of the display surface IS of the electronic device ED should not be limited thereto or thereby, and the display surface IS may have a curved or three-dimensional shape.

The electronic device ED may be rigid or flexible. The flexible electronic device ED may be a foldable electronic device or a bendable electronic device of which a portion thereof is bent.

The electronic device ED may sense an external input applied thereto from the outside. The external input includes various forms of inputs provided from the outside of the electronic device ED. According to an embodiment of the present disclosure, the electronic device ED may sense a first input TC1 of a user US applied thereto from the outside. The first input TC1 of the user US may be one of external inputs of various forms, such as light, heat, pressure, etc., or a combination thereof. As an example, the first input TC1 of the user US may be provided by a part of user's body.

In the present embodiment, the first input TC1 of the user US may be a touch input generated by a hand of the user US touching the front surface of the electronic device ED, however, this is just one example. The first input TC1 of the user US may include any or all inputs that cause a variation in capacitance and should not be particularly limited. The electronic device ED may sense the first input TC1 of the user US applied to a side or rear surface of the electronic device ED as well as the first input TC1 of the user US applied to the front surface of the electronic device ED depending on a structure of the electronic device ED.

In addition, the electronic device ED may sense a second input TC2 applied thereto from the outside. The second input TC2 may include inputs generated by an input device AP, e.g., a stylus pen, an active pen, a touch pen, an electronic pen, or the like, other than the hand of the user US. Hereinafter, the second input TC2 will be described as an input provided by the active pen.

The front surface of the electronic device ED may include a transmission area TA and a bezel area BZA. The transmission area TA may be an area through which the image IM is displayed. The user may view the image IM through the transmission area TA. In the present embodiment, the transmission area TA may have a quadrangular shape with rounded vertices, however, this is just one example. The transmission area TA may have a variety of shapes and should not be particularly limited.

The bezel area BZA may have a predetermined color. The bezel area BZA may be adjacent to the transmission area TA. The bezel area BZA may surround the transmission area TA. Accordingly, the transmission area TA may have a shape demarcated by the bezel area BZA. However, this is just one example, and the bezel area BZA may be disposed adjacent to only one side of the transmission area TA or may be omitted.

Referring to FIGS. 1 and 2, the electronic device ED may include a display module DM, a window WM, and a case EDC. The display module DM may include a display panel DP and an input sensor ISP.

The display panel DP according to an embodiment of the present disclosure may be a light-emitting type display panel, however, it should not be particularly limited. For instance, the display panel DP may be an organic light emitting display panel, an inorganic light emitting display panel, or a quantum dot light emitting display panel. A light emitting layer of the organic light emitting display panel may include an organic light emitting material. A light emitting layer of the inorganic light emitting display panel may include an inorganic light emitting material. A light emitting layer of the quantum dot light emitting display panel may include a quantum dot and/or a quantum rod. Hereinafter, the organic light emitting display panel will be described as a representative example of the display panel DP.

The input sensor ISP may sense the external input applied thereto from the outside of the electronic device ED. The input sensor ISP may obtain coordinate information of the external input, e.g., the first and second inputs TC1 and TC2. The input sensor ISP will be described in detail later.

The input sensor ISP may be disposed on the display panel DP. FIGS. 3A and 3B show various embodiments of the present disclosure according to a stack structure of components of the electronic device ED.

Referring to FIG. 3A, the input sensor ISP may be disposed directly on the display panel DP. In an embodiment of the present disclosure, a structure in which one layer, component, member, or the like is formed on another layer, component, member, or the like through successive processes without using a separate adhesive layer or adhesive member will be referred to as "being directly disposed". For example, the expression "the input sensor ISP is disposed directly on the display panel DP" means that the input sensor ISP is formed on a base surface of the display panel DP through successive processes without employing a separate adhesive layer after the display panel DP is formed.

Referring to FIG. 3B, an inner adhesive layer I_AF may be disposed between the input sensor ISP and the display panel DP. In this case, the input sensor ISP may not be formed on the display panel DP through the successive processes, and the input sensor ISP may be fixed to an upper surface of the display panel DP by the inner adhesive layer I_AF after being manufactured through a separate process.

The display module DM may display the image IM in response to electrical signals and may transmit/receive information about the external input. The display module DM may include an active area AA and a peripheral area NAA. The image IM may be displayed through the active area AA, and the external input may be sensed in the active area AA. The peripheral area NAA may be adjacent to the active area AA. The peripheral area NAA may surround the active area AA, however, this is just one example, and the peripheral area NAA may have a variety of shapes.

The active area AA and the peripheral area NAA may respectively correspond to the transmission area TA and the bezel area BZA described above. In the following descriptions, the expression "an area/portion corresponds to another area/portion" may mean that "an area/portion overlaps another area/portion", but the expression should not be limited to mean that "an area/portion has the same area and/or the same shape as another area/portion".

The display module DM may further include a main circuit board MCB, a flexible circuit film FCB, and a driving chip DIC. One or more of the main circuit board MCB, the flexible circuit film FCB, and the driving chip DIC may be omitted.

The main circuit board MCB may be connected to the flexible circuit film FCB and may be electrically connected to the display panel DP. The main circuit board MCB may include a plurality of driving elements. The driving elements may include a circuit part to drive the display panel DP. The main circuit board MCB may be electrically connected to other electronic modules of the electronic device ED through a connector.

The flexible circuit film FCB may be connected to the display panel DP to electrically connect the display panel DP to the main circuit board MCB. The driving chip DIC may be mounted on the flexible circuit film FCB. The flexible circuit film FCB may be bent to allow the main circuit board MCB connected to the flexible circuit film FCB to face a rear surface of the display panel DP. In other words, the flexibly circuit film FCB may be folded so that the main circuit board MCB is provided underneath the display panel DP. FIG. 2 shows one flexible circuit film FCB; however, the number of the flexible circuit films should not be limited thereto or thereby. According to an embodiment of the present disclosure, the flexible circuit film FCB may be provided in plural, and the flexible circuit films FCB may be connected to the display panel DP.

The driving chip DIC may include driving elements, e.g., a data driving circuit, to drive pixels of the display panel DP. FIG. 2 shows a structure in which the driving chip DIC is mounted on the flexible circuit film FCB, however, the present disclosure should not be limited thereto or thereby. For example, the driving chip DIC may be directly mounted on the display panel DP. In this case, a portion of the display panel DP may be bent, and the portion of the display panel DP on which the driving chip DIC is mounted may overlap the rear surface of the display panel DP. In other words, the portion of the display panel DP may be bent like the flexible circuit film FCB described above.

The input sensor ISP may be electrically connected to the main circuit board MCB through the flexible circuit film FCB, however, it should not be limited thereto or thereby. The display module DM may further include a separate flexible circuit film to electrically connect the input sensor ISP to the main circuit board MCB.

The window WM may be disposed on the display module DM. The window WM may transmit the images emitted from the display panel DP, and the user US may view the images through the window WM. The window WM may protect inner components of the electronic device ED from external impacts. As an example, the window WM may protect the display panel DP and the input sensor ISP, which are disposed under the window WM.

Referring to FIG. 3A, the window WM may include a base layer WTM and a light blocking pattern WBM. The window WM in FIG. 3B is schematically shown without distinguishing the base layer WTM from the light blocking pattern WBM.

The base layer WTM may include an optically transparent material. The base layer WTM may include at least one of a glass substrate and a synthetic resin film. The base layer WTM may have a single-layer or multi-layer structure. As an example, the base layer WTM having the multi-layer structure may include two or more synthetic resin films attached to each other by an adhesive.

The light blocking pattern WBM may be disposed on the base layer WTM to partially overlap the base layer WTM. The light blocking pattern WBM may be disposed on a rear surface of the base layer WTM. An area in which the light blocking pattern WBM is disposed may substantially correspond to the bezel area BZA of the electronic device ED. An area in which the light blocking pattern WBM is not disposed may correspond to the transmission area TA of the electronic device ED.

The light blocking pattern WBM may include a material with a predetermined color. As an example, the light blocking pattern WBM may include a colored organic layer. The light blocking pattern WBM may have a single-layer or multi-layer structure. The light blocking pattern WBM having the multi-layer structure may include a chromatic color layer and an achromatic color light blocking layer, particularly, a black light blocking layer. The light blocking pattern WBM may be formed through a depositing, printing, or coating process.

The window WM may further include a functional coating layer disposed on a front surface of the base layer WTM. The functional coating layer may include at least one of an anti-fingerprint layer, an anti-reflective layer, and a hard coating layer.

The window WM may be coupled to the display module DM by an adhesive layer AF. The adhesive layer AF may include a transparent adhesive, such as an optically clear adhesive (OCA) film, an optically clear resin (OCR), or a pressure sensitive adhesive (PSA) film, however, it should not be limited thereto or thereby. The adhesive layer AF may include an ordinary adhesive.

The electronic device ED may further include an anti-reflective layer disposed between the window WM and the display module DM. The anti-reflective layer may reduce a reflectance of an external light incident thereto from the above of the window WM.

According to an embodiment of the present disclosure, the anti-reflective layer may include at least one of a retarder and a polarizer. The retarder may be a film type or liquid crystal coating type and may include a $\lambda/2$ retarder and/or $\lambda/4$ retarder. The polarizer may be a film type or liquid crystal coating type. The film type polarizer may include a stretching type synthetic resin film, and the liquid crystal coating type polarizer may include liquid crystals aligned in a predetermined alignment. The retarder and the polarizer may be implemented as one polarizing film.

According to an embodiment of the present disclosure, the anti-reflective layer may include color filters. The color filters may be disposed directly on the input sensor ISP and the display panel DP. The color filters may be arranged by taking into account arrangements and emission colors of the pixels included in the display panel DP.

According to an embodiment of the present disclosure, the anti-reflective layer may include a destructive interference structure. For instance, the destructive interference structure may include a first reflection layer and a second reflection layer, which are disposed on different layers from each other. A first reflection light and a second reflection light, which are reflected by the first reflection layer and the second reflection layer, respectively, may be destructively interfered, and thus, the reflectance of the external light may be reduced.

The case EDC may be coupled to the window WM to form an appearance of the electronic device ED. The case EDC may protect the components accommodated in the case EDC. The case EDC may absorb impacts applied thereto from the outside and may prevent a foreign substance and moisture from entering the display module DM accommodated in the case EDC. The case EDC may be provided in a form obtained by coupling a plurality of accommodating members.

The electronic device ED may further include an electronic module including a variety of functional modules to drive the display module DM, a power supply module supplying a power required for an overall operation of the electronic device ED, and a bracket coupled to the display module DM and/or the case EDC to divide an inner space of the electronic device ED.

Figure 4:
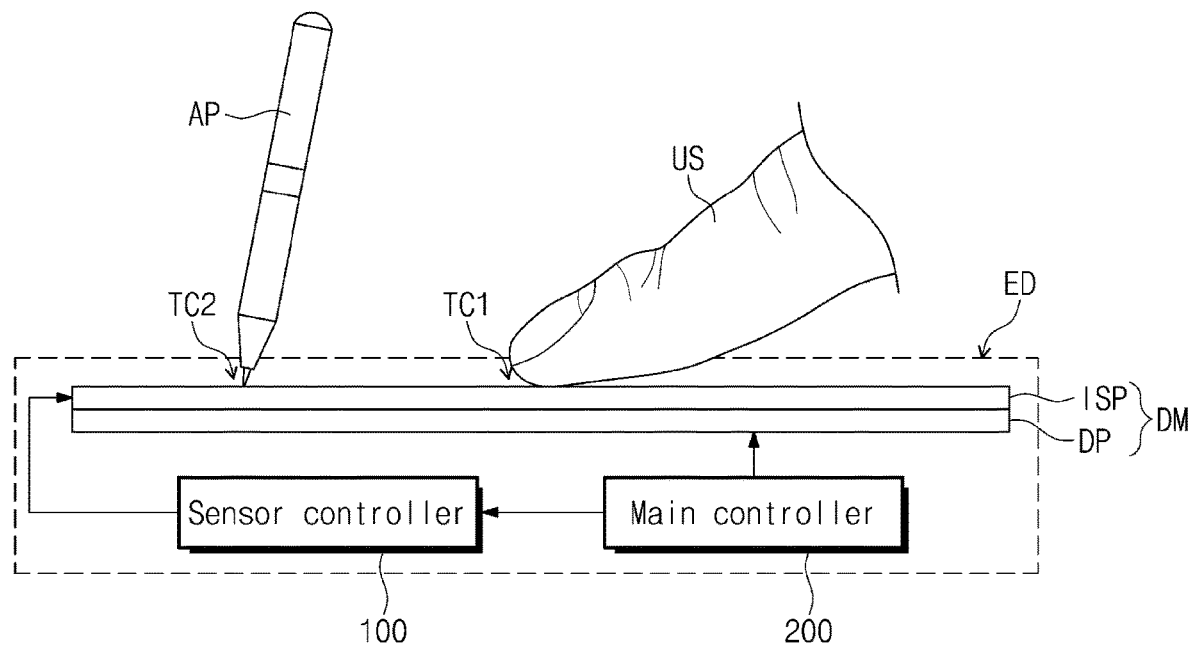
FIG. 4 is a block diagram showing an operation of an electronic device according to an embodiment of the present disclosure.
Figure 5:
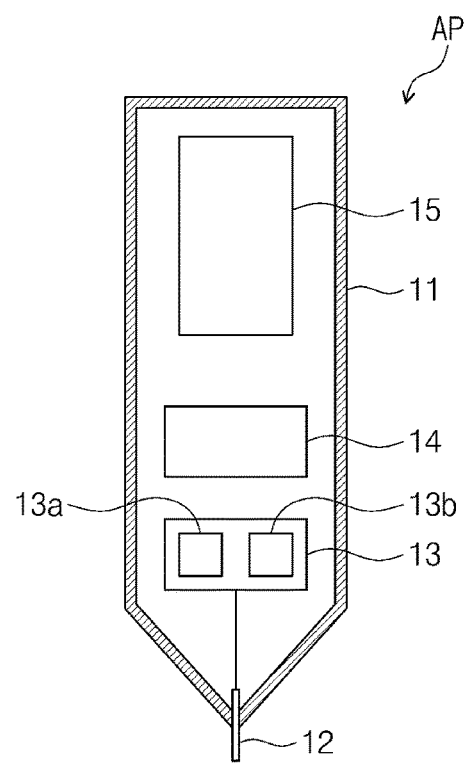
FIG. 5 is a block diagram showing an input device shown in FIG. 4.

FIG. 4 is a block diagram showing an operation of the electronic device ED according to an embodiment of the present disclosure. FIG. 5 is a block diagram showing the input device AP shown in FIG. 4.

Referring to FIGS. 4 and 5, the electronic device ED may further include a main controller 200 and a sensor controller 100. The sensor controller 100 may be connected to the input sensor ISP and the main controller 200 may control a drive of the display panel DP and a drive of the sensor controller 100. In other words, the main controller 200 may be connected to the display panel DP and the sensor controller 100. As an example, the main controller 200 and the sensor controller 100 may be mounted on the main circuit board MCB (refer to FIG. 2), however, they should not be limited thereto or thereby. According to an embodiment of the present disclosure, the sensor controller 100 may be built-in the driving chip DIC (refer to FIG. 2).

The input sensor ISP may include sensing electrodes. A configuration of the input sensor ISP will be described in detail later. The sensor controller 100 may be connected to the sensing electrodes of the input sensor ISP. The sensor controller 100 may operate the input sensor ISP in a first mode to sense the first input TC1 and may operate the input sensor ISP in a second mode to sense the second input TC2. The sensor controller 100 may instruct the input sensor ISP to change modes in response to a control signal provided from the main controller 200.

As shown in FIG. 5, the input device AP may further include a housing 11, a conductive tip 12, a communication module 13, an input controller 14, and a power supply module 15, however, this is just one example, and configurations of the input device AP should not be limited thereto or thereby.

The housing 11 may have a pen shape and may be provided with an accommodation space therein. The conductive tip 12 may protrude outwardly from the accommodation space of the housing 11. The conductive tip 12 may be a portion of the input device AP that makes a direct contact with the electronic device ED.

The communication module 13 may include a transmission circuit 13a and a reception circuit 13b. The transmission circuit 13a may transmit a downlink signal to the sensor controller 100. The downlink signal may include a position of the input device AP, a slope of the input device AP, state information, and the like. The sensor controller 100 may receive the downlink signal via the input sensor ISP when the input device AP is in contact with the input sensor ISP. For example, the downlink signal may travel from the transmission circuit 13a to the sensor controller 100 via the conductive tip 12.

The reception circuit 13b may receive an uplink signal from the sensor controller 100. The uplink signal may include panel information, a protocol version information, and the like. The sensor controller 100 may provide the uplink signal to the input sensor ISP, and the input device AP may receive the uplink signal through the contact with the input sensor ISP. For example, the uplink signal may travel from the sensor controller 100 to the reception circuit 13b via the conductive tip 12.

The input controller 14 may be configured to operate according to a specific program. The transmission circuit 13a receives a signal provided from the input controller 14 and modulates the received signal into a signal that may be sensed by the input sensor ISP, and the reception circuit 13b modulates the signal applied thereto via the input sensor ISP into a signal that may be processed by the input controller 14. The power supply module 15 may supply a power to each component of the input device AP.

Figure 6:
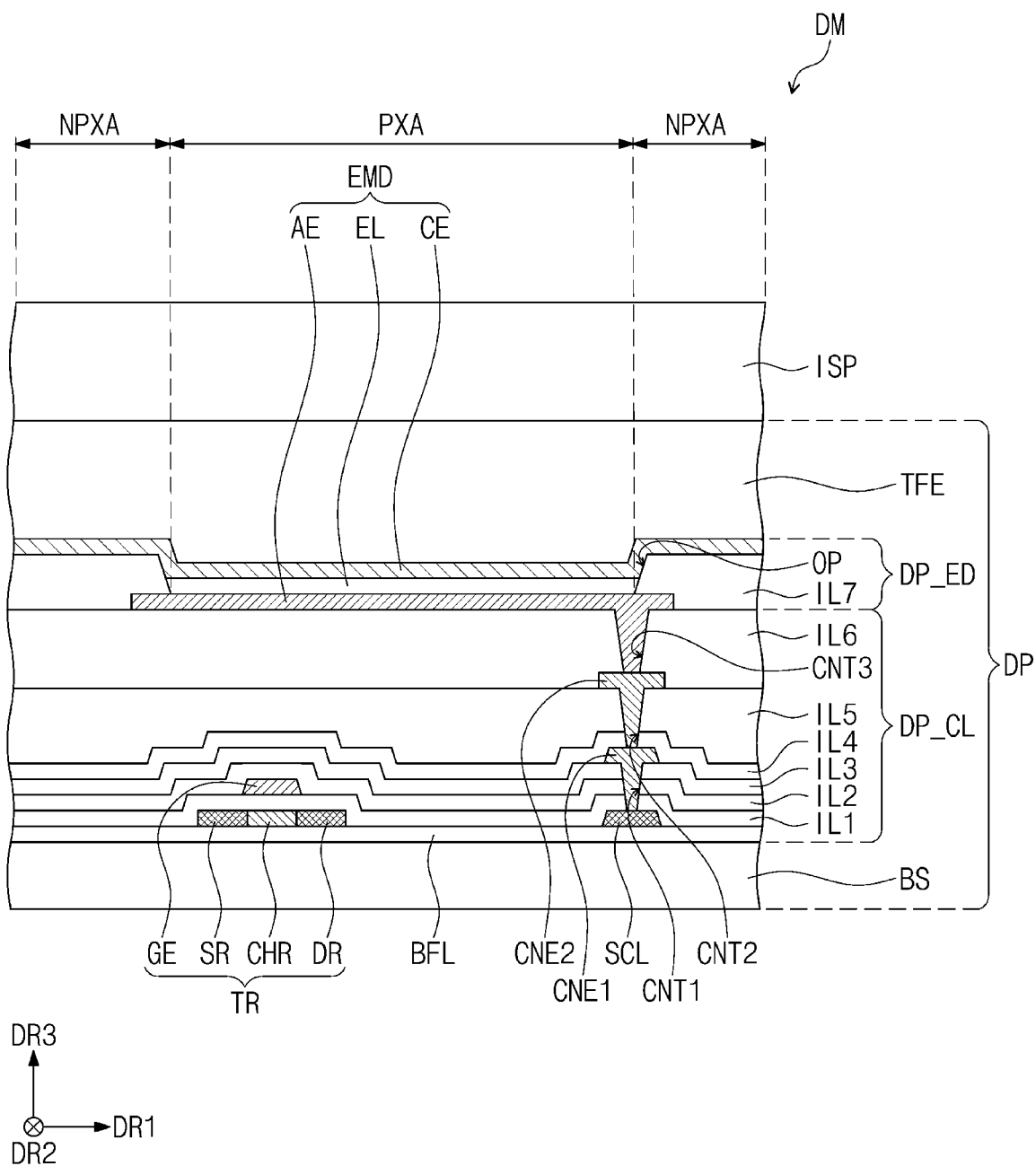
FIG. 6 is a cross-sectional view showing a display module according to an embodiment of the present disclosure.

FIG. 6 is a cross-sectional view showing the display module DM according to an embodiment of the present disclosure.

Referring to FIG. 6, the display module DM may include the display panel DP and the input sensor ISP disposed on the display panel DP. The display panel DP may include a base substrate BS, a circuit layer DP_CL, a light emitting element layer DP_ED, and an encapsulation layer TFE.

The base substrate BS may provide a base surface on which the circuit layer DP_CL is disposed. The base substrate BS may include a glass substrate, a metal substrate, a polymer substrate, or an organic/inorganic composite material substrate. The base substrate BS may have a single-layer or multi-layer structure. As an example, the base substrate BS may have a structure including synthetic resin layers and at least one inorganic layer disposed between the synthetic resin layers.

The synthetic resin layer may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyamide-based resin, a perylene-based resin, and a polyimide-based resin.

At least one inorganic layer may be formed on an upper surface of the base substrate BS. The inorganic layer may include at least one of aluminum oxide, titanium oxide, silicon oxide, silicon oxynitride, zirconium oxide, and hafnium oxide. The inorganic layer may be formed in multiple layers. The inorganic layers may form a barrier layer and/or a buffer layer. In the present embodiment, a buffer layer BFL may be disposed on the base substrate BS.

The circuit layer DP_CL may be disposed on the base substrate BS. The circuit layer DP_CL may include an insulating layer, a semiconductor pattern, a conductive pattern, and a signal line. An insulating layer, a semiconductor layer, and a conductive layer may be formed on the base substrate BS by a coating or depositing process. Then, the insulating layer, the semiconductor layer, and the conductive layer may be selectively patterned through several photolithography processes. After the patterning process is completed, the semiconductor pattern, the conductive pattern, and the signal line included in the circuit layer DP_CL may be formed.

The buffer layer BEL may increase a coupling force between the base substrate BS and the semiconductor pattern. The buffer layer BFL may include at least one of silicon oxide and silicon nitride. According to an embodiment of the present disclosure, the buffer layer BFL may include a silicon oxide layer and a silicon nitride layer, which are alternately stacked with each other.

The semiconductor pattern may be disposed on the buffer layer BFL. FIG. 6 shows only a portion of the semiconductor pattern, and the semiconductor pattern may be further disposed in other areas of the base substrate BS. The semiconductor pattern may include polysilicon, however, it should not be limited thereto or thereby. According to an embodiment of the present disclosure, the semiconductor pattern may include amorphous silicon or metal oxide.

The semiconductor pattern may have different electrical properties depending on whether or not it is doped or whether it is doped with an N-type dopant or a P-type dopant. The semiconductor pattern may include a first region with a high conductivity and a second region with a low conductivity. The first region may be doped with the N-type dopant or the P-type dopant. A P-type transistor may include a doped region doped with the P-type dopant, and an N-type transistor may include a doped region doped with the N-type dopant. The second region may be a non-doped region or a region doped at a concentration lower than that of the first region.

The first region may have a conductivity greater than that of the second region and may serve as an electrode or signal line. The second region may correspond to an active area (or a channel area) of the transistor. In other words, a portion of the semiconductor pattern may be the active area of the transistor, and other portions of the semiconductor pattern may be a source area and a drain area of the transistor, respectively.

The semiconductor pattern may be arranged with a specific rule over the pixels. Each of the pixels may have an equivalent circuit that includes a plurality of transistors, one capacitor, and the light emitting element, and the equivalent circuit of the pixel may be changed in various ways. FIG. 6 shows one transistor TR and the light emitting element EMD included in the pixel.

A source area SR, an active area CHR, and a drain area DR of the transistor TR may be formed from the semiconductor pattern. The source area SR and the drain area DR may extend in opposite directions to each other from the active area CHR in a cross-section. In other words, the active area CHR may be provided between the source area SR and the drain area DR. A signal line SCL forming the circuit layer DP-CL may be disposed on the same layer as the semiconductor pattern. The signal line SCL may be electrically connected to the transistor TR in a plane.

The circuit layer DP_CL may include a plurality of insulating layers. FIG. 6 shows first, second, third, fourth, fifth, and sixth interlayer insulating layers IL1, IL2, IL3, IL4, IL5, and IL6 included in the circuit layer DP_CL. The first, second, third, fourth, fifth, and sixth interlayer insulating layers IL1, IL2, IL3, IL4, IL5, and IL6 may be sequentially stacked. Each of the first to sixth interlayer insulating layers IL1 to IL6 may be an inorganic layer and/or an organic layer and may have a single-layer or multi-layer structure. The inorganic layer may include at least one of aluminum oxide, titanium oxide, silicon oxide, silicon oxynitride, zirconium oxide, and hafnium oxide.

The first interlayer insulating layer IL1 may be disposed on the buffer layer BFL. The first interlayer insulating layer IL1 may commonly overlap the pixels and may cover the semiconductor pattern.

A gate GE of the transistor TR may be disposed on the first interlayer insulating layer IL1. The gate GE may be a portion of a metal pattern. The gate GE may overlap the active area CHR. The gate GE may be used as a mask in a process of doping the semiconductor pattern.

The second interlayer insulating layer IL2 may be disposed on the first interlayer insulating layer IL1 and may cover the gate GE. The second interlayer insulating layer IL2 may commonly overlap the pixels. The third interlayer insulating layer IL3 may be disposed on the second interlayer insulating layer IL2.

A first connection electrode CNE1 may be disposed on the third interlayer insulating layer IL3. The first connection electrode CNE1 may be connected to the signal line SCL via a first channel hole CNT1 provided through the first, second, and third interlayer insulating layers IL1, IL2, and IL3.

The fourth interlayer insulating layer IL4 may be disposed on the third interlayer insulating layer IL3. The fifth interlayer insulating layer IL5 may be disposed on the fourth interlayer insulating layer IL4. In the present embodiment, the fourth interlayer insulating layer IL4 may include an inorganic layer, and the fifth interlayer insulating layer IL5 may include an organic layer.

A second connection electrode CNE2 may be disposed on the fifth interlayer insulating layer IL5. The second connection electrode CNE2 may be connected to the first connection electrode CNE1 via a second channel hole CNT2 provided through the fourth interlayer insulating layer IL4 and the fifth interlayer insulating layer IL5. The first and second channel holes CNT1 and CNT2 may overlap each other.

The sixth interlayer insulating layer IL6 may be disposed on the fifth interlayer insulating layer IL5 and may cover the second connection electrode CNE2. The sixth interlayer insulating layer IL6 may include an organic layer.

The light emitting element layer DP_ED may be disposed on the circuit layer DP_CL. The light emitting element layer DP_ED may include the light emitting element EMD and a pixel definition layer IL7. For example, the light emitting element layer DP_ED may include an organic light emitting material, a quantum dot, a quantum rod, a micro-light emitting diode (LED), or a nano-LED. The light emitting element EMD may include a first electrode AE, a light emitting layer EL, and a second electrode CE.

The first electrode AE may be disposed on the sixth interlayer insulating layer IL6. The first electrode AE may be connected to the second connection electrode CNE2 via a third channel hole CNT3 provided through the sixth interlayer insulating layer IL6. The third channel hole CNT3 may overlap the second channel hole CNT2.

The pixel definition layer IL7 may be disposed on the sixth interlayer insulating layer IL6 and may cover a portion of the first electrode AE. An opening OP may be provided through the pixel definition layer IL7 to expose at least a portion of the first electrode AE. In the present embodiment, a light emitting area PXA may correspond to the portion of the first electrode AE exposed through the opening OP. The pixel definition layer IL7 may correspond to a non-light-emitting area NPXA. The non-light-emitting area NPXA may surround the light emitting area PXA.

The light emitting layer EL may be disposed on the first electrode AE. The light emitting layer EL may be disposed in the opening OP. In the opening OP, the light emitting layer EL may be sandwiched between the first electrode AE and the second electrode CE. The light emitting layer EL may be formed in each of the pixels after being divided into plural portions. When the light emitting layer EL is formed in each of the pixels after being divided into plural portions, each of the light emitting layers EL may emit a light having at least one of blue, red, and green colors, however, it should not be limited thereto or thereby. The light emitting layer EL may be commonly provided over the pixels. In this case, the light emitting layer EL may provide a blue light or a white light.

The second electrode CE may be disposed on the light emitting layer EL. The second electrode CE may have an integral shape and may be commonly disposed over the pixels. A common voltage may be applied to the second electrode CE, and the second electrode CE may be referred to as a common electrode.

A hole control layer may be disposed between the first electrode AE and the light emitting layer EL, and an electron control layer may be disposed between the light emitting layer EL and the second electrode CE. The hole control layer may include at least one of a hole transport layer and a hole injection layer. The electron control layer may include at least one of an electron transport layer and an electron injection layer. The hole control layer and the electron control layer may be commonly disposed in the light emitting area PXA and the non-light-emitting area NPXA. The hole control layer and the electron control layer may be formed using an open mask.

The encapsulation layer TFE may be disposed on the light emitting element layer DP_ED. According to an embodiment of the present disclosure, the encapsulation layer TFE may include at least one inorganic layer and at least one organic layer, which are sequentially stacked. As an example, the encapsulation layer TFE may have a structure including a plurality of inorganic layers and an organic layer disposed between the inorganic layers. The inorganic layers may protect the light emitting element layer DP_ED from moisture and oxygen, and the organic layer may protect the light emitting element layer DP_ED from a foreign substance such as dust particles. The inorganic layers may include a silicon nitride layer, a silicon oxynitride layer, a silicon oxide layer, a titanium oxide layer, or an aluminum oxide layer. The organic layer may include an acrylic-based organic layer. However, materials for the inorganic and organic layers should not be limited thereto or thereby.

According to an embodiment of the present disclosure, the encapsulation layer TFE may also be provided in the form of an encapsulation substrate. The encapsulation substrate may be disposed on the light emitting element layer DP_ED by a sealing member. The encapsulation substrate may include a glass substrate.

The input sensor ISP may be formed on the display panel DP through successive processes. The input sensor ISP may include a plurality of insulating layers and a plurality of conductive layers. The input sensor ISP may be in direct contact with an upper surface of the encapsulation layer TFE.

Figure 7:
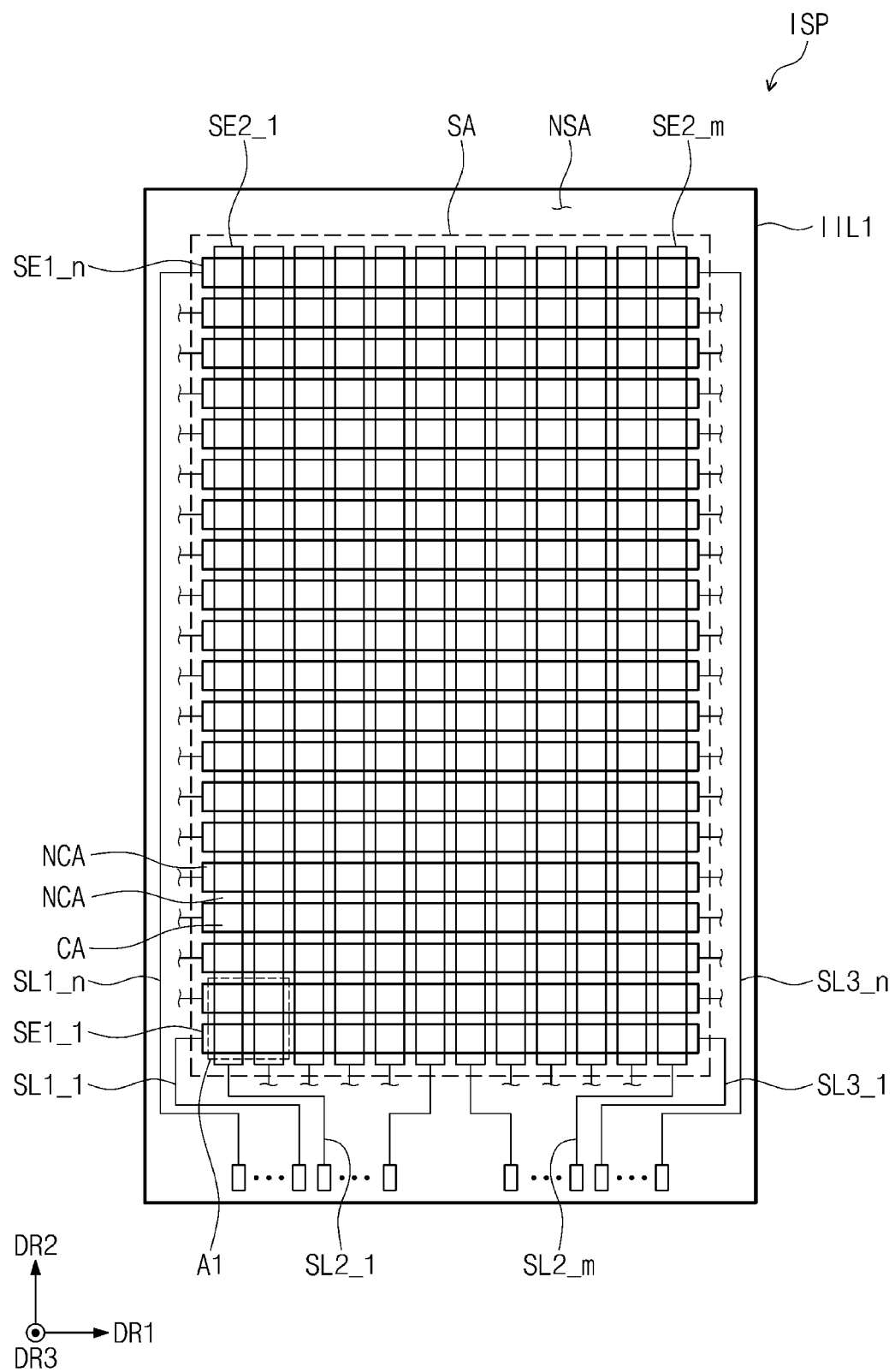
FIG. 7 is a plan view showing an input sensor according to an embodiment of the present disclosure.
Figure 8A:
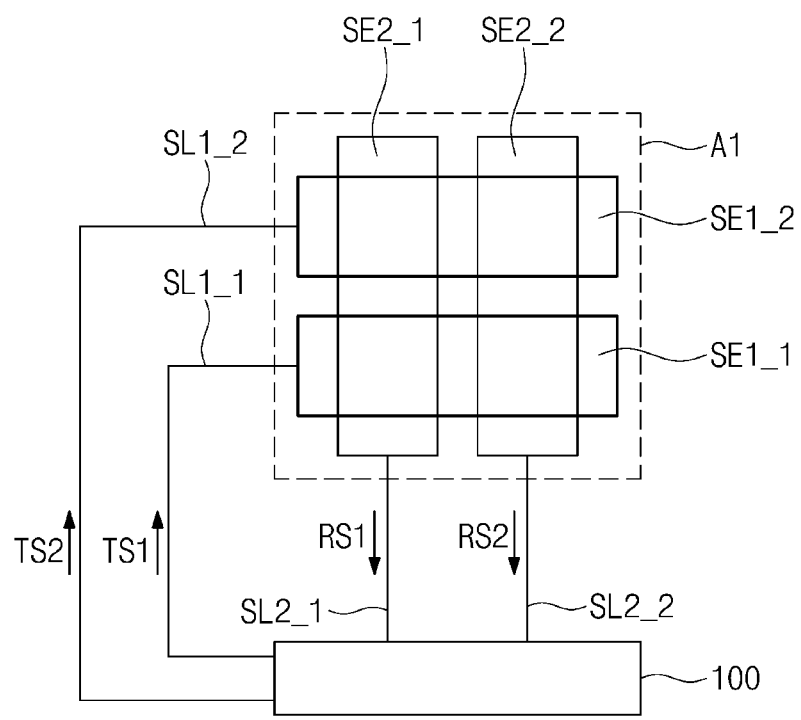
FIGS. 8A, 8B and 8C are views showing an operation of an input sensor according to an embodiment of the present disclosure.
Figure 8B:
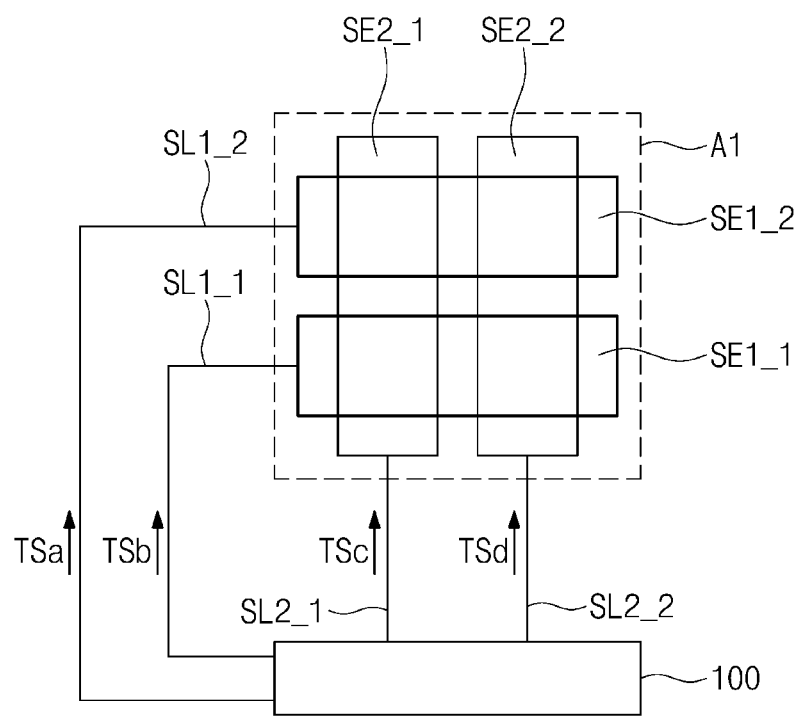
Figure 8C:
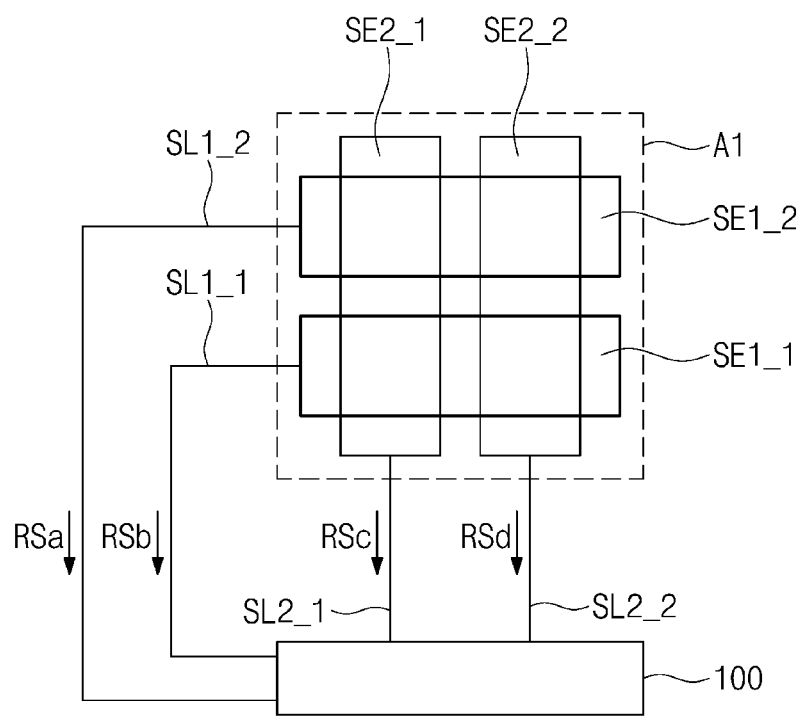

FIG. 7 is a plan view showing the input sensor ISP according to an embodiment of the present disclosure. FIG. 8A is a view showing an operation of the input sensor ISP in the first mode. FIGS. 8B and 8C are views showing an operation of the input sensor ISP in the second mode.

Referring to FIG. 7, the input sensor ISP may include a sensing area SA and a non-sensing area NSA. The sensing area SA may be activated in response to electrical signals. The sensing area SA may be an area in which an input is sensed. The non-sensing area NSA may surround the sensing area SA. The sensing area SA and the non-sensing area NSA may respectively correspond to the active area AA and the peripheral area NAA of the display module DM shown in FIG. 2.

The input sensor ISP may include a base layer IIL1, a plurality of first sensing electrodes SE1_1 to SE1_$n$, a plurality of second sensing electrodes SE2_1 to SE2_$m$, a plurality of first sensing lines SL1_1 to SL1_$n$, and a plurality of second sensing lines SL2_1 to SL2_$m$. The first and second sensing electrodes SE1_1 to SE1_$n$ and SE2_1 to SE2_$m$ may be disposed in the sensing area SA of the base layer IIL1. The first sensing lines SL1_1 to SL1_$n$ and the second sensing lines SL2_1 to SL2_$m$ may be disposed in the non-sensing area NSA.

The base layer IIL1 may include an inorganic layer or an organic layer. As an example, the inorganic layer of the base layer IIL1 may include at least one of silicon nitride, silicon oxynitride, and silicon oxide. The organic layer of the base layer IIL1 may include at least one of an epoxy resin, an acrylic resin, and an imide-based resin, however, a material for the base layer IIL1 should not be limited thereto or thereby. The base layer IIL1 may have a single-layer structure or a multi-layer structure.

The number of the first sensing electrodes SE1_1 to SE1_$n$ may be n and the number of the second sensing electrodes SE2_1 to SE2_$m$ may be m. In the present embodiment, each of n and m is a natural number equal to or greater than 1 and should not be particularly limited.

Each of the first sensing electrodes SE1_1 to SE1_$n$ may have a bar shape and may extend in the first direction DR1. The first sensing electrodes SE1_1 to SE1_$n$ may be arranged in the second direction DR2 and may be spaced apart from each other. The first sensing electrodes SE1_1 to SE1_$n$ may have a substantially constant electrode width in the second direction DR2. An interval between the first sensing electrodes SE1_1 to SE1_$n$ may be constant in the second direction DR2.

Each of the second sensing electrodes SE2_1 to SE2_$m$ may have a bar shape and may extend in the second direction DR2. The second sensing electrodes SE2_1 to SE2_$m$ may be arranged in the first direction DR1 and may be spaced apart from each other. The second sensing electrodes SE2_1 to SE2_$m$ may have a substantially constant electrode width in the first direction DR1. An interval between the second sensing electrodes SE2_1 to SE2_$m$ may be constant in the first direction DR1.

The first sensing electrodes SE1_1 to SE1_$n$ may be electrically insulated from the second sensing electrodes SE2_1 to SE2_$m$ and may cross the second sensing electrodes SE2_1 to SE2_$m$ when viewed in a plane. In other words, the first sensing electrodes SE1_1 to SE1_$n$ may overlap the second sensing electrodes SE2_1 to SE2_$m$. Areas where the first sensing electrodes SE1_1 to SE1_$n$ cross the second sensing electrodes SE2_1 to SE2_$m$ may be referred to as electrode-crossing areas CA. Areas where the first sensing electrodes SE1_1 to SE1_$n$ do not cross the second sensing electrodes SE2_1 to SE2_$m$ may be defined as non-crossing areas NCA. In other words, the non-crossing areas NCA may correspond to areas where the first sensing electrodes SE1_1 to SE1_$n$ and the second sensing electrodes SE2_1 to SE2_$m$ do not overlap.

The first sensing lines SL1_1 to SL1_$n$ may be electrically connected to one side of the first sensing electrodes SE1_1 to SE1_$n$, respectively, and the second sensing lines SL2_1 to SL2_$m$ may be electrically connected to one side of the second sensing electrodes SE2_1 to SE2_$m$, respectively. According to an embodiment of the present disclosure, the input sensor ISP may further include a plurality of third sensing lines SL3_1 to SL3_$n$ electrically connected to other sides of the first sensing electrodes SE1_1 to SE1_$n$; however, the input sensor ISP should not be limited thereto or thereby. According to an embodiment of the present disclosure, the third sensing lines SL3_1 to SL3_$n$ may be omitted.

The first sensing electrodes SE1_1 to SE1_$n$ may be electrically connected to the sensor controller 100 (refer to FIG. 4) via the first sensing lines SL1_1 to SL1_$n$, and the second sensing electrodes SE2_1 to SE2_$m$ may be electrically connected to the sensor controller 100 (refer to FIG. 4) via the second sensing lines SL2_1 to SL2_$n$. The first sensing lines SL1_1 to SL1_$n$ and the second sensing lines SL2_1 to SL2_$m$ may be connected to the flexible circuit film FCB of FIG. 2 via pads.

The input sensor ISP may be operated in the first mode in which the input sensor ISP obtains information on the first input TC1 (refer to FIG. 4) based on a variation in capacitance between the first sensing electrodes SE1_1 to SE1_$n$ and the second sensing electrodes SE2_1 to SE2_$m$ or in the second mode in which the input sensor ISP obtains information on the second input TC2 (refer to FIG. 4) based on a variation in capacitance of each of the first sensing electrodes SE1_1 to SE1_$n$ and the second sensing electrodes SE2_1 to SE2_$m$.

For the convenience of explanation, FIGS. 8A to 8C schematically show two first sensing electrodes SE1_1 and SE1_2 among the first sensing electrodes SE1_1 to SE1_$n$ and two second sensing electrodes SE2_1 and SE2_2 among the second sensing electrodes SE2_1 to SE2_$m$, in particular, the area where the two first sensing electrodes SE1_1 and SE1_2 and the two second sensing electrodes SE2_1 and SE2_2 are located shown in FIGS. 8A to 8C corresponds to the area A1 shown in FIG. 7. An operation method of the sensing electrodes described based on the two first sensing electrodes SE1_1 and SE1_2 and the two second sensing electrodes SE2_1 and SE2_2 with reference to FIGS. 8A to 8C may be equally applied to the rest of n first sensing electrodes SE1_1 to SE1_$n$ and the m second sensing electrodes SE2_1 to SE2_$m$.

In the first mode (Mode 1 in FIG. 8A), one of the first sensing electrodes SE1_1 to SE1_$n$ and the second sensing electrodes SE2_1 to SE2_$m$ may be operated as a transmission electrode, and the other of the first sensing electrodes SE1_1 to SE1_$n$ and the second sensing electrodes SE2_1 to SE2_$m$ may be operated as a reception electrode.

As an example, referring to FIG. 8A, in the first mode, the first sensing electrodes SE1_1 and SE1_2 may be operated as the transmission electrode, and the second sensing electrodes SE2_1 and SE2_2 may be operated as the reception electrode. In the first mode, the sensor controller 100 may sense a variation in capacitance between the first sensing electrodes SE1_1 and SE1_2 and the second sensing electrodes SE2_1 and SE2_2 to sense an external input.

In the first mode, the sensor controller 100 may apply driving signals TS1 and TS2 to the first sensing electrodes SE1_1 and SE1_2. The driving signals TS1 and TS2 may be provided through the first sensing lines SL1_1 and SL1_2. In the first mode, the sensor controller 100 may receive sensing signals RS1 and RS2 from the second sensing electrodes SE2_1 and SE2_2. The sensing signals RS1 and RS2 may be received through the second sensing lines SL2_1 and SL2_2. Accordingly, the sensor controller 100 may compare the driving signals TS1 and TS2 with the sensing signals RS1 and RS2 corresponding to the driving signals TS1 and TS2 and may generate a coordinate value of a position to which the first input TC1 is provided based on the variation between the driving signals TS1 and TS2 with the sensing signals RS1 and RS2.

When the input device AP approaches the input sensor ISP as shown in FIG. 4, the input sensor ISP may enter the second mode (Mode 2 in FIGS. 8B and 8C) to sense the second input TC2 shown in FIGS. 8B and 8C. The input device AP (refer to FIG. 4) may transmit and receive data to and from the sensor controller 100 through the input sensor ISP. All of the first sensing electrodes SE1_1 to SE1_$n$ and the second sensing electrodes SE2_1 to SE2_$m$ may serve as the transmission electrode or the reception electrode in the second mode.

As an example, referring to FIG. 8B, in the second mode, each of the first sensing electrodes SE1_1 and SE1_2 and the second sensing electrodes SE2_1 and SE2_2 may serve as the transmission electrode to provide uplink signals TSa, TSb, TSc, and TSd, which are provided from the sensor controller 100, to the input device AP (refer to FIG. 4). The uplink signals TSa, TSb, TSc, and TSd are transmitted via the first and second sensing lines SL1_1, SL1_2, SL2_1 and SL2_2. Referring to FIG. 8C, in the second mode, each of the first sensing electrodes SE1_1 and SE1_2 and the second sensing electrodes SE2_1 and SE2_2 may serve as the reception electrode to provide downlink signals RSa, RSb, RSc, and RSd, which are provided from the input device AP (refer to FIG. 4), to the sensor controller 100. The downlink signals RSa, RSb, RSc, and RSd are transmitted via the first and second sensing lines SL1_1, SL1_2, SL2_1 and SL2_2.

When each of the first sensing electrodes SE1_1 to SE1_$n$ and the second sensing electrodes SE2_1 to SE2_$m$ are provided in the bar shape, a variation in capacitance between the first sensing electrodes SE1_1 to SE1_$n$ and the second sensing electrodes SE2_1 to SE2_$m$ may be substantially uniformly maintained even though the input device AP (refer to FIG. 4) moves. Accordingly, although the second input TC2 (refer to FIG. 4) moves, the movement of the second input TC2 (refer to FIG. 4) may be accurately sensed in the second mode. In other words, when the second input TC2 (refer to FIG. 4) is provided in a line shape as in the case of writing a letter or drawing a picture by using the input device AP (refer to FIG. 4), the second input TC2 (refer to FIG. 4) may be prevented from being distorted due to the variation in mutual capacitance, and as a result, a linearity of the second input TC2 (refer to FIG. 4) may be improved.

Figure 9A:
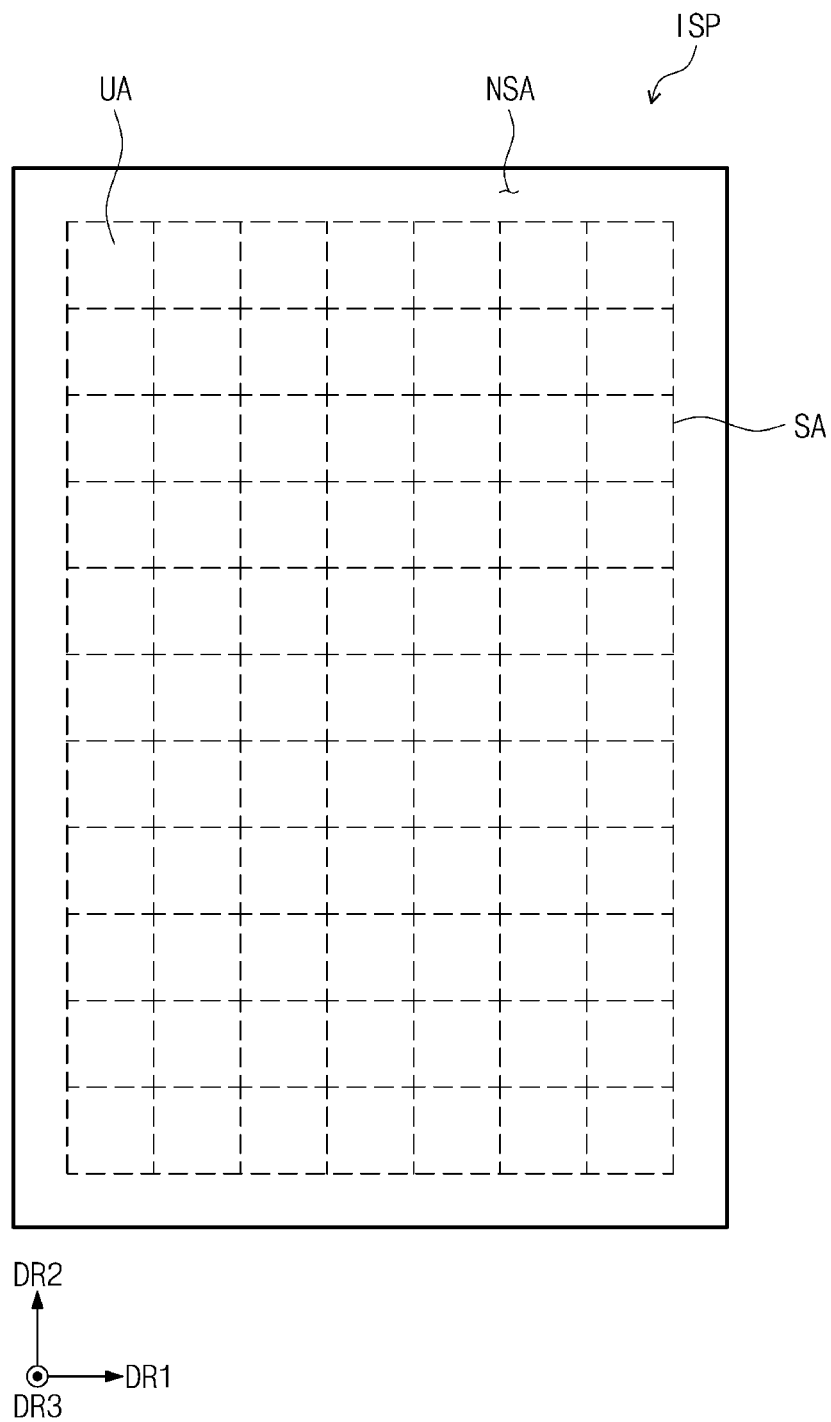
FIG. 9A is a plan view showing an input sensor according to an embodiment of the present disclosure.
Figure 9B:
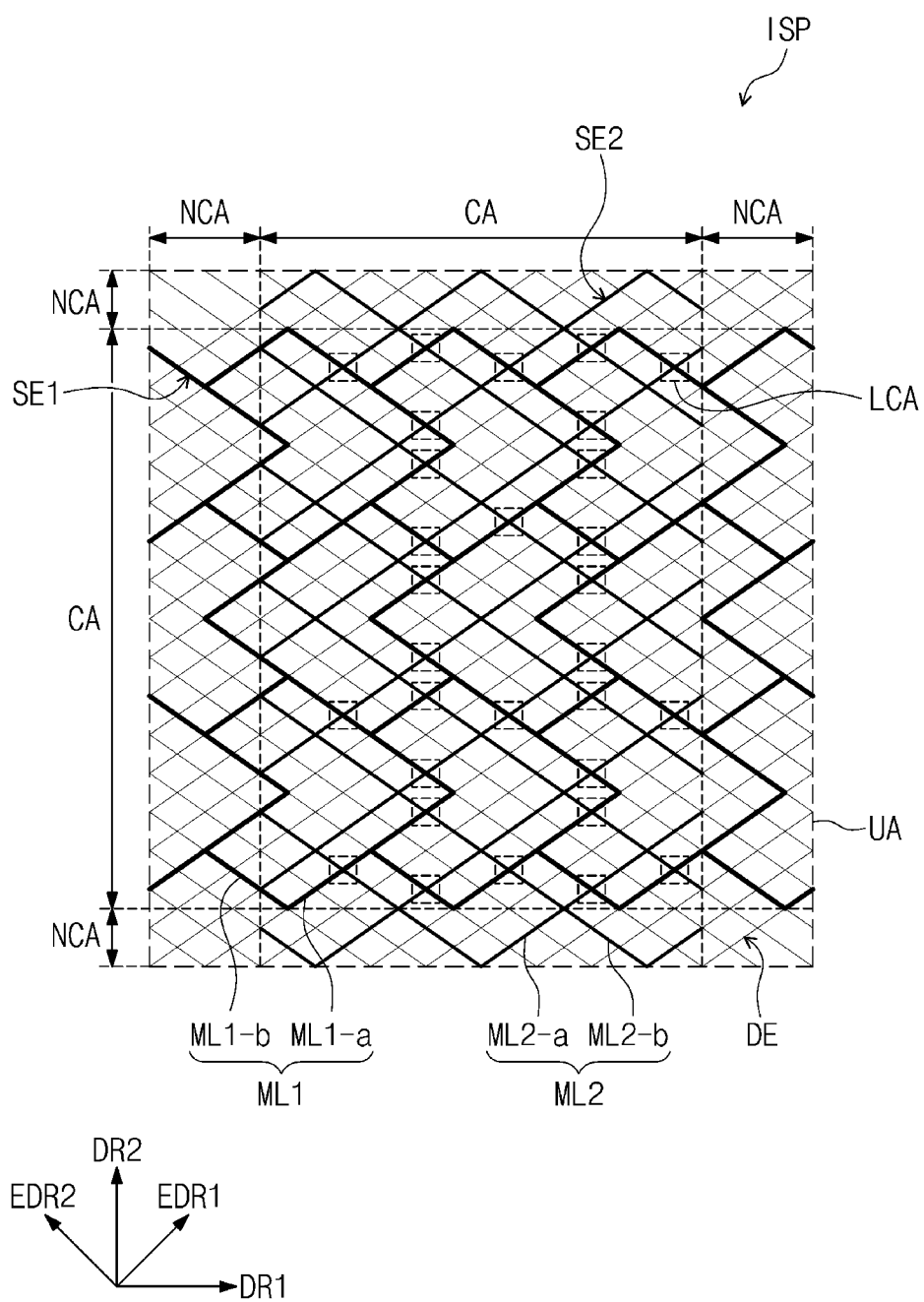
FIG. 9B is a plan view showing a unit sensing area shown in FIG. 9A according to an embodiment of the present disclosure.

FIG. 9A is a plan view schematically showing the input sensor ISP of FIG. 7 based on areas. FIG. 9B is an enlarged plan view showing one unit sensing area UA shown in FIG. 9A.

Referring to FIG. 9A, the sensing area SA may include a plurality of unit sensing areas UA arranged in a matrix form. The unit sensing areas UA may be arranged in rows by columns, e.g., a matrix form. As shown in FIG. 9A, the entire sensing area SA of the input sensor ISP may be provided with only the unit sensing areas UA, however, it should not be limited thereto or thereby. As an example, the input sensor ISP may include a first sensing area and a second sensing area, which are distinguished from each other. The first sensing area may include the unit sensing areas UA, and the second sensing area may include a unit sensing area different from the unit sensing areas UA of the first sensing area.

FIG. 9B shows one first sensing electrode SE1 and one second sensing electrode SE2, which are disposed in one unit sensing area UA. According to an embodiment of the present disclosure, the input sensor ISP may further include dummy electrodes DE. The dummy electrodes DE may be electrically insulated from the first sensing electrode SE1 and the second sensing electrode SE2. The dummy electrodes DE may be disposed between the first sensing electrode SE1 and the second sensing electrode SE2 to prevent a difference in visibility between an area in which the first sensing electrode SE1 and the second sensing electrode SE2 are disposed and an area in which the first sensing electrode SE1 and the second sensing electrode SE2 are not disposed, however, it should not be limited thereto or thereby. According to an embodiment of the present disclosure, the dummy electrodes DE may be omitted.

Each of the first sensing electrode SE1 and the second sensing electrode SE2 may have a mesh structure. Each of the first sensing electrode SE1 and the second sensing electrode SE2 may include a plurality of mesh patterns to have the mesh structure. The mesh patterns included in the first sensing electrode SE1 may be referred to as first mesh patterns. The mesh patterns included in the second sensing electrode SE2 may be referred to as second mesh patterns.

Each of the first and second mesh patterns may include a plurality of mesh lines. The mesh lines may include first line groups extending in a first cross direction EDR1 and second line groups extending in a second cross direction EDR2. Each of the first cross direction EDR1 and the second cross direction EDR2 may cross the first direction DR1 and the second direction DR2. An included angle between the first cross direction EDR1 and the second cross direction EDR2 may be equal to or smaller than about 90 degrees.

The first mesh patterns may include some lines ML1-*a* among the first line groups and some lines ML1-*b* among the second line groups. Among the lines of the first and second line groups, the lines ML1-*a* and ML1-*b* forming the first mesh patterns may be referred to as first mesh lines ML1.

The second mesh patterns may include the other lines ML2*a* among the first line groups and the other lines ML2*b* among the second line groups. Among the lines of the first and second line groups, the lines ML2*a* and ML2*b* forming the second mesh patterns may be referred to as second mesh lines ML2.

Each of the first mesh lines ML1 and the second mesh lines ML2 may include a conductive material. As an example, each of the first mesh lines ML1 and the second mesh lines ML2 may include a metal material.

Each of the first mesh lines ML1 and the second mesh lines ML2 may include a plurality of metal layers. An outermost metal layer of a first portion of the first mesh lines ML1 may include a material different from that of an outermost metal layer of a second portion of the first mesh lines ML1. An outermost metal layer of a third portion of the second mesh lines ML2 may include a material different from that of an outermost metal layer of a fourth portion of the second mesh lines ML2. An outermost metal layer of each of the first and third portions of the first and second mesh lines ML1 and ML2 may be adjacent to a bridge pattern BRP (refer to FIG. 10D) to be described later.

Each of the first mesh lines ML1 and the second mesh lines ML2 may have a multi-layer structure. As an example, the first portion of the first mesh lines ML1 may have a two metal layer structure, and the second portion of the first mesh lines ML1 may have a three metal layer structure. Similarly, the third portion of the second mesh lines ML2 may have a two metal layer structure, and the fourth portion of the second mesh lines ML2 may have a three metal layer structure. This will be described in detail with reference to accompanying drawings.

The first mesh lines ML1 and the second mesh lines ML2 may be disposed on the same layer and may be electrically insulated from each other. As an example, the first mesh lines ML1 and the second mesh lines ML2 may be disposed on an upper surface of the base layer IIL1 of the input sensor ISP. The first mesh lines ML1 of the first sensing electrode SE1 and the second mesh lines ML2 of the second sensing electrode SE2 may be formed by forming the mesh patterns including the first line groups and the second line groups connected to each other and disconnecting some lines of the first and second line groups to allow the first sensing electrode SE1 to be insulated from the second sensing electrode SE2. Points where the some lines among the first and second line groups are disconnected may correspond to line-crossing areas LCA described later.

The line-crossing areas LCA may be formed in each electrode-crossing area CA. Each line-crossing area LCA may be an area in which a portion of the first mesh line ML1 extending in one direction and the second mesh lines ML2 spaced apart from each other with the portion of the first mesh line ML1 interposed therebetween are included. In this case, the second mesh lines ML2 disposed on the same layer and spaced apart from each other may be electrically connected to each other via a bridge pattern BRP described later. However, the line-crossing area LCA should not be limited thereto or thereby. According to an embodiment of the present disclosure, the line-crossing area LCA may be an area in which a portion of the second mesh line ML2 extending in one direction and the first mesh lines ML1 spaced apart from each other with the portion of the second mesh line ML2 interposed therebetween are included. In this case, the bridge pattern BRP may electrically connect the first mesh lines ML1 disposed on the same layer and spaced apart from each other.

The shape of the first sensing electrode SE1 and the second sensing electrode SE2, which are disposed in the unit sensing area UA shown in FIG. 9B, is just one example, and the input sensor ISP of the present disclosure should not be limited thereto or thereby. In other words, the first sensing electrode SE1 and the second sensing electrode SE2 may be designed to have a variety of shapes.

Figure 10A:
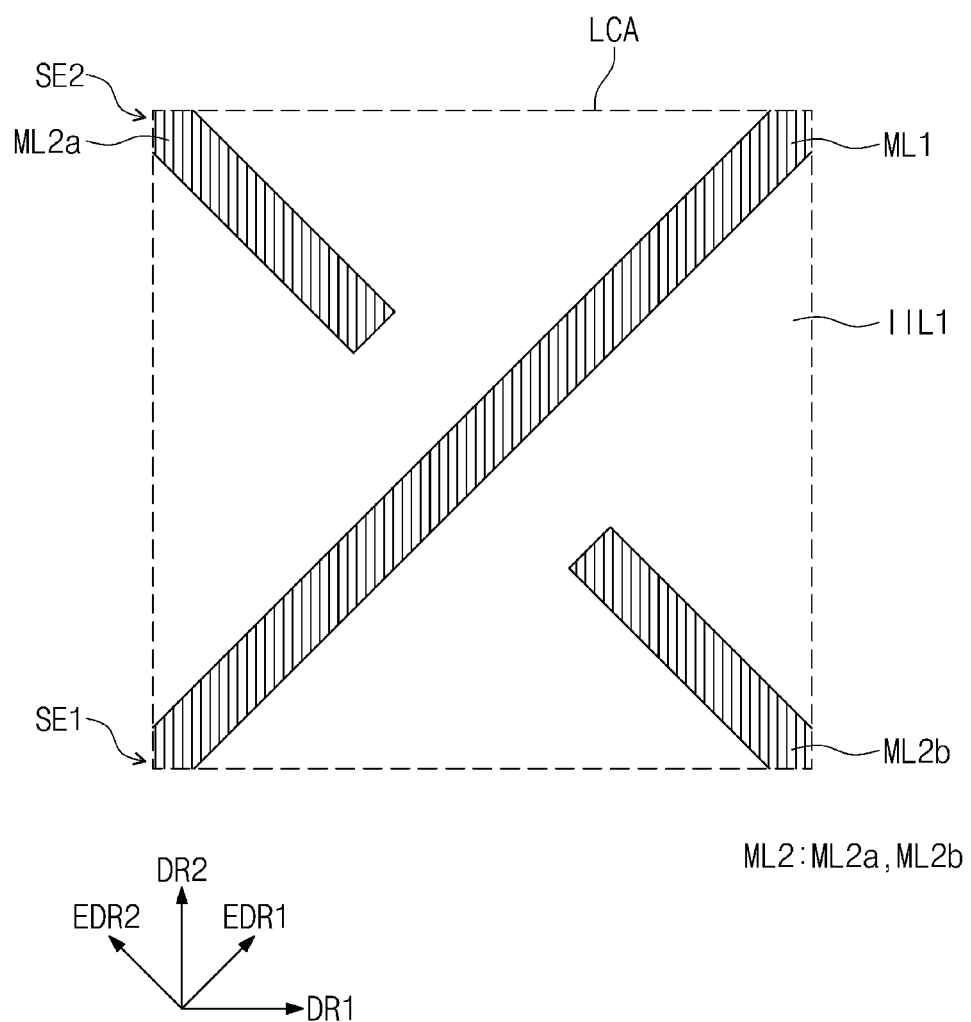
FIGS. 10A, 10B, 10C and 10D are enlarged plan views showing an input sensor according to an embodiment of the present disclosure.

FIGS. 10A to 10D are enlarged plane views showing an input sensor corresponding to one line-crossing area LCA among the line-crossing areas LCA shown in FIG. 9B. FIG. 10A shows a portion of the first mesh line ML1 and a portion of the second mesh lines ML2, which correspond to the line-crossing area LCA.

Referring to FIG. 10A, the first sensing electrode SE1 and the second sensing electrode SE2 may be disposed on the base layer IIL1. In the line-crossing area LCA, the first sensing electrode SE1 may include the first mesh line ML1 extending in the first cross direction EDR1. For example, the first mesh line ML1 may extend from one corner of the line-crossing area LCA to another corner of the line-crossing area LCA. In the line-crossing area LCA, the second sensing electrode SE2 may include the second mesh lines ML2 extending in the second cross direction EDR2 crossing the first cross direction EDR1. In the line-crossing area LCA, the second mesh lines ML2 may include a first line ML2a and a second line ML2b, which are spaced apart from each other with the first mesh line ML1 interposed therebetween in the second cross direction EDR2. A space may exist between the first line ML2a and the first mesh line ML1 along the second cross direction EDR2 and a space may exists between the second line ML2b and the first mesh line ML1 along the second cross direction EDR2.

Each of the line-crossing areas LCA shown in FIG. 9B may correspond to an area in which the second mesh lines ML2 spaced apart from each other with the first mesh line ML1 interposed therebetween are included as shown in FIG. 10A, however, it should not be limited thereto or thereby. According to an embodiment of the present disclosure, some areas of the line-crossing areas LCA may correspond to an area in which the first mesh lines ML1 spaced from each other with the second mesh line ML2 interposed therebetween are included or all line-crossing areas LCA may correspond to an area in which the first mesh lines ML1 spaced from each other with the second mesh line ML2 interposed therebetween are included.

Figure 10B:
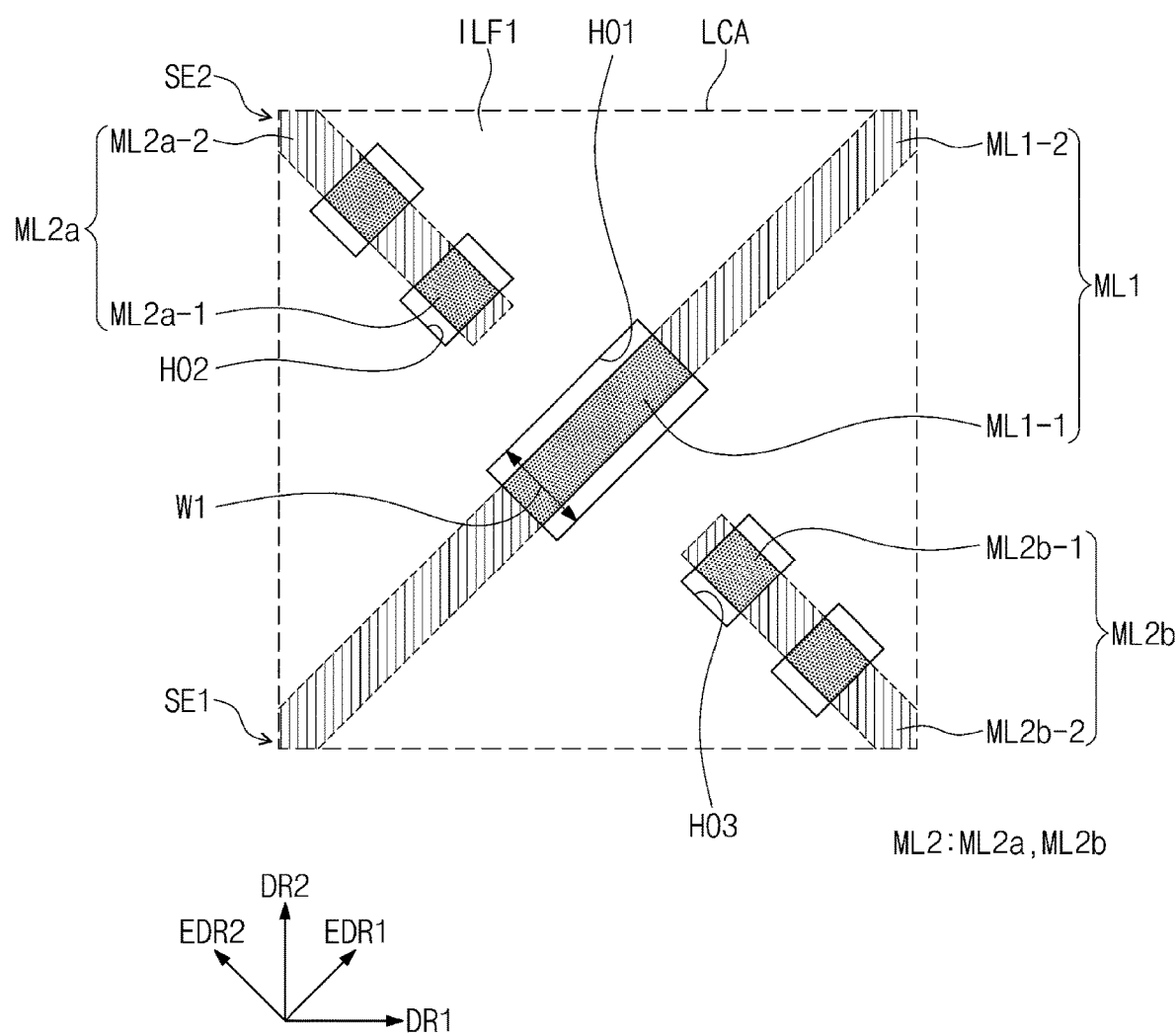

FIG. 10B shows a first insulating layer ILF1 disposed on the first and second mesh lines ML1 and ML2 of the line-crossing area LCA shown in FIG. 10A. For the convenience of explanation, portions of the first and second mesh lines MLA and ML2 covered by the first insulating layer ILF1 are also shown in FIG. 10B.

The first insulating layer ILF1 may include an inorganic material. As an example, the first insulating layer ILF1 may include at least one of silicon nitride, silicon oxynitride, and silicon oxide. However, a material for the first insulating layer ILF1 should not be limited thereto or thereby.

Referring to FIG. 10B, the first insulating layer ILF1 may be provided with a first hole HO1 through which a portion of the first mesh line ML1 is exposed. The first hole HO1 may pass through the first insulating layer ILF1. The first hole HO1 may have a shape extending in a direction in which the first mesh line ML1 extends when viewed in a plane, however, the shape of the first hole HO1 should not be particularly limited.

The first insulating layer ILF1 may be further provided with a second hole HO2 through which a portion of the first line ML2a of the second mesh lines ML2 is exposed and a third hole HO3 through which a portion of the second line ML2b is exposed. The second hole HO2 and the third hole HO3 may pass through the first insulating layer ILF1. When viewed in a plane, the second hole HO2 and the third hole HO3 may be spaced apart from each other with the first hole HO1 interposed therebetween. As shown in FIG. 10B, the second hole HO2 and the third hole HO3 may be spaced apart from each other in the second cross direction EDR2 with the first hole HO1 interposed therebetween.

In one line-crossing area LCA, the second hole HO2 may be provided in plural. The second holes HO2 may be arranged in the extension direction of the first line ML2a. Similarly, the third hole HO3 may be provided in plural in one line-crossing area LCA, and the third holes HO3 may be arranged in the extension direction of the second line ML2b.

The portion of the first mesh line ML1, which overlaps the first hole HO1 and is exposed through the first hole HO1, may be referred to as a first portion ML1-1, and a portion of the first mesh line ML1, which does not overlap the first hole HO1, may be referred to as a second portion ML1-2. A first width W1 of the first hole HO1 in the second cross direction EDR2 may be equal to or greater than a width of the first mesh line ML. As shown in FIG. 10B, a width of the first portion ML1-1 exposed through the first hole HO1 may be equal to the width of the first mesh line ML1. In other words, portions of both sides of the first mesh line ML1 extending in the first cross direction EDR1 may overlap the first hole HO1.

Each of the first portion ML1-1 and the second portion ML1-2 may include a plurality of metal layers. An outermost metal layer of the first portion ML1-1 may include a material different from a material of an outermost metal layer of the second portion ML1-2. The outermost metal layer of the first portion ML1-1 may include a metal material having a relatively low resistance. The outermost metal layer of the second portion ML1-2 may include a metal material having a corrosion resistance.

The portion of the first line ML2a of the second mesh lines ML2, which overlaps the second hole HO2 and is exposed through the second hole HO2, may be referred to as a third portion ML2a-1, and a portion of the first line ML2a of the second mesh lines ML2, which does not overlap the second hole HO2, may be referred to as a fourth portion ML2a-2. The portion of the second line ML2b of the second mesh lines ML2, which overlaps the third hole HO3 and is exposed through the third hole HO3, may be referred to as a fifth portion ML2b-1, and a portion of the second line ML2b of the second mesh lines ML2, which does not overlap the third hole HO3, may be defined as a sixth portion ML2b-2.

Each of the third, fourth, fifth, and sixth portions ML2a-1, ML2a-2, ML2b-1, and ML2b-2 may include the metal layers.

Outermost metal layers of the third portion ML2a-l and the fifth portion ML2b-1 may include substantially the same material as each other. The material included in the outermost metal layers of the third portion ML2a-l and the fifth portion ML2b-l may be the same as that of the outermost metal layer of the first portion ML1-1. The outermost metal layer of the third portion ML2a-l and the fifth portion ML2b-1 may include a metal material having a relatively low resistance.

Outermost metal layers of the fourth portion ML2a-2 and the sixth portion ML2b-2 may include the same material as each other. The material included in the outermost metal layers of the fourth portion ML2a-2 and the sixth portion ML2b-2 may be substantially the same as that of the outermost metal layer of the second portion ML1-2. The outermost metal layers of the fourth portion ML2a-2 and the sixth portion ML2b-2 may include a metal material having a corrosion resistance.

As shown in FIG. 10B, a width of the third portion ML2a-1 exposed through the second holes HO2 and a width of the fourth portion ML2a-2 may be equal to the width of the second mesh line ML2. In addition, a width of the fifth portion ML2b-1 exposed through the third holes HO3 and a width of the sixth portion ML2b-2 may be equal to the width of the second mesh line ML2.

Figure 10C:
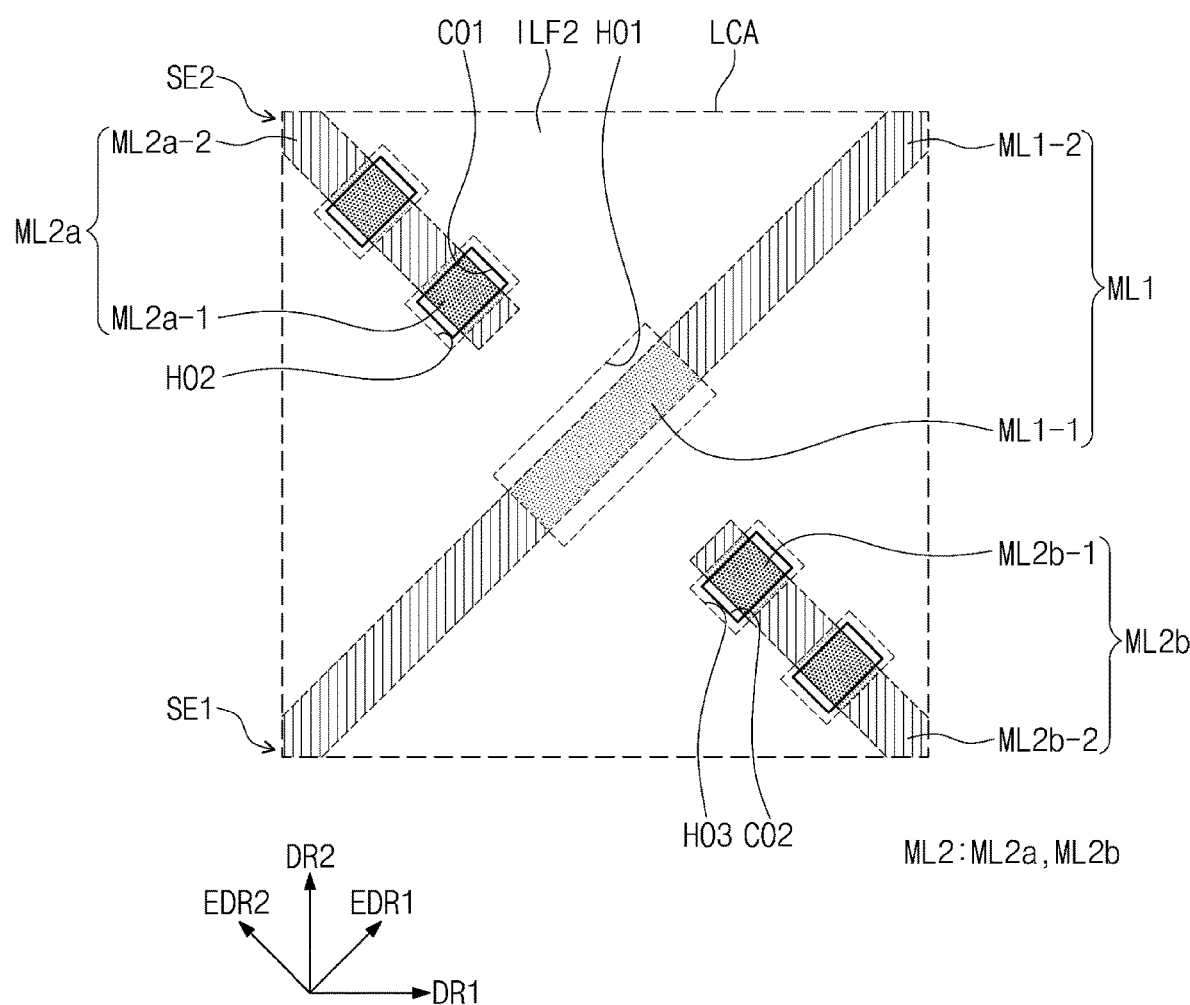

FIG. 10C shows a second insulating layer ILF2 disposed on the first insulating layer ILF1 of FIG. 10B in the line-crossing area LCA. For the convenience of explanation, portions of the first and second mesh lines ML1 and ML2, which are covered by the second insulating layer ILF2, are also shown in FIG. 10C.

The second insulating layer ILF2 may include an inorganic material. As an example, the second insulating layer ILF2 may include at least one of silicon nitride, silicon oxynitride, and silicon oxide, however, a material for the second insulating layer ILF2 should not be limited thereto or thereby. The second insulating layer ILF2 may include the same material as that of the first insulating layer ILF1 or may include a material different from that of the first insulating layer ILF1.

The second insulating layer ILF2 may cover the first hole HO1. The second insulating layer ILF2 may be in contact with the first portion ML1-1. In other words, the second insulating layer ILF2 may cover the first portion ML1-1 of the first mesh line ML1 exposed through the first hole HO1. Accordingly, the second insulating layer ILF2 may electrically insulate the first mesh line ML1 from the bridge pattern BRP (refer to FIG. 10D) formed on the first portion ML1-1.

The second insulating layer ILF2 may be provided with a first contact hole CO1 through which a portion of the first line ML2a of the second mesh line ML2 is exposed and a second contact hole CO2 through which a portion of the second line ML2b of the second mesh line ML2 is exposed. The first contact hole CO1 and the second contact hole CO2 may pass through the second insulating layer ILF2.

The first contact hole CO1 may be formed to correspond to the second hole HO2, and the second contact hole CO2 may be formed to correspond to the third hole HO3. In other words, the first contact hole CO1 may overlap the second hole HO2, and the second contact hole CO2 may overlap the third hole HO3. The first contact hole CO1 may overlap the third portion ML2a-1 of the first line ML2a. The second contact hole CO2 may overlap the fifth portion ML2b-1 of the second line ML2b.

The first contact hole CO1 and the second contact hole CO2 may not overlap the first mesh line ML1. In other words, the first contact hole CO1 and the second contact hole CO2 may be spaced apart from each other with the first mesh line ML1 interposed therebetween when viewed in a plane.

When viewed in a plane, a size of the first contact hole CO1 may be equal to or smaller than a size of the second hole HO2. When viewed in a plane, a size of the second contact hole CO2 may be equal to or smaller than a size of the third hole HO3. However, the present embodiment should not be limited thereto or thereby.

In a case where the plural second holes HO2 are formed in one line-crossing area LCA, the first contact hole CO1 may also be provided in plural, and the first contact holes CO1 may respectively correspond to the second holes HO2, however, it should not be limited thereto or thereby. According to an embodiment of the present disclosure, the first contact hole CO1 having the size greater than the size of one second hole HO2 may overlap the plural second holes HO2, or the first contact holes CO1 each having the size smaller than the size of the second hole HO2 may overlap one second hole HO2.

In a case where the plural third holes HO3 are formed in one line-crossing area LCA, the second contact hole CO2 may also be provided in plural, and the second contact holes CO2 may respectively correspond to the third holes HO3, however, it should not be limited thereto or thereby. According to an embodiment of the present disclosure, the second contact hole CO2 having the size greater than the size of one third hole HO3 may overlap the plural third holes HO3, or the second contact holes CO2 each having the size smaller than that of the third hole HO3 may overlap one third hole HO3.

Figure 10D:
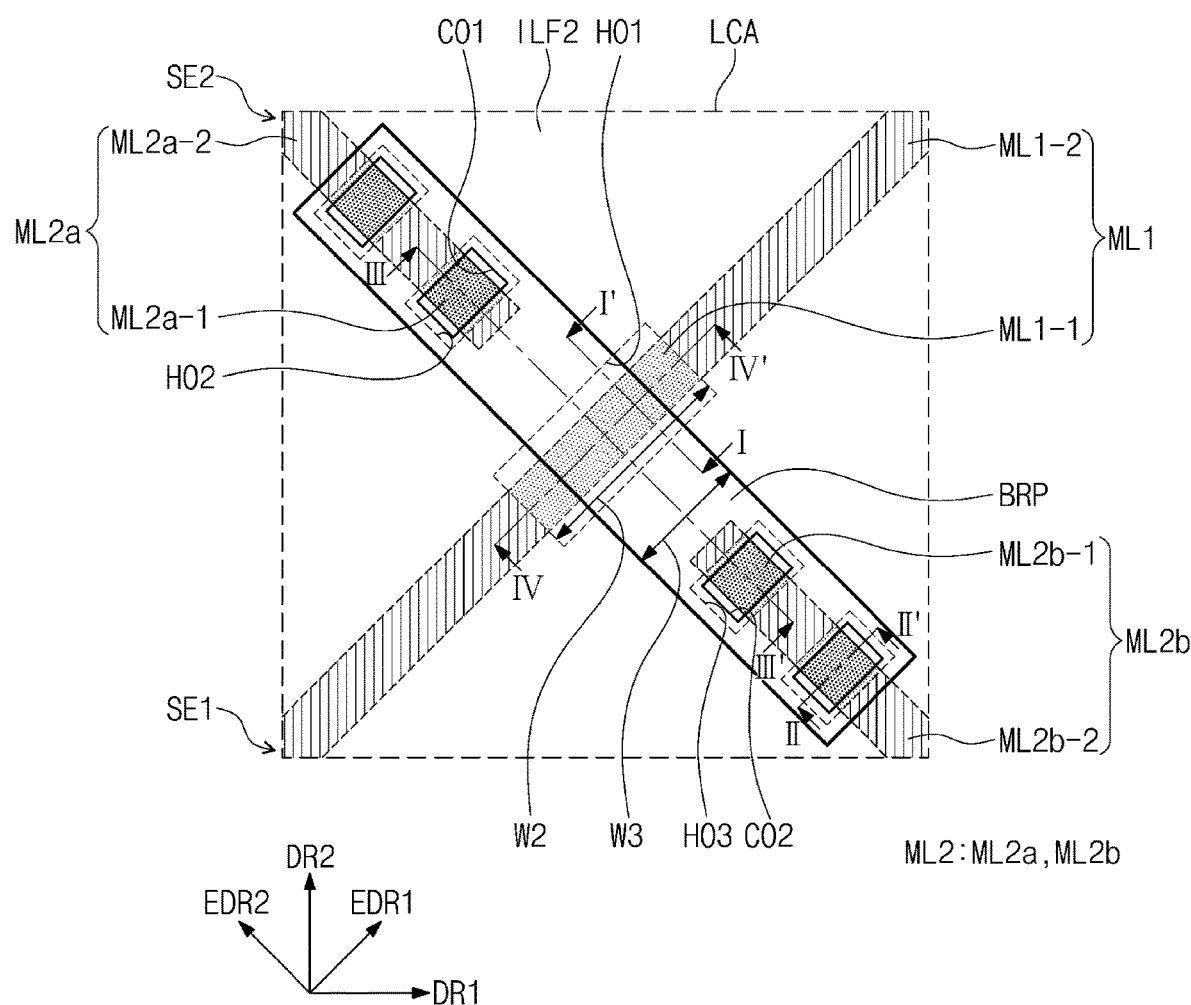

FIG. 10D shows the bridge pattern BRP disposed on the second insulating layer ILF2 of FIG. 10C in the line-crossing area LCA. For the convenience of explanation, portions of the first and second mesh lines ML1 and ML2 covered by the second insulating layer ILF2 and the bridge pattern BRP are also shown in FIG. 10D.

The bridge pattern BRP may be disposed on the second insulating layer ILF2 in the line-crossing area LCA. The bridge pattern BRP may cover the first contact hole CO1 and the second contact hole CO2. The bridge pattern BRP may be connected to the first line ML2a exposed through the first contact hole CO1 and the second line ML2b exposed through the second contact hole CO2 to electrically connect the first line ML2a to the second line ML2b. Accordingly, the bridge pattern BRP may electrically connect the second mesh lines ML2 physically disconnected by the first mesh line ML1.

When viewed in a plane, the bridge pattern BRP may overlap a portion of the first mesh line ML1. For example, the bridge pattern BRP may overlap the first portion ML1-1 of the first mesh line ML1 overlapping the first hole HO1 when viewed in a plane. The bridge pattern BRP overlapping the first portion ML1-1 in a plane may be spaced apart from the first portion ML1-1 of the first mesh line ML1 with the second insulating layer ILF2 interposed therebetween in a thickness direction.

When viewed in a plane, the first hole HO1 may have a shape extending in one direction. Referring to FIG. 10), the first hole HO1 may extend in the first cross direction EDR1 and may have a second width W2 in the first cross direction EDR1. The second width W2 of the first hole HO1 may be greater than a width W3 of the bridge pattern BRP overlapping the first hole HO1. Accordingly, the bridge pattern BRP may electrically connect the second mesh lines ML2 without disconnection, and a reliability of the input sensor ISP may be increased.

The bridge pattern BRP may include a conductive material. The bridge pattern BRP may include a transparent conductive material. As an example, the bridge pattern BRP may include a transparent conductive oxide, such as indium tin oxide (ITO), indium zinc oxide (IZO), zinc oxide (ZnO), indium zinc tin oxide (ITZO), or the like. In addition, the bridge pattern BRP may include a conductive polymer such as PEDOT, metal nanowire, graphene, or the like.

FIG. 10D shows one bridge pattern BRP, however, the input sensor ISP may include a plurality of bridge patterns BRP, the bridge patterns BRP may be disposed to correspond to the line-crossing areas LCA, respectively.

FIGS. 11A to 11D are cross-sectional views taken along lines I-I', II-II', III-III', and IV-IV' of FIG. 10D to show the input sensor ISP.

Figure 11A:
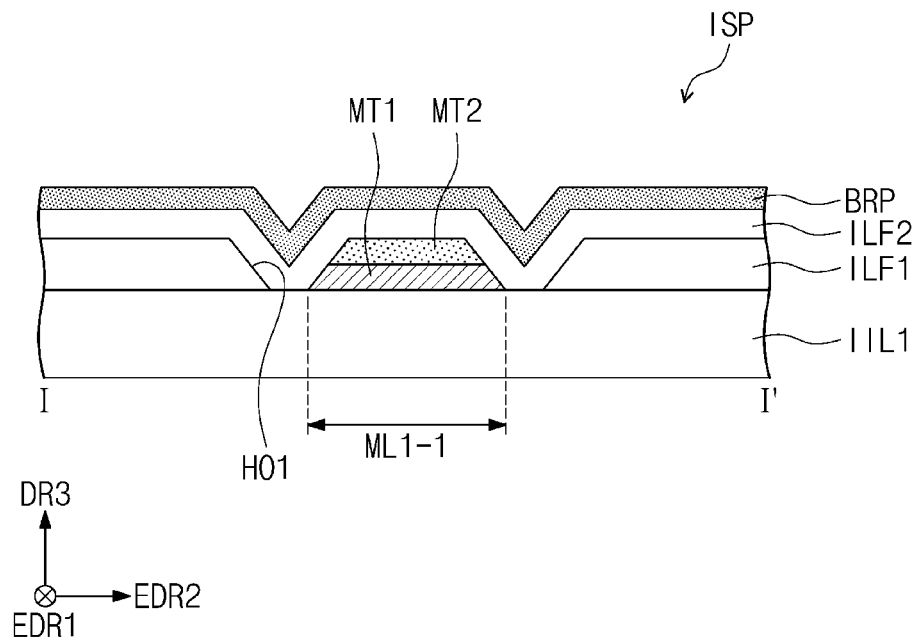
FIGS. 11A, 11B, 11C and 11D are cross-sectional views showing an input sensor according to an embodiment of the present disclosure.

FIG. 11A is a cross-sectional view taken along a line I-I' of FIG. 10D to show the input sensor ISP. FIG. 11A shows a cross-section of the first portion ML1-1 of the first mesh line ML1 overlapping the first hole HO1.

The first portion ML1-1 of the first mesh line ML1 may include a first metal layer MT1 and a second metal layer MT2. The first metal layer MT1 and the second metal layer MT2 may be sequentially stacked in the third direction DR3.

The first metal layer MT1 may include a material different from a material included in the second metal layer MT2. The first metal layer MT1 may include a metal material having a corrosion resistance. As an example, the first metal layer MT1 may include at least one of molybdenum, titanium, and alloys thereof, however, a material for the first metal layer MT1 should not be limited thereto or thereby.

The first metal layer MT1 may be disposed between the second metal layer MT2 and the base layer IIL1 and may protect the second metal layer MT2. The first metal layer MT1 may directly contact the second metal layer MT2. The first metal layer MT1 may prevent the second metal layer MT2 from being damaged due to scratches generated during processes and from being corroded due to moisture penetration.

The second metal layer MT2 may be disposed on the first metal layer MT1. The second metal layer MT2 may include a metal material having a low resistance, and a conductivity of the input sensor ISP may be increased by the second metal layer MT2. As an example, the second metal layer MT2 may include at least one of gold, silver, copper, aluminum, platinum, and alloys thereof, however, a material for the second metal layer MT2 should not be limited thereto or thereby.

The first insulating layer ILF1 may be disposed on the base layer IIL1. The first portion ML1-1 of the first mesh line ML1 may be exposed through the first hole HO1 passing through the first insulating layer ILF1.

The second insulating layer ILF2 may be disposed on the first insulating layer ILF1. The second insulating layer ILF2 may cover the first portion ML1-1 exposed through the first hole HO1. For example, the second insulating layer ILF2 may directly contact the first portion ML1-1 in the first hole HO1. The second insulating layer ILF2 may be disposed between the bridge pattern BRP and the first portion ML1-1 in the third direction DR3 and may electrically insulate the first mesh line ML1 from the bridge pattern BRP.

The bridge pattern BRP may be disposed on the second insulating layer ILF2. The bridge pattern BRP may overlap the first portion ML1-1 of the first mesh line ML1. The first portion ML1-1 overlapping the bridge pattern BRP may have a two metal layer structure. Accordingly, the portion of the bridge pattern BRP overlapping the first mesh line ML1 may be prevented from being disconnected, and the reliability of the input sensor ISP may be increased. This will be described in detail later.

Figure 11B:
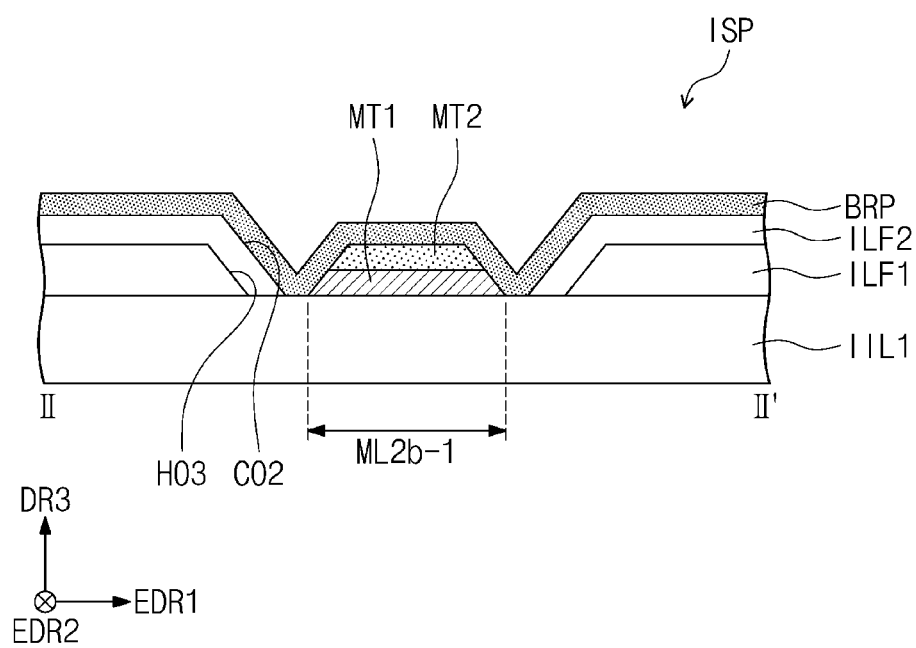

FIG. 11B is a cross-sectional view taken along a line II-II' of FIG. 10D to show the input sensor ISP. FIG. 11B shows a cross-section of the fifth portion ML2b-1 of the second line ML2b of the second mesh lines ML2 overlapping the third hole HO3 and the second contact hole CO2. Details on the fifth portion ML2b-1 of the second line ML2b described with reference to FIG. 11B may be equally applied to the third portion ML2a-1 of the first line ML2a.

The fifth portion ML2b-1 of the second line ML2b may include the first metal layer MT1 and the second metal layer MT2. The third portion ML2a-1 of the first line ML2a may also include the first metal layer MT1 and the second metal layer MT2, which are sequentially stacked. Details on the first metal layer MT1 and the second metal layer MT2 are the same as those described with reference to FIG. 11A.

The first insulating layer ILF1 and the second insulating layer ILF2 may be sequentially stacked on the base layer IIL1. The fifth portion ML2b-1 of the second lines ML2b may be exposed through the third hole HO3 formed through the first insulating layer ILF1. The second contact hole CO2 formed through the second insulating layer ILF2 may overlap the third hole HO3, and the fifth portion ML2b-1 may be exposed through the second contact hole CO2. As shown in FIG. 11B, the second contact hole CO2 is smaller than the third hole HO3.

The bridge pattern BRP may be disposed on the second insulating layer ILF2. The bridge pattern BRP may overlap the fifth portion ML2b-1 of the second line ML2b and may be electrically connected to the fifth portion ML2b-1. The bridge pattern BRP connected to the fifth portion ML2b-1 may also be electrically connected to the third portion ML2a-1 of the first line ML2a. Accordingly, the bridge pattern BRP may electrically connect the first line ML2a to the second line ML2b spaced apart from the first line ML2a. The fifth portion ML2b-1 overlapping the bridge pattern BRP may have a two metal layer structure. Accordingly, the disconnection of the portion of the bridge pattern BRP may be prevented, and the reliability of the input sensor ISP may be increased.

Figure 11C:
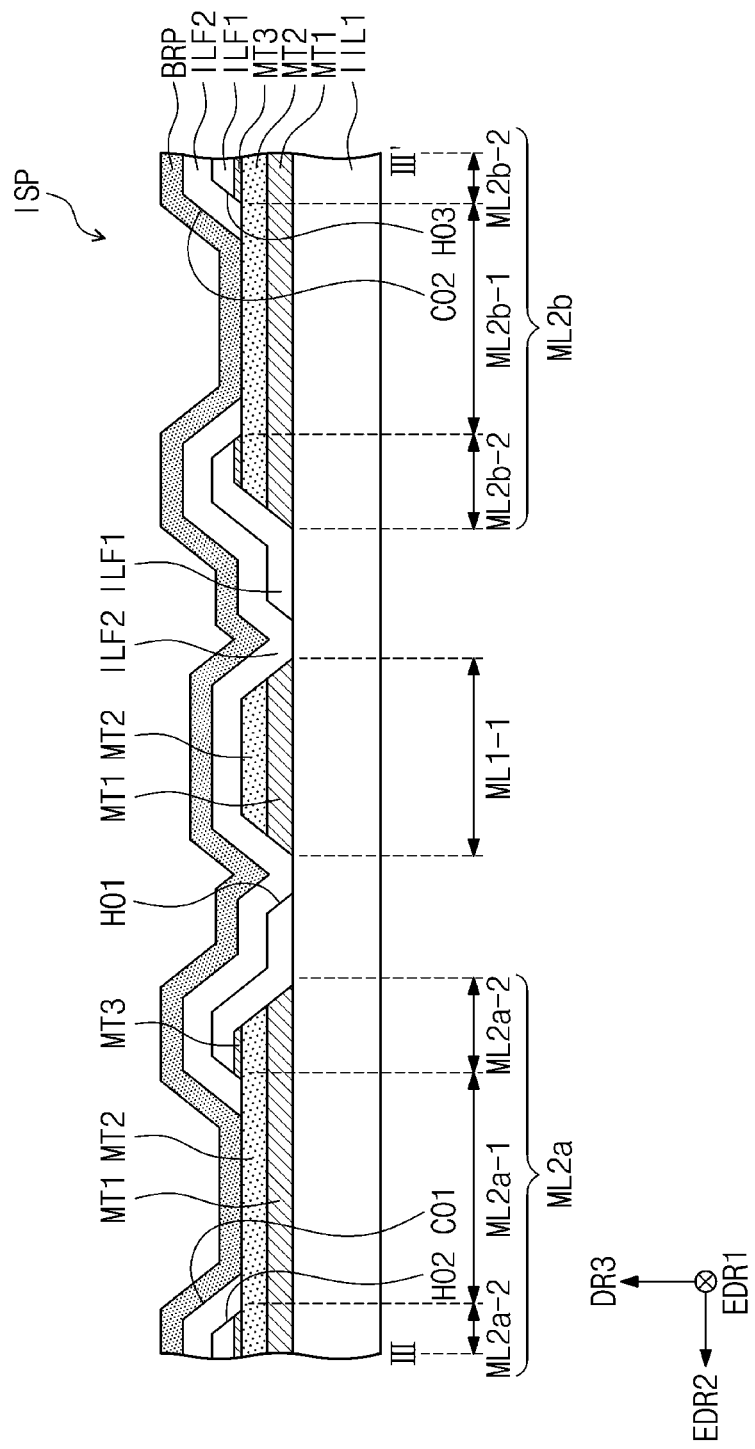

FIG. 11C is a cross-sectional view taken along a line III-III' of FIG. 10D to show the input sensor ISP. FIG. 11C shows a cross-section of the first portion ML1-1 of the first mesh line ML1, the first line ML2a, and the second line ML2b.

Referring to FIG. 11C, the first portion ML1-1 of the first mesh line ML1 overlapping the first hole HO1 may include the first metal layer MT1 and the second metal layer MT2. Details on the first metal layer MT1 and the second metal layer MT2 are the same as those described with reference to FIG. 11A.

The third portion ML2a-1 of the first line ML2a overlapping the second hole HO2 and the first contact hole CO1 may include the first and second metal layers MT1 and MT2. The fourth portion ML2a-2 of the first line ML2a that does not overlap the second hole HO2 and the first contact hole CO1 may include the first metal layer MT1, the second metal layer MT2, and a third metal layer MT3. For example, the third metal layer MT3 may be stacked on the second metal layer MT2. Accordingly, the first line ML2a of the second mesh lines ML2, which is formed in an integral shape, may have different multi-layer structures depending on its areas. For example, the portion of the first line ML2a overlapping the second hole HO2 may have the two metal layer structure, and the other portion of the first line ML2a that does not overlap the second hole HO2 may have the three metal layer structure.

The fifth portion ML2b-1 of the second line ML2b overlapping the third hole HO3 and the second contact hole CO2 may include the first and second metal layers MT1 and MT2, and the sixth portion ML2b-2 that does not overlap the third hole HO3 and the second contact hole CO2 may include the first, second, and third metal layers MT1, MT2, and MT3. Accordingly, similar to the first line ML2a, the second line ML2b of the second mesh lines ML2, which is formed in an integral shape, may have different multi-layer structures depending on its areas.

The third metal layer MT3 may include the same material as that of the first metal layer MT1. Accordingly, processes of depositing the metal layers may be simplified. As an example, the third metal layer MT3 may include at least one of molybdenum, titanium, and alloys thereof, however, a material for the third metal layer MT3 should not be limited thereto or thereby.

The third metal layer MT3 may be disposed on the second metal layer MT2 and may prevent a hillock from occurring in the second metal layer MT2. The term "hillock" as used herein may indicate a phenomenon in which a portion of the second metal layer MT2 protrudes upward due to a foreign substance infiltrating the second metal layer MT2 or a compressive stress in the process of forming the second metal layer MT2. The third metal layer MT3 may prevent the hillock from occurring in the second metal layer MT2, and thus, the reliability of the input sensor ISP may be increased.

The third metal layer MT3 may have a thickness smaller than a thickness of the first metal layer MT1 and a thickness of the second metal layer MT2. Accordingly, the third metal layer MT3 may not significantly increase the resistance of the input sensor ISP. The third metal layer MT3 may be positioned between the second metal layer MT2 and the first insulating layer ILF1.

The first insulating layer ILF1 and the second insulating layer ILF2 may be sequentially stacked on the base layer IIL1. The first, second, and third holes HO1, HO2, and HO3 formed through the first insulating layer ILF1 may expose the second metal layer MT2 of the first portion ML1-1 of the first mesh line ML1 and the second metal layer MT2 of the portion of the second mesh lines ML2, e.g., the third portion ML2a-1 and the fifth portion ML2b-l. The first insulating layer ILF1 may cover the third metal layer MT3.

The second insulating layer ILF2 may cover the second metal layer MT2 of the first portion ML1-1. The first and second contact holes CO1 and CO2 formed through the second insulating layer ILF2 may respectively overlap the second and third holes HO2 and HO3. Accordingly, the second metal layers MT2 of the third portion ML2a-1 and the fifth portion ML2b-1 may be exposed.

The bridge pattern BRP may be disposed on the second insulating layer ILF2 to overlap the third portion ML2a-1 of the first line ML2a and the fifth portion ML2b-1 of the second line ML2b. In other words, the bridge pattern BRP may be in direct contact with the third portion ML2a-l of the first line ML2a and the fifth portion ML2b-1 of the second line ML2b. The bridge pattern BRP may electrically connect the second mesh lines ML2 spaced apart from each other with the first mesh line ML1 interposed therebetween and may be electrically insulated from the first mesh line ML1 by the second insulating layer ILF2. Accordingly, the first mesh line ML and the second mesh lines ML2, which overlap one bridge pattern BRP, may be electrically insulated from each other.

Figure 11D:
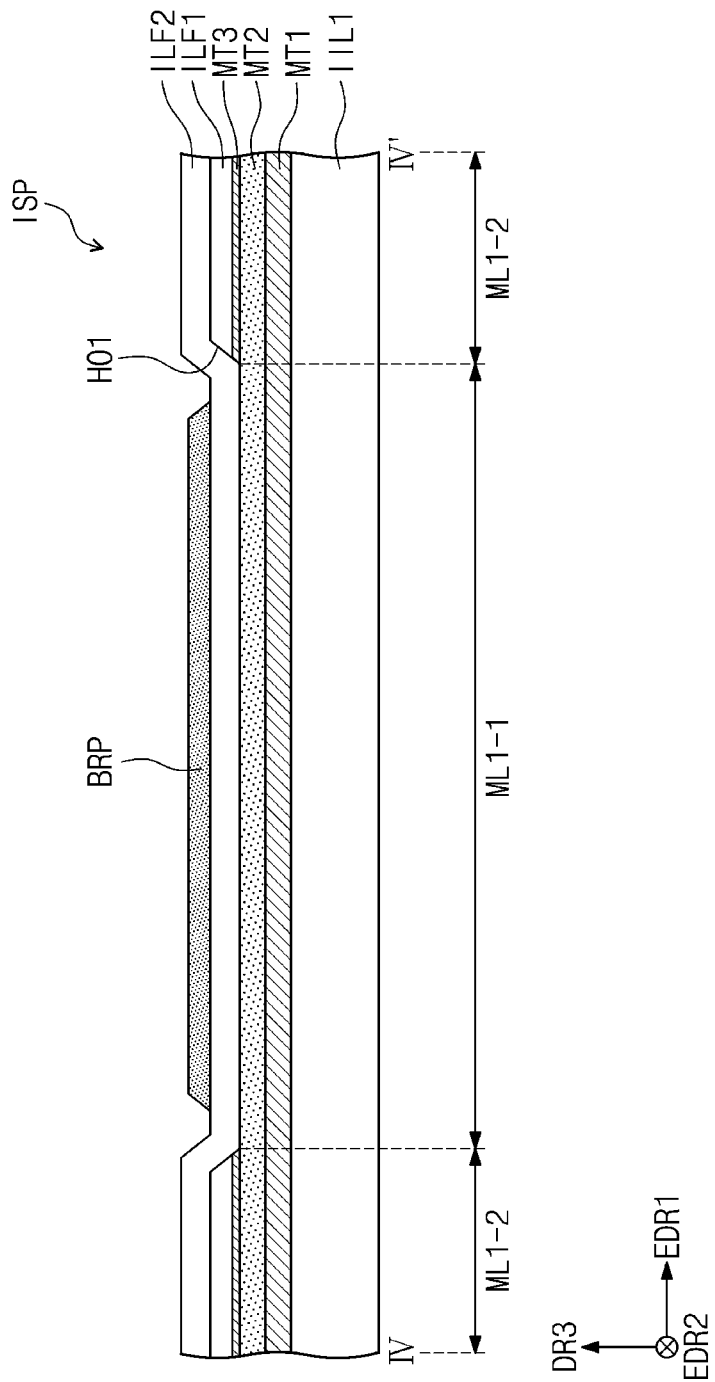

FIG. 11D is a cross-sectional view taken along a line IV-IV' to show the input sensor ISP. FIG. 11D shows a cross-section of the first mesh line ML1.

Referring to FIG. 11D, the first portion ML1-1 of the first mesh line ML1, which overlaps the first hole HO1, may include the first and second metal layers MT1 and MT2. The second portion ML1-2 of the first mesh line ML1, which does not overlap the first hole HO1, may include the first, second, and third metal layers MT1, MT2, and MT3. Accordingly, the first mesh line ML1 formed in an integral shape may have different multi-layer structures depending on its areas. For example, the first portion ML1-1 of the first mesh line ML1, which overlaps the first hole HO1, may have the two metal layer structure, and the second portion ML1-2 of the first mesh line ML1, which does not overlap the first hole HO1, may have the three metal layer structure. Details on the first, second, and third metal layers MT1, MT2, and MT3 are the same as those described with reference to FIGS. 11A to 11C.

The first insulating layer ILF1 and the second insulating layer ILF2 may be sequentially stacked on the base layer IIL1. The first insulating layer ILF1 may cover the third metal layer MT3 of the second portion ML1-2. The second metal layer MT2 of the first portion ML1-1 may be exposed through the first hole HO1 formed through the first insulating layer ILF1. The second insulating layer ILF2 may cover the first mesh lines ML. For example, the second insulating layer ILF2 may directly contact the second metal layer MT2 of the first portion ML1-1 exposed through the first hole HO1.

The bridge pattern BRP may be disposed on the second insulating layer ILF2 to overlap the first portion ML1-1 of the first mesh line ML1 having the two metal layer structure. As the portion of the first mesh lines ML1 overlapping the bridge pattern BRP has the two-layer structure, the disconnection of the bridge pattern BRP may be prevented, and the reliability of the input sensor ISP may be increased.

The first and second mesh lines ML1 and ML2 may be formed by sequentially depositing the first metal layer MT1, the second metal layer MT2, and the third metal layer MT3 and etching the first metal layer MT1, the second metal layer MT2, and the third metal layer MT3. The second metal layer MT2 and the third metal layer MT3, which have different materials from each other, may have different etching rates under the same etching conditions. Accordingly, a tip portion that protrudes more outward than the second metal layer MT2 in a horizontal direction may be formed in the third metal layer MT3. Accordingly, the bridge pattern BRP disposed to overlap the tip portion of the third metal layer MT3 may be disconnected by the tip portion.

According to an embodiment of the present disclosure, the first hole HO1 may be formed through the first insulating layer ILF1 to overlap the area in which the bridge pattern BRP is disposed and the portion of the first mesh line ML1. The first hole HO1 may be formed through a process of etching the first insulating layer ILF1. In the process of etching the first hole HO1, a portion of the third metal layer MT3 of the first mesh line ML1 may be etched together with the first insulating layer ILF1. Accordingly, the portion of the third metal layer MT3 of the first mesh line ML1, which overlaps the area in which the bridge pattern BRP is formed, may be removed, and the disconnection of the bridge pattern BRP, which is caused by the tip portion of the third metal layer MT3, may be prevented. Accordingly, the reliability of the input sensor ISP may be increased.

An embodiment of the present disclosure provides an electronic device ED including: a display panel DP; and an input sensor ISP disposed on the display panel DP, wherein the input sensor ISP is configured to sense an external input, the input sensor ISP including: a first sensing electrode SE1 including a plurality of first mesh lines ML1; and a second sensing electrode SE2 including a plurality of second mesh lines ML2 insulated from the first mesh lines ML1 and a bridge pattern BRP overlapping the first mesh lines ML1, and wherein the first mesh lines ML1 include a plurality of metal layers MT1-MT2, the first mesh lines M L include a first portion ML1-1 overlapping the bridge pattern BRP and a second portion ML1-2 that does not overlap the bridge pattern BRP, wherein the first portion ML1-1 include an outermost metal layer MT2 including a material different from a material of an outermost metal layer MT3 of the second portion ML1-2, and wherein the outermost layers (MT2 and MT3) of the first and second portions (ML1-1 and ML1-2) are adjacent to a display surface IS of the electronic device ED.

Figure 12A:
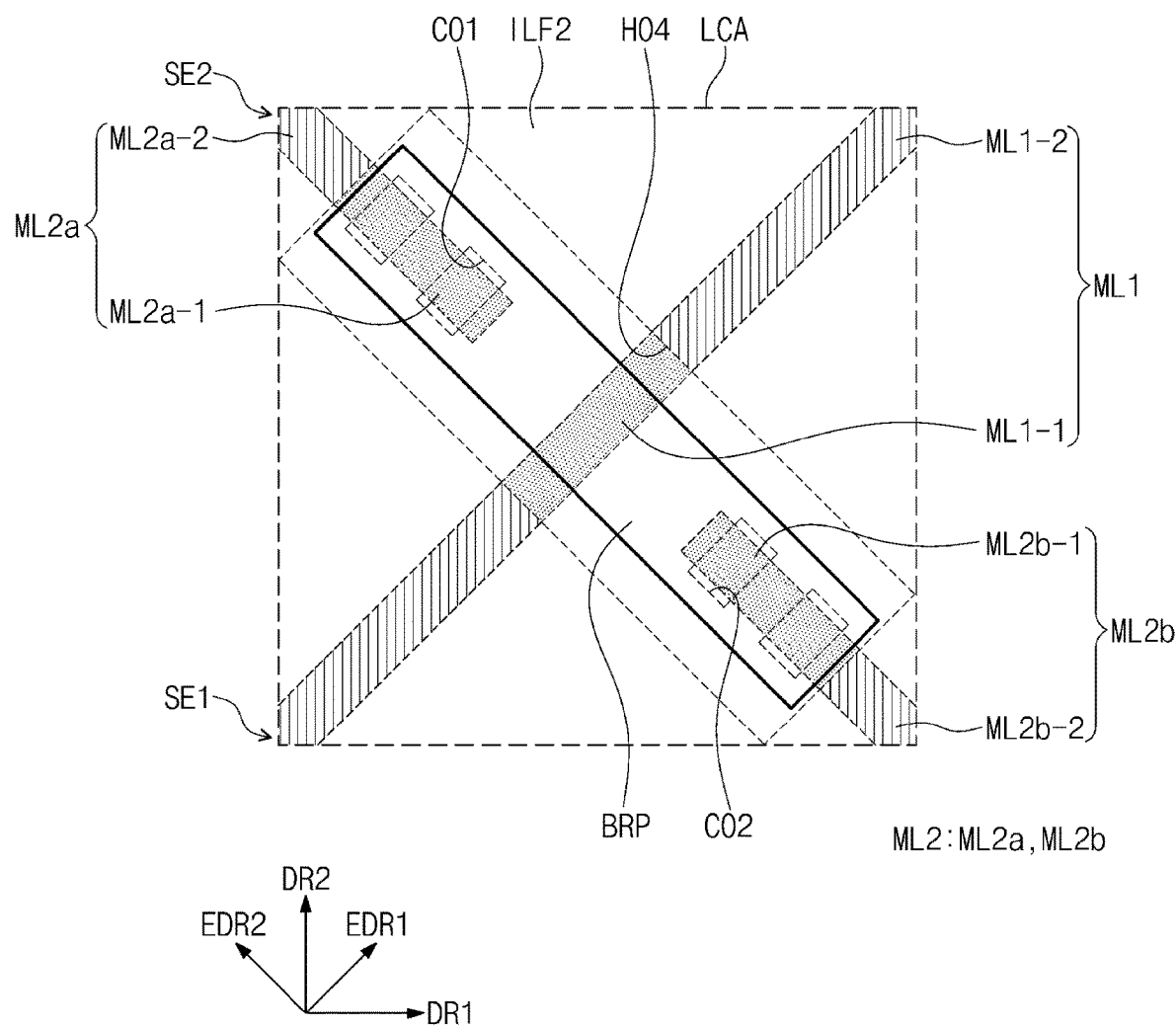
FIGS. 12A, 12B and 12C are enlarged plan views showing an input sensor according to an embodiment of the present disclosure.
Figure 12B:
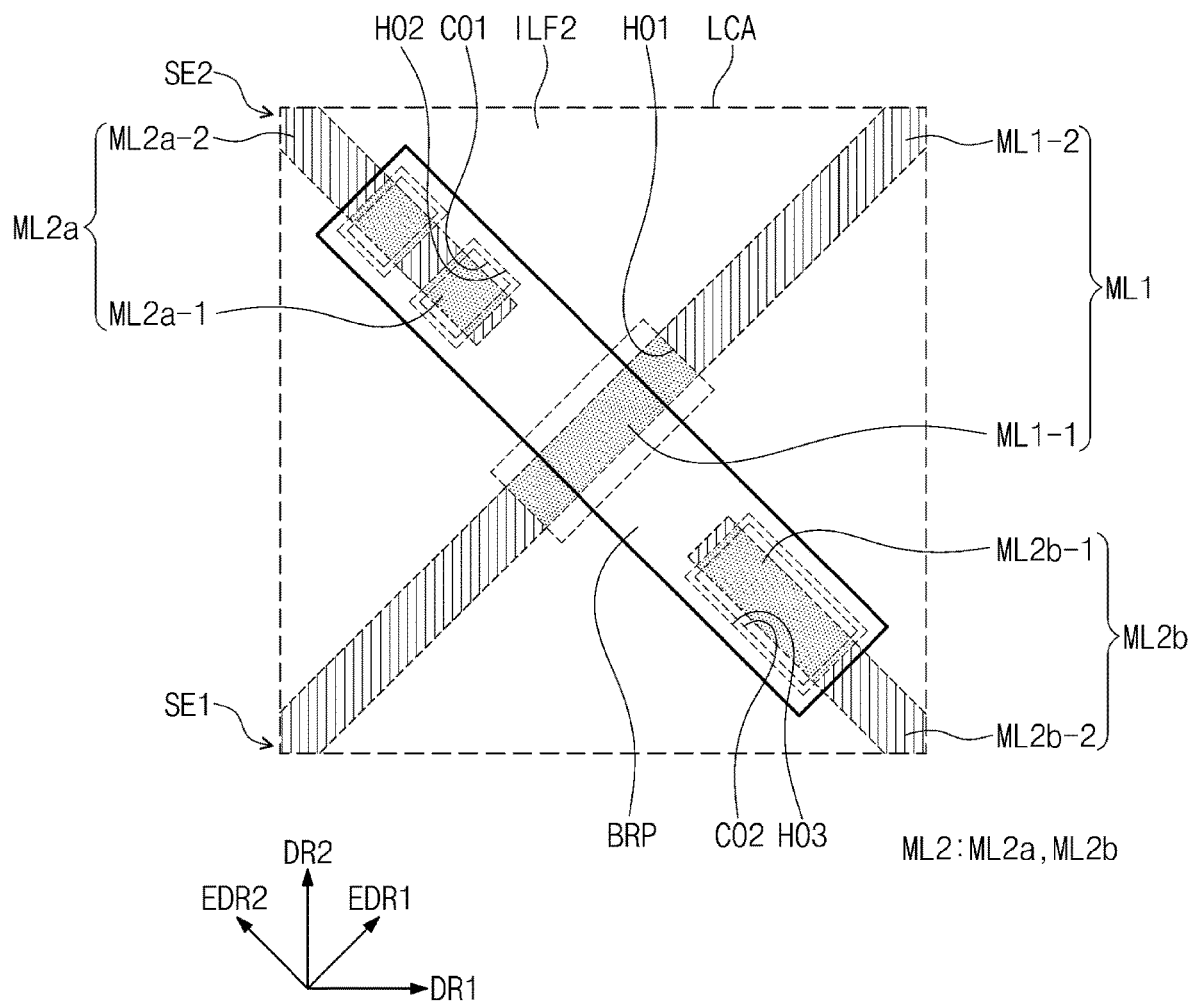
Figure 12C:
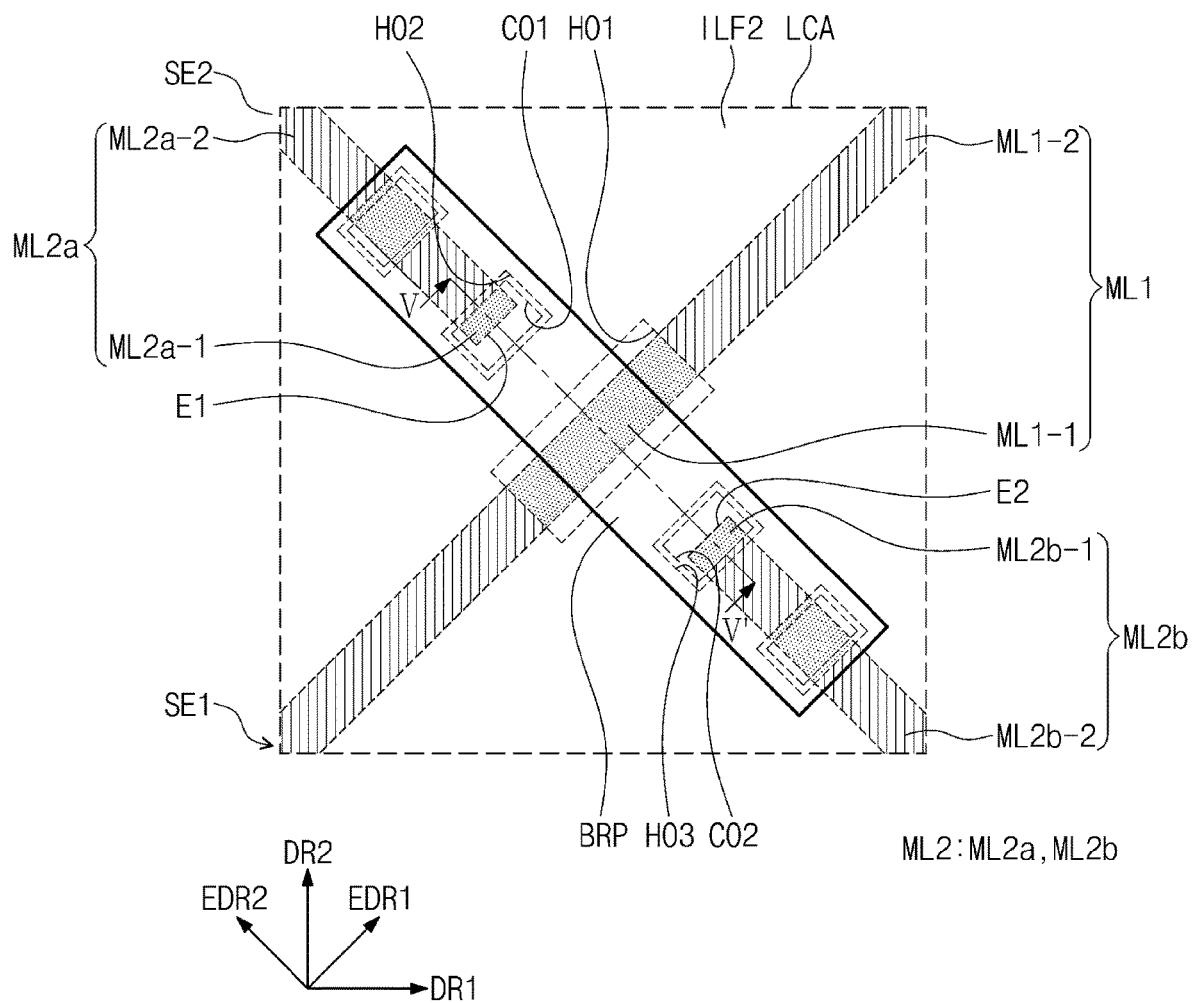
Figure 13:
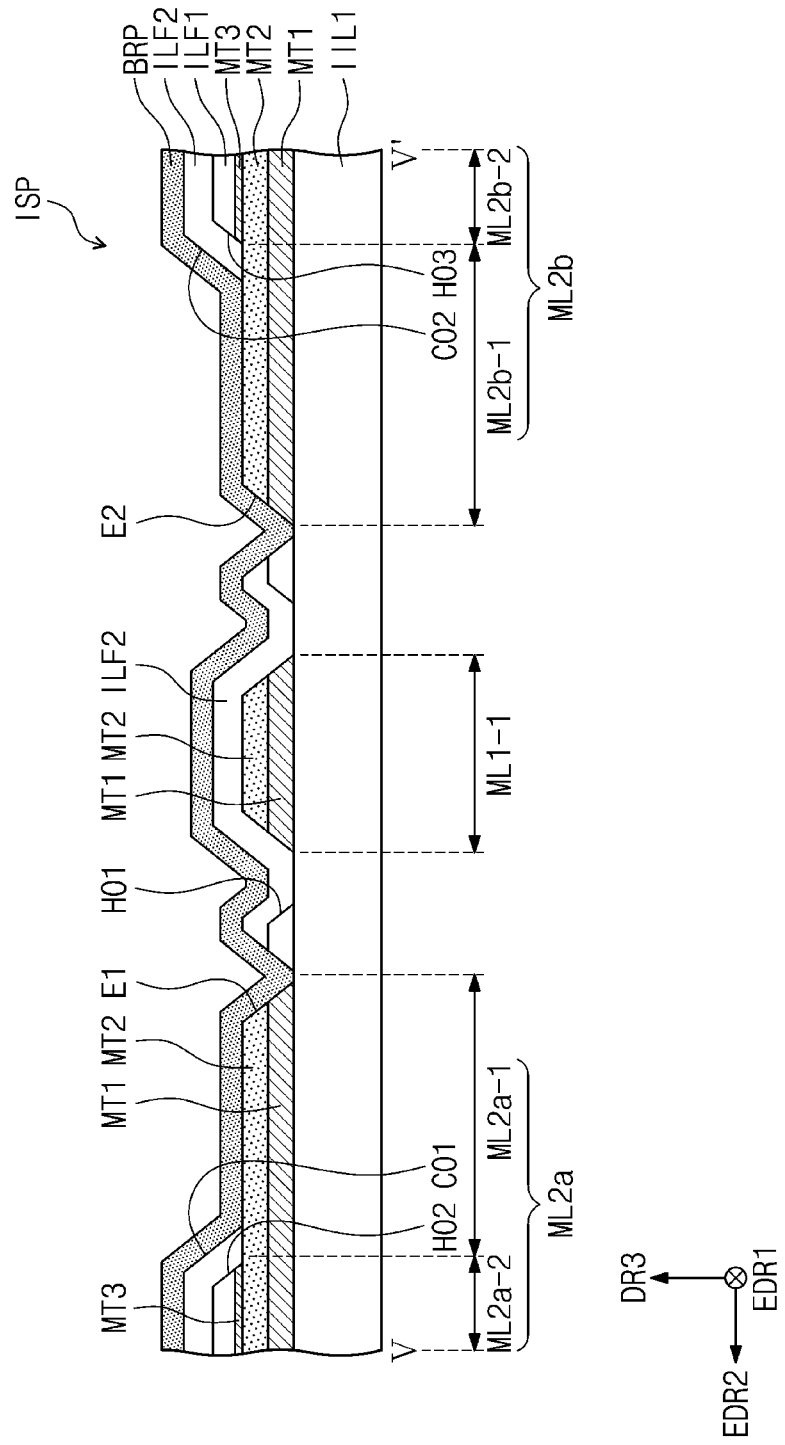
FIG. 13 is a cross-sectional view showing an input sensor according to an embodiment of the present disclosure.

FIGS. 12A to 12C are enlarged plan views showing input sensors corresponding to one line-crossing area LCA. FIG. 13 is a cross-sectional view taken along a line V-V' of FIG. 12C to show an input sensor ISP. FIGS. 12A to 12C show first, second, and third holes HO1, HO2, and HO3 formed in one line-crossing area LCA with various shapes. Embodiments of the present disclosure shown in FIGS. 12A to 12C have substantially the same configurations as those of the above-described input sensor ISP. Hereinafter, descriptions will be focused on configurations different from those of the above-described input sensor ISP.

Referring to FIG. 12A, a first hole HO1, a second hole HO2, and a third hole HO3 may be connected to each other to be provided as one large hole (hereinafter, referred to as a fourth hole HO4). The fourth hole HO4 may overlap a portion of the first mesh line ML1 and a portion of each of the first line ML2a and the second line ML2b of the second mesh line ML2.

The portion of the first mesh line ML1, which overlaps the fourth hole HO4, may be referred to as the first portion ML1-1, and a portion of the first mesh line ML1, which does not overlap the fourth hole HO4, may be referred to as the second portion ML1-2. The portion of the first line ML2a overlapping the fourth hole HO4 may be referred to as the third portion ML2a-1, and a portion of the first line ML2a, which does not overlap the fourth hole HO4, may be referred to as the fourth portion ML2a-2. The portion of the second line ML2b overlapping the fourth hole HO4 may be referred to as the fifth portion ML2b-1, and a portion of the second line ML2b, which does not overlap the fourth hole HO4, may be referred to as the sixth portion ML2b-2.

The first portion ML1-1 overlapping the fourth hole HO4 may have the two metal layer structure, and the second portion ML1-2 that does not overlap the fourth hole HO4 may have the three metal layer structure. The third portion ML2a-1 of the first line ML2a and the fifth portion ML2b-1 of the second line ML2b, which overlap the fourth hole HO4, may have the two metal layer structure, and the fourth portion ML2a-2 of the first line ML2a and the sixth portion ML2b-2 of the second line ML2b, which do not overlap the fourth hole HO4, may have the three metal layer structure.

When viewed in a plane, a size of the fourth hole HO4 may be greater than a size of the bridge pattern BRP. As the fourth hole HO4 is formed to have the size greater than the size of the bridge pattern BRP, the disconnection of the bridge pattern BRP, which occurs in the area overlapping the first mesh lines ML1, may be effectively prevented.

The first contact hole CO1 and the second contact hole CO2, which are formed through the second insulating layer ILF2, may have substantially the same shape as that of the contact holes shown in FIG. 10D. When viewed in a plane of one line-crossing area LCA, each of the first contact hole CO1 and the second contact hole CO2 may be provided in plural, and the first contact holes CO1 and the second contact holes CO2 may overlap one fourth hole HO4. Each of the first contact holes CO1 may overlap the portion of the third portion ML2a-1 of the first line ML2a, and each of the second contact holes CO2 may overlap the portion of the fifth portion ML2b-1 of the second line ML2b, however, they should not be limited thereto or thereby. According to an embodiment of the present disclosure, each of the first contact hole CO1 and the second contact hole CO2 may be provided as a single hole in one line-crossing area LCA, and one first contact hole CO1 and one second contact hole CO2 may overlap the fourth hole 1104.

The bridge pattern BRP may be connected to each of the portion of the third portion ML2a-l and the portion of the fifth portion ML2b-1, which are exposed through the fourth hole HO4, the first contact hole CO1, and the second contact hole CO2, and the bridge pattern BRP may electrically connect the first line ML2a to the second line ML2b spaced apart from the first line ML2a.

Referring to FIG. 12B, a first hole HO1 may have substantially the same shape as that of the first hole HO) shown in FIG. 10D. A second hole HO2 may be provided in plural, and the second holes 1102 may be provided to correspond to one line-crossing area LCA. A third hole HO3 may be provided as a single hole, and one third hole HO3 may be provided to correspond to one line-crossing area LCA.

When viewed in a plane, one second hole HO2 may have a size smaller than a size of the third hole HO3. A sum of sizes of the second holes HO2 may be substantially the same as or similar to the size of the third hole HO3. In addition, the sum of sizes of the second holes HO2 may be smaller than the size of the third hole HO3. According to an embodiment of the present disclosure, a hole with a relatively small area may be provided in a larger number than a hole with a relatively large area. However, the input sensor of FIG. 12B is just one example and should not be limited thereto or thereby.

A first contact hole CO1 may be provided in plural to correspond to the second holes HO2, and the first contact holes CO1 may respectively overlap the second holes 1102. One second contact hole CO2 may be provided to correspond to one third hole HO3, and the one second contact hole CO2 may overlap one third hole HO3, however, it should not be limited thereto or thereby. According to an embodiment of the present disclosure, the second contact hole CO2 may be provided in plural, and each of the second contact holes CO2 may overlap one third hole HO3.

Referring to FIG. 12C, a first hole HO1 may have substantially the same shape as that of the first hole HO1 shown in FIG. 10D. Each of a second hole HO2 and a third hole HO3 may be provided in plural to correspond to one line-crossing area LCA.

Among the second holes HO2, a second hole HO2 formed nearest to a first mesh line ML may overlap an end E1 of a first line ML2a, and among the third holes HO3, a third hole HO3 formed nearest to the first mesh line ML1 may overlap an end E2 of a second line ML2b. In other words, the end E1 of the first line ML2a may be exposed through the second hole HO2 of a first insulating layer ILF1, and the end E2 of the second line ML2b may be exposed through the third hole HO3. In addition, the second hole HO2 formed nearest to the first mesh line ML1 may extend beyond the end E1 of the first line ML2a, and the third hole HO3 formed nearest to the first mesh line ML1 may overlap the end E2 of the second line ML2b.

A first contact hole CO1 of a second insulating layer ILF2 may be provided in plural, and the first contact holes CO1 may respectively correspond to the second holes HO2. Among the first contact holes CO1, a first contact hole CO1 nearest to the first mesh line ML1 may overlap the second hole HO2 to expose the end E1 of the first line ML2a. Similarly, a second contact hole CO2 of the second insulating layer ILF2 may be provided in plural, and the second contact holes CO2 may respectively overlap the third holes HO3. Among the second contact holes CO2, a second contact hole CO2 nearest to the first mesh line ML1 may overlap the third hole HO3 to expose the end E2 of the second line ML2b. In this case, the first contact hole CO may extend beyond the end E1 of the first line ML2a, and the second contact hole CO2 may extend beyond the end E2 of the second line ML2b.

Referring to FIG. 13, the end E1 of the first line ML2a may be spaced apart from the end E2 of the second line ML2b with the first mesh line ML1 interposed therebetween in the second cross direction EDR2. The end E1 of the first line ML2a may correspond to ends of the first and second metal layers MT1 and MT2 of the first line ML2a, and the end E2 of the second line ML2b may correspond to ends of the first and second metal layers MT1 and MT2 of the second line ML2b.

The end E1 of the first line ML2a, which is exposed through the second hole HO2 and the first contact hole CO1, may be in contact with the bridge pattern BRP. The end E2 of the second line ML2b, which is exposed through the third hole HO3 and the second contact hole CO2, may be in contact with the bridge pattern BRP. The first line ML2a and the second line ML2b may be electrically connected to each other through the bridge pattern BRP, however, they should not be limited thereto or thereby. As shown in FIG. 11C, the ends of the first line ML2a and the second line ML2b may correspond to ends of first, second, and third metal layers MT1, MT2, and MT3 and may be covered by the first insulating layer ILF1.

Figure 14:
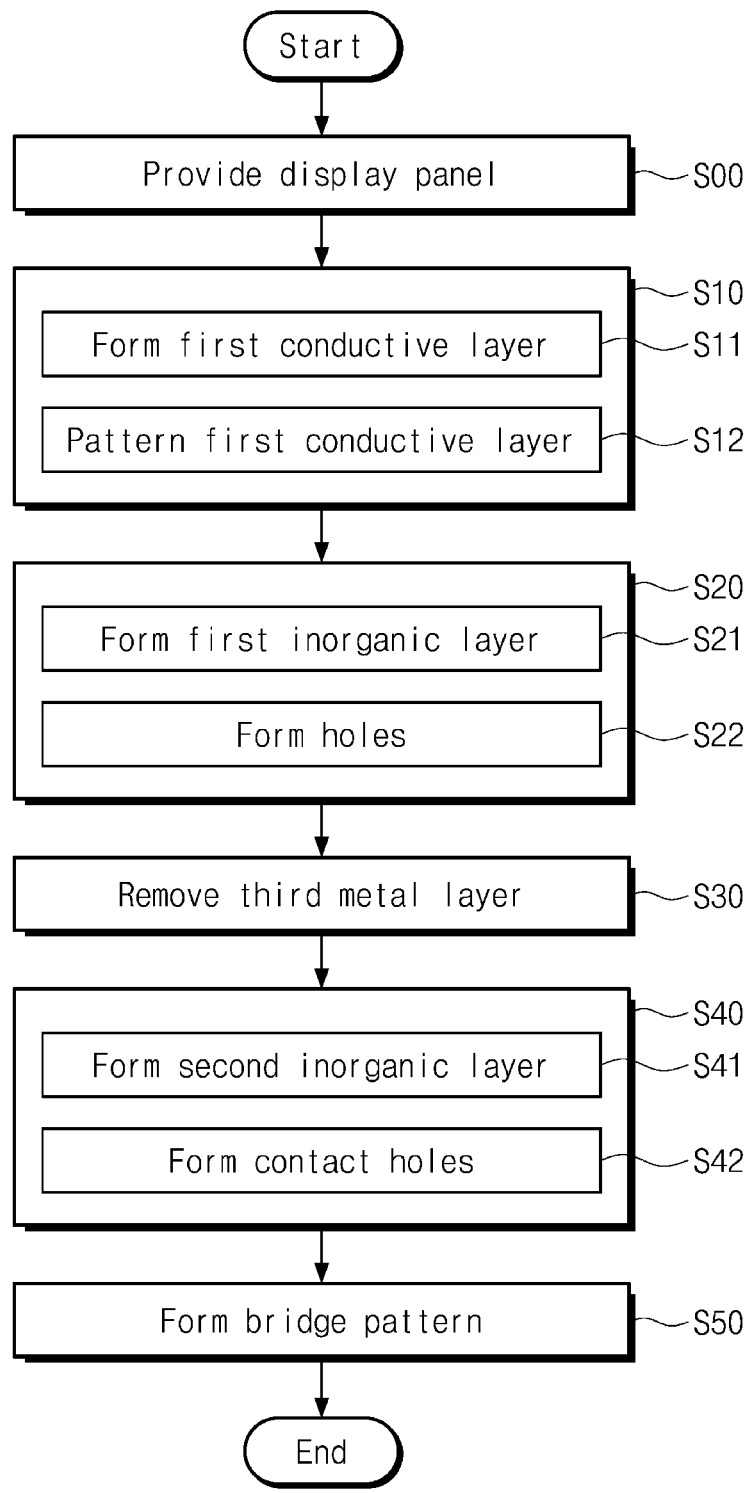
FIG. 14 is a flowchart showing a method of manufacturing an electronic device according to an embodiment of the present disclosure.

FIG. 14 is a flowchart showing a method of manufacturing an electronic device including a display panel and an input sensor according to an embodiment of the present disclosure. Details on the components described above will be applied to the electronic device manufactured by the method of FIG. 14, and hereinafter, each process of the manufacturing method will be described with reference to accompanying drawings.

Referring to FIG. 14, the manufacturing method of the electronic device may include providing the display panel (S00), forming the first mesh lines and the second mesh lines (S10), forming the first insulating layer (S20), removing the third metal layer (S30), forming the second insulating layer (S40), and forming the bridge pattern (S50).

The forming of the first mesh lines and the second mesh lines (S10) may include forming a first conductive layer (S11) and patterning the first conductive layer (S12). The first conductive layer may include a plurality of metal layers. As an example, the first conductive layer may be formed by sequentially depositing the first to third metal layers through a sputtering method.

A mask may be provided on the first conductive layer, and the first conductive layer may be patterned to form the first mesh lines and the second mesh lines electrically insulated from the first mesh lines. The first mesh lines may form the above-described first sensing electrode, and the second mesh lines may form the above-described second sensing electrode.

The forming of the first insulating layer (S20) may include forming a first inorganic layer on the first mesh lines and the second mesh lines (S21) and forming the holes through which the portions of the first mesh lines and the second mesh lines are exposed (S22). The first inorganic layer may be formed by depositing the inorganic material to cover the first mesh lines and the second mesh lines.

The holes may be formed to correspond to areas overlapping the bridge pattern formed in the subsequent process and to expose the portions of the first mesh lines and the portions of the second mesh lines. The holes may be formed by etching portions of the first inorganic layer to penetrate the first inorganic layer. The first inorganic layer through which the holes are formed may correspond to the first insulating layer. The holes may correspond to the first to third holes.

The removing of the third metal layer (S30) may correspond to the process of removing the portion of the third metal layers of the mesh lines, which correspond to the holes of the first insulating layer. The removing of the third metal layer (S30) may be substantially simultaneously performed with the etching of the first inorganic layer to form the holes.

In other words, the third metal layer may be etched together with the first inorganic layer in the etching of the first inorganic layer. Accordingly, the third metal layer may be etched in areas overlapping the holes formed through the first inorganic layer, and thus, the portion of the second metal layer disposed under the third metal layer may be exposed, however, it should not be limited thereto or thereby. According to an embodiment of the present disclosure, the removing of the third metal layer (S30) may include etching the portion of the third metal layer under an etching condition different from that of the first inorganic layer after the etching of the first inorganic layer.

The portions of the third metal layers of the first and second mesh lines may be removed through the removing of the third metal layer (S30) in the area in which the bridge pattern is formed. In the process of forming the mesh lines, a tip portion protruding more outward than the second metal layer may be formed in the third metal layer. However, the tip structure of the third metal layer may be removed through the removing of the third metal layer (S30) in the area in which the bridge pattern is formed, and the disconnection of the bridge pattern may be prevented.

The forming of the second insulating layer (S40) may include forming a second inorganic layer on the first insulating layer (S41) and forming the contact holes (S42). The second inorganic layer may be formed by depositing the inorganic material on the first insulating layer through which the holes are formed. The second inorganic layer may be in contact with the first and second mesh lines exposed through the holes.

The contact holes may be formed to expose the portions of the mesh lines electrically connected to each other by the bridge pattern formed in the subsequent process. As an example, the bridge pattern may be used to connect the second mesh lines electrically insulated from each other, and the contact holes may be formed to correspond to the holes formed overlapping the second mesh lines among the holes of the first insulating layer. The second inorganic layer through which the contact holes are formed may correspond to the second insulating layer. The contact holes may correspond to the first and second contact holes.

The forming of the bridge pattern (S50) may include depositing a conductive material on the second insulating layer to form the bridge pattern. The bridge pattern may be formed by selectively depositing the conductive material in the area in which the bridge pattern is formed, however, it should not be limited thereto or thereby. According to an embodiment of the present disclosure, the bridge pattern may be formed by entirely depositing a second conductive layer on the second insulating layer and patterning the second conductive layer.

FIGS. 15A to 18 are cross-sectional views showing processes of the manufacturing method of the electronic device. The cross-sectional views shown in FIGS. 15A to 18 show processes of the manufacturing method corresponding to the cross-section shown in FIG. 11C.

FIGS. 15A to 18 schematically show only the cross-section of the input sensor ISP formed on the display panel DP (refer to FIG. 6) of the display module DM (refer to FIG. 6) in each manufacturing process. The base layer IIL1 shown in FIGS. 15A to 18 may be a layer disposed directly on an upper surface of the display panel DP (refer to FIG. 6), however, it should not be limited thereto or thereby. According to an embodiment of the present disclosure, the input sensor ISP may be attached to the upper surface of the display panel DP by the adhesive member after being separately manufactured through the processes shown in FIGS. 15A to 18.

Figure 15C:
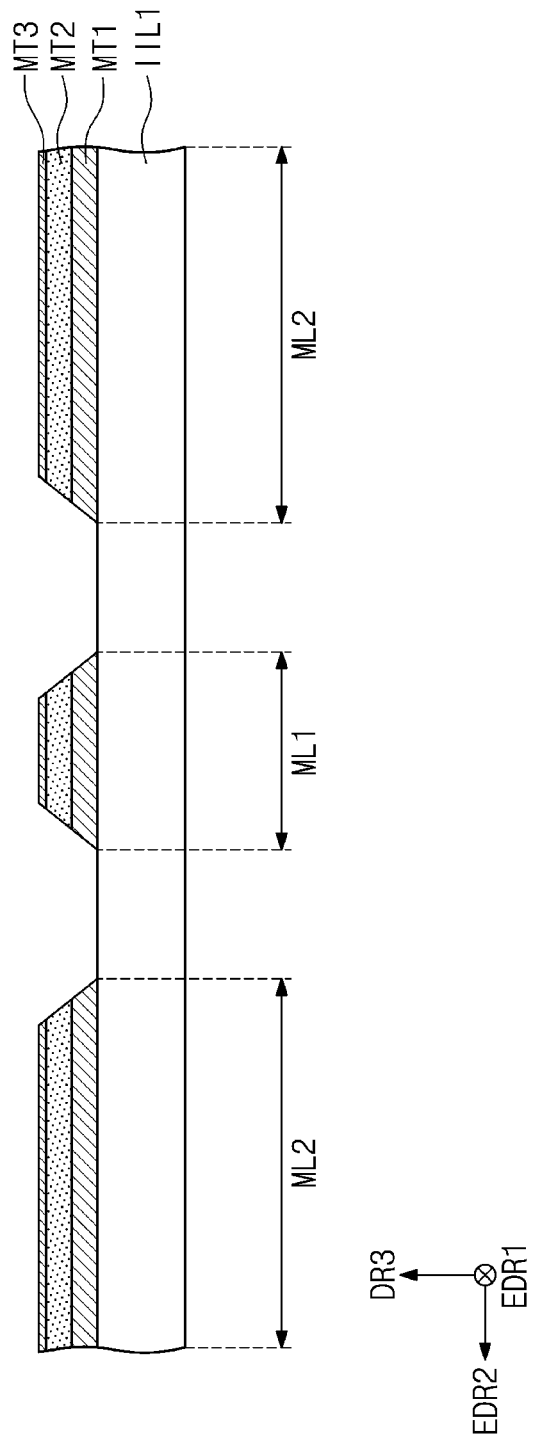

FIGS. 15A to 15C show cross-sectional views showing the forming of the first mesh line ML1 and the second mesh lines ML2 (S10). The process shown in FIG. 15A may correspond to the forming of the first conductive layer COL (S11).

Referring to FIG. 15A, the first conductive layer COL may be formed by sequentially depositing the first, second, and third metal layers MT1, MT2, and MT3 on a front surface of the base layer IIL1. In other words, first conductive layer COL may include the first, second, and third metal layers MT1, MT2, and MT3. Each of the first, second, and third metal layers MT1, MT2, and MT3 may be deposited by a process such as a sputtering process.

The first metal layer MT1 and the third metal layer MT3 may include the same metal material as each other. As an example, the first metal layer MT1 and the third metal layer MT3 may include the metal material having the corrosion resistance. The second metal layer MT2 may include the metal material different from the metal material included in the first metal layer MT1. As an example, the second metal layer MT2 may include the metal material having the low resistance.

The second metal layer MT2 may increase the conductivity of the input sensor ISP. The first metal layer MT1 may prevent the second metal layer MT2 from being corroded and/or damaged. The third metal layer MT3 may prevent the occurrence of hillock in the second metal layer MT2. Descriptions on the first, second, and third metal layers MT1, MT2, and MT3 are the same as those described above.

The process shown in FIG. 15B may correspond to the patterning of the first conductive layer COL (S12). Referring to FIG. 15B, a first mask PM1 may be provided on the first conductive layer COL to etch the first conductive layer COL. Etching areas PMO-1 where the first conductive layer COL is etched may be formed in the first mask PM1. The first mask PM1 may be provided with openings passing therethrough to correspond to the etching areas PMO-1. The first conductive layer COL may be etched through a photolithography process, a wet etching process, or a dry etching process.

FIG. 15C shows the cross-section of the first mesh line ML1 and the second mesh lines ML2 formed through the forming of the first mesh lines ML1 and the second mesh lines ML2 (S10). Referring to FIG. 15C, the first conductive layer COL may be etched in areas corresponding to the etching areas PMO-1 of the first mask PM1 shown in FIG. 15B, and the upper surface of the base layer IIL1 may be exposed in areas overlapping the areas in which the first conductive layer COL is etched. Accordingly, the first mesh lines ML1 and the second mesh lines ML2, which are disposed on the same layer and electrically insulated from each other, may be formed. The first mesh lines ML1 and the second mesh lines ML2 may respectively correspond to the mesh lines forming the first sensing electrodes SE1 and the second sensing electrodes SE2 of FIG. 9B.

Figure 16A:
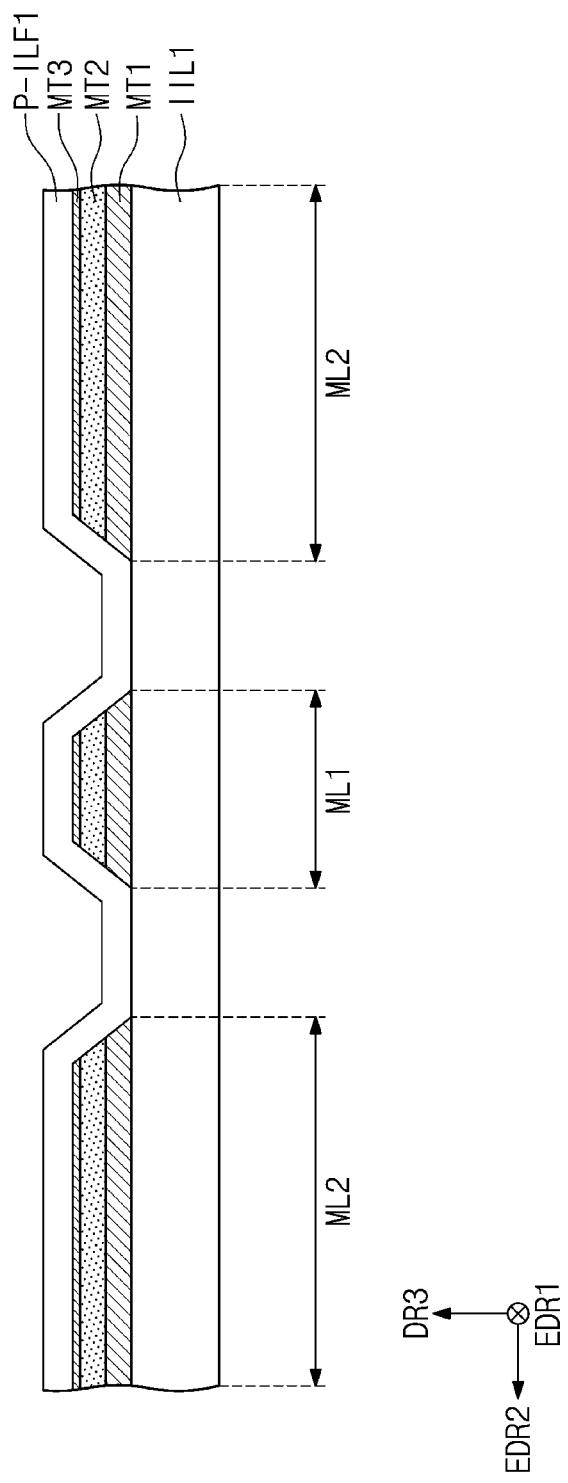
FIGS. 16A, 16B and 16C are cross-sectional views showing the manufacturing method of the electronic device according to an embodiment of the present disclosure.
Figure 16B:
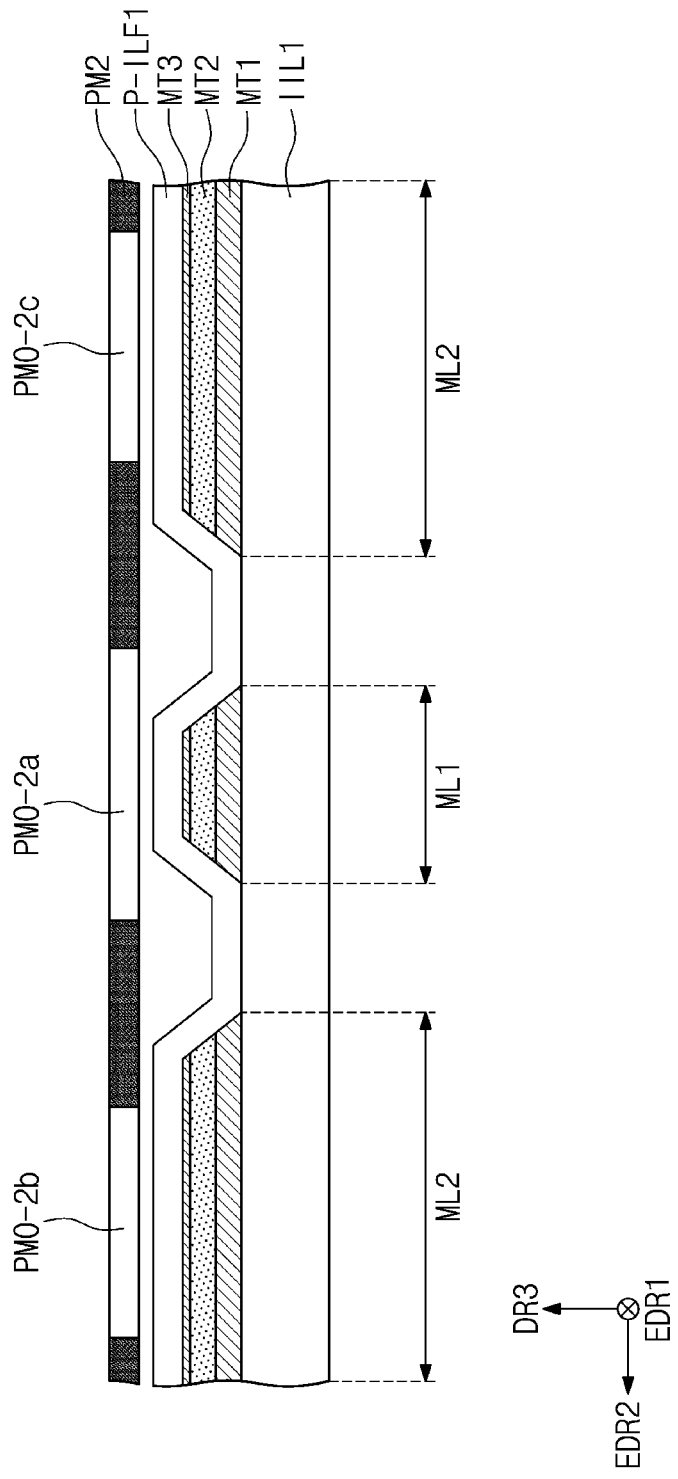
Figure 16C:
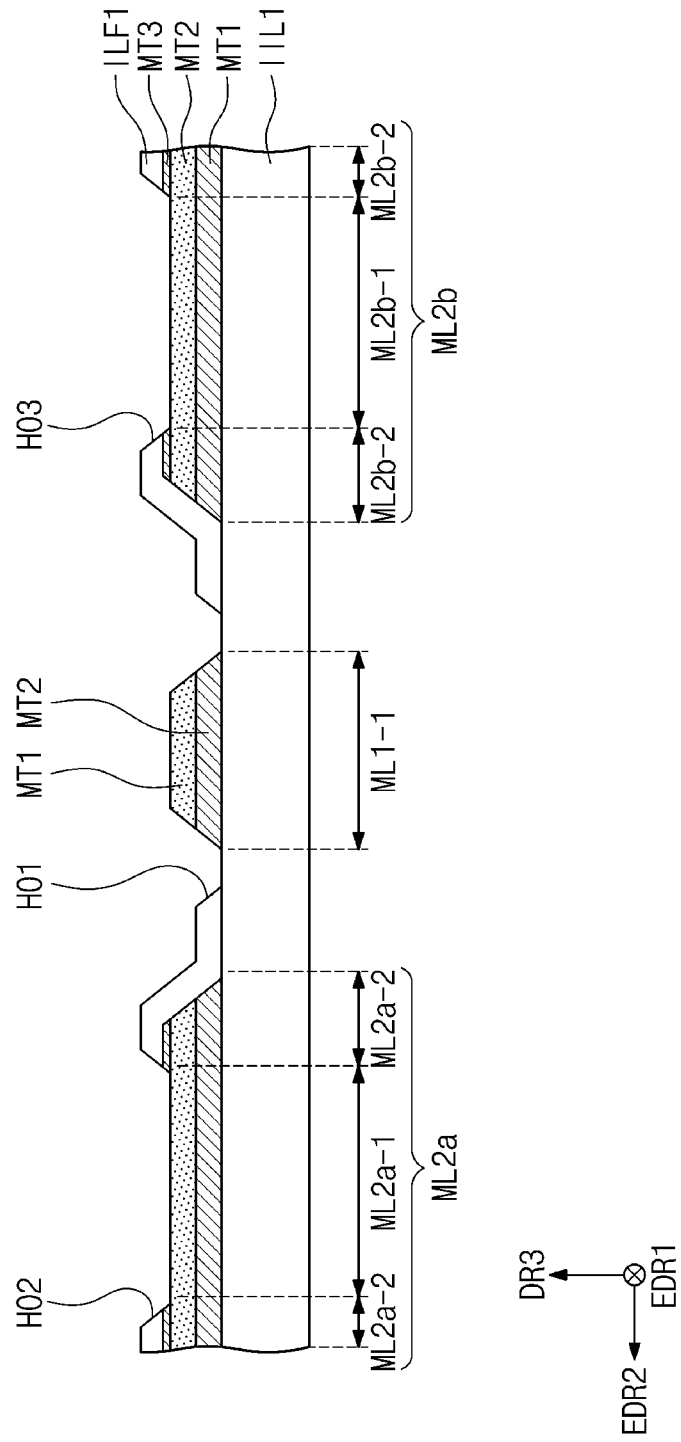

FIGS. 16A to 16C are cross-sectional views showing the forming of the first insulating layer ILF1 (S20). The process shown in FIG. 16A may correspond to the forming of the first inorganic layer P-ILF1 (S21). The process shown in FIG. 16B may correspond to the etching of the first inorganic layer P-ILF1 (S22). FIG. 16C may correspond to the cross-section of the first insulating layer ILF1 after the holes 1-101, 1102, and HO3 are formed.

Referring to FIG. 16A, the first inorganic layer P-ILF1 may be formed on the first mesh line ML1 and the second mesh lines ML2 through a deposition process. The first inorganic layer P-ILF1 may be formed to cover an entire area of the first mesh line ML1 and the second mesh lines ML2. The first inorganic layer P-ILF1 may be in contact with the third metal layer MT3 of the first mesh line ML1 and the second mesh lines ML2. The first inorganic layer P-ILF1 may also be in contact with the base layer IIL1 between the first mesh line ML1 and the second mesh lines ML2.

The first inorganic layer P-ILF1 may include at least one of the silicon nitride, the silicon oxynitride, and the silicon oxide, however, a material for the first inorganic layer P-ILF1 should not be limited thereto or thereby.

Referring to FIG. 16B, a second mask PM2 may be provided on the first inorganic layer P-ILF1 to etch the first inorganic layer P-ILF1. Etching areas PMO-2a, PMO-2b, and PMO-2c may be provided in the second mask PM2 to correspond to areas where the first inorganic layer P-ILF1 is etched. The second mask PM2 may be provided with openings passing therethrough to correspond to the etching areas PMO-2a, PMO-2b, and PMO-2c. The first inorganic layer P-ILF1 may be etched through a photolithography process or a dry etching process.

The etching areas PMO-2a, PMO-2b, and PMO-2c provided in the second mask PM2 may include a first etching area PMO-2a, a second etching area PMO-2b, and a third etching area PMO-2c. The first etching area PMO-2a may overlap the first mesh lines ML1 and may overlap a portion of the first mesh lines ML1 overlapping the bridge pattern BRP formed later. The second and third etching areas PMO-2b and PMO-2c may overlap the second mesh lines ML2. The second and third etching areas PMO-2b and PMO-2c may respectively overlap the lines spaced apart from each other and electrically insulated from each other among the second mesh lines ML2. The lines overlapped by the second and third etching areas PMO-2b and PMO-2c may correspond to the first line ML2a and the second line ML2b.

Referring to FIG. 16C, the first inorganic layer P-ILF1 may be etched in the first to third etching areas PMO-2a, PMO-2b, and PMO-2c of the second mask PM2. The etched first inorganic layer P-ILF1 may correspond to the first insulating layer ILF1. As a portion of the first inorganic layer P-ILF1 is removed corresponding to the first etching area PMO-2a of the second mask PM2, the first hole HO1 may be formed. The first hole HO1 may expose a portion (hereinafter, referred to as the first portion ML1-1) of the first mesh lines M L.

The third metal layer MT3 may be etched in the etching of the first inorganic layer P-ILF1. In other words, the third metal layer MT3 of the first portion ML1-1 overlapping the first hole HO1 may be etched when the first hole HO1 is formed. Accordingly, the first portion ML1-1 of the first mesh lines ML1 overlapping the first hole HO1 may have the two metal layer structure. The portion, e.g., the second portion ML1-2 of FIG. 11D, of the third metal layer MT3, which does not overlap the first hole HO1, may be covered by the first insulating layer ILF1 without being etched and thus may have the three metal layer structure.

As the portion of the first inorganic layer P-ILF1 is etched to correspond to the second etching area PMO-2b of the second mask PM2, the second hole HO2 may be formed. The portion of the second mesh lines ML2 (hereinafter, referred to as the third portion ML2a-1 of the first line ML2a) may be exposed through the second hole HO2.

With the forming of the second hole HO2, the third metal layer MT3 of the third portion ML2a-1 overlapping the second hole HO2 may be etched. Accordingly, the third portion ML2a-1 of the first line ML2a overlapping the second hole HO2 may have the two metal layer structure, and the fourth portion ML2a-2 of the first line ML2a that does not overlap the second hole HO2 may have the three metal layer structure. In other words, the third metal layer MT3 of the fourth portion ML2a-2 may be covered by the first insulating layer ILF1.

As the portion of the first inorganic layer P-ILF1 is etched to correspond to the third etching area PMO-2c of the second mask PM2, the third hole HO3 may be formed. The portion of the second mesh lines ML2 (hereinafter, referred to as the fifth portion ML2b-1 of the second line ML2b) may be exposed through the third hole HO3.

Similar to the forming of the second hole HO2, the third metal layer MT3 of the fifth portion ML2b-1 overlapping the third hole HO3 may be etched in the forming of the third hole HO3. Accordingly, the fifth portion ML2b-1 of the second line ML2b overlapping the third hole HO3 may have the two metal layer structure, and the sixth portion ML2b-2 of the second line ML2b that does not overlap the third hole HO3 may have the three metal layer structure.

The first insulating layer ILF1 may correspond to the first inorganic layer P-ILF1 through which the first, second, and third holes HO1, HO2, and HO3 are formed. The portions of the first mesh lines ML1 and the second mesh lines ML2 may be exposed through the first insulating layer ILF1. In the process of forming the first insulating layer ILF1, the portion of the third metal layer MT3 of the first and second mesh lines ML1 and ML2 may be etched in an area overlapping the bridge pattern BRP, and the disconnection of the bridge pattern BRP may be prevented.

Figure 17A:
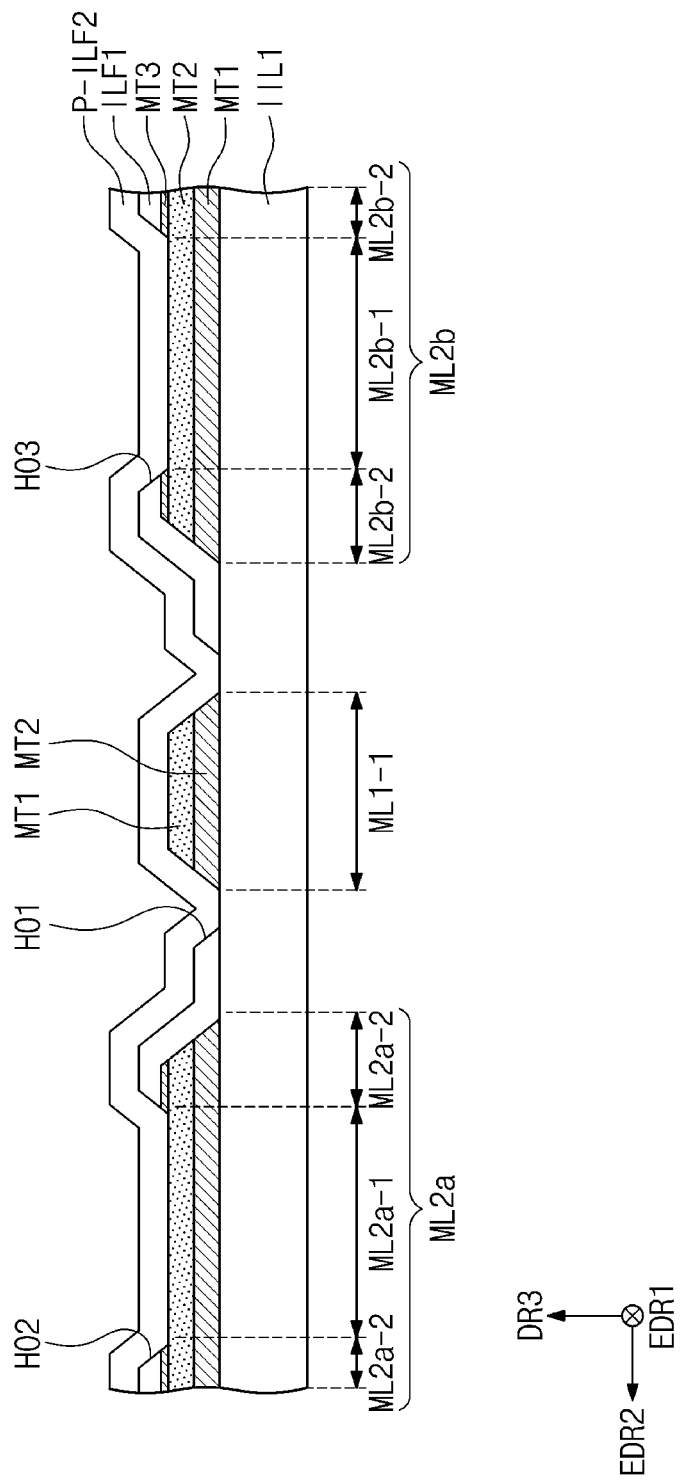
FIGS. 17A, 17B and 17C are cross-sectional views showing the manufacturing method of the electronic device according to an embodiment of the present disclosure.
Figure 17B:
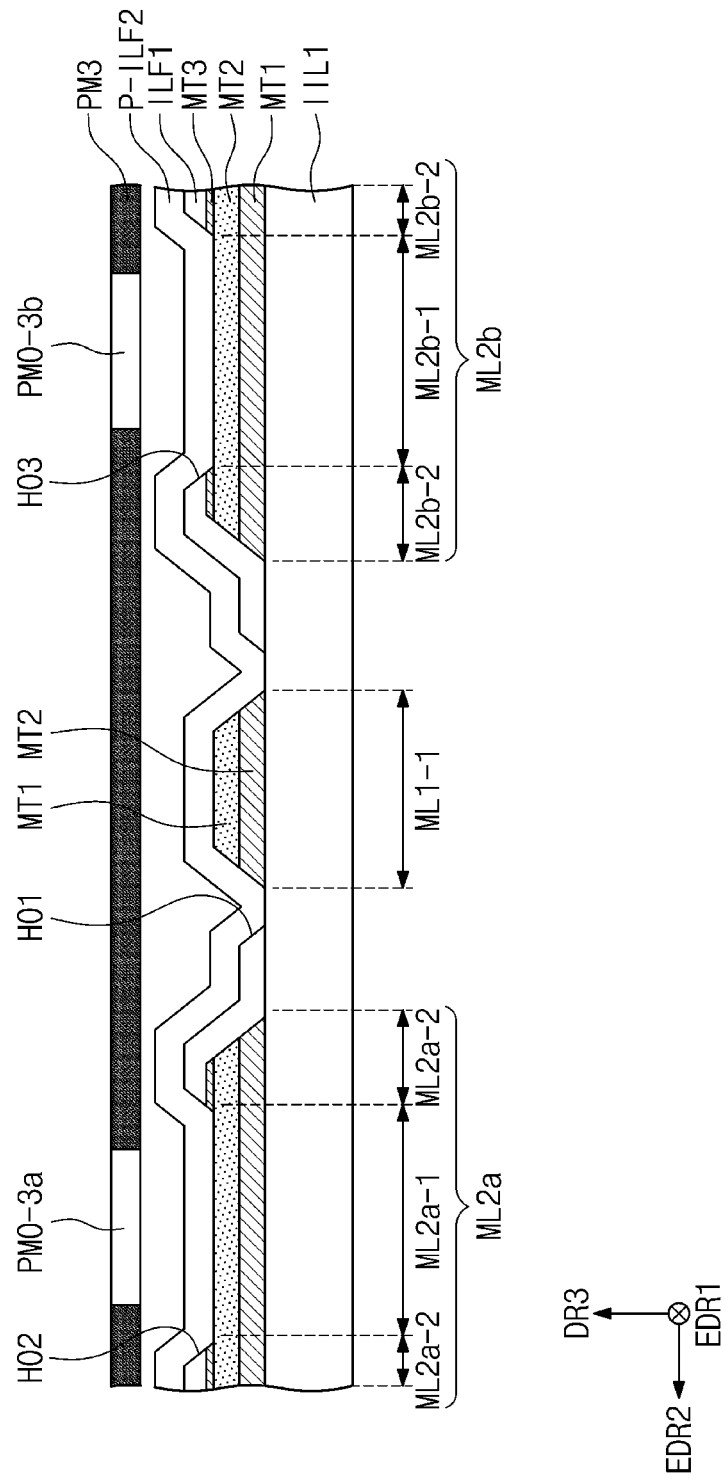
Figure 17C:
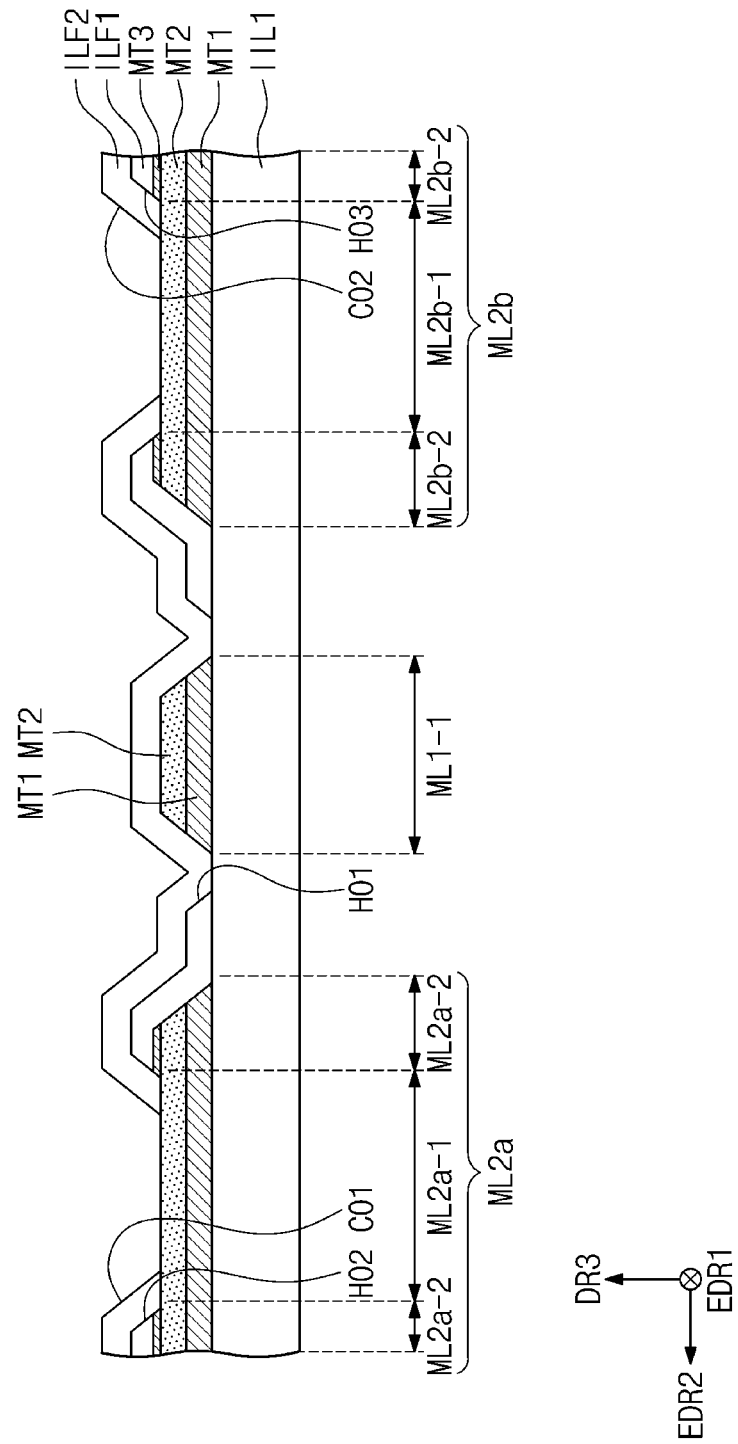

FIGS. 17A to 17C are cross-sectional views showing the forming of the second insulating layer ILF2 (S40). The process shown in FIG. 17A may correspond to the forming of the second inorganic layer P-ILF2 (S41). The process shown in FIG. 17B may correspond to the etching of the second inorganic layer P-ILF2 (S42). FIG. 17C shows a cross-section of the mesh lines ML1 and ML2 in which the first and second contact holes CO1 and CO2 are provided through the second insulating layer ILF2 and the portion of the third metal layer MT3 is removed.

Referring to FIG. 17A, the second inorganic layer P-ILF2 may be formed on the first insulating layer ILF1 through a deposition process. The second inorganic layer P-ILF2 may be formed to entirely cover the first insulating layer ILF1. The second inorganic layer P-ILF2 may be in contact with the portions of the first mesh line ML1 and the second mesh lines ML2, which are exposed through the first, second, and third holes HO1, HO2, and HO3 of the first insulating layer ILF1.

The second inorganic layer P-ILF2 may include at least one of silicon nitride, silicon oxynitride, and silicon oxide. The second inorganic layer P-ILF2 may include the same material as that of the first insulating layer ILF1, however, a material for the second inorganic layer P-ILF2 should not be limited thereto or thereby. The second inorganic layer P-ILF2 may be deposited under the same condition as that of the first inorganic layer P-ILF1, however, it should not be limited thereto or thereby. According to an embodiment of the present disclosure, the second inorganic layer P-ILF2 may include the same material as the first inorganic layer P-ILF1 but may be deposited under different deposition conditions.

Referring to FIG. 17B, a third mask PM3 may be provided on the second inorganic layer P-ILF2 to etch the second inorganic layer P-ILF2. The third mask PM3 may be provided with etching areas PMO-3a and PMO-3b. The second inorganic layer P-ILF2 may be etched in areas corresponding to the etching areas PMO-3a and PMO-3b. The third mask PM3 may be provided with openings passing therethrough to correspond to the etching areas PMO-3a and PMO-3b. The second inorganic layer P-ILF2 may be etched through a photolithography process or a dry etching process.

The etching areas PMO-3a and PMO-3b in the third mask PM3 may include a fourth etching area PMO-3a and a fifth etching area PMO-3b. The fourth etching area PMO-3a may correspond to the second hole HO2, and the fifth etching area PMO-3b may correspond to the third hole HO3. In other words, the fourth etching area PMO-3a may overlap the second hole HO2, and the fifth etching area PMO-3b may overlap the third hole HO3.

The first mesh line ML1 may not overlap the fourth and fifth etching areas PMO-3a and PMO-3b of the third mask PM3. In other words, the second inorganic layer P-ILF2 disposed on the first mesh line ML1 may not be etched and may cover the first mesh line ML1, and thus, the first mesh line ML1 may be insulated from the bridge pattern BRP formed later.

Referring to FIG. 17C, the second inorganic layer P-ILF2 may be etched to correspond to the fourth and fifth etching areas PMO-3a and PMO-3b of the third mask PM3. As the portion of the second inorganic layer P-ILF2 is etched to correspond to the fourth etching area PMO-3a of the third mask PM3, the first contact hole CO1 may be formed. The first contact hole CO1 may overlap the second hole HO2, and the third portion ML2a-1 of the first line ML2a may be exposed through the first contact hole CO1.

As the portion of the second inorganic layer P-ILF2 is etched to correspond to the fifth etching area PMO-3b of the third mask PM3, the second contact hole CO2 may be formed. The second contact hole CO2 may overlap the third hole HO3, and the fifth portion ML2b-1 of the second line ML2b may be exposed through the second contact hole CO2.

The second insulating layer ILF2 may correspond to the second inorganic layer P-ILF2 through which the first and second contact holes CO and CO2 are formed. The second insulating layer ILF2 may cover the first portion ML1-1 of the first mesh line ML1, which is exposed through the first hole HO1. The second metal layer MT2 of the first portion ML1-1 may be in contact with the second insulating layer ILF2.

Figure 18:
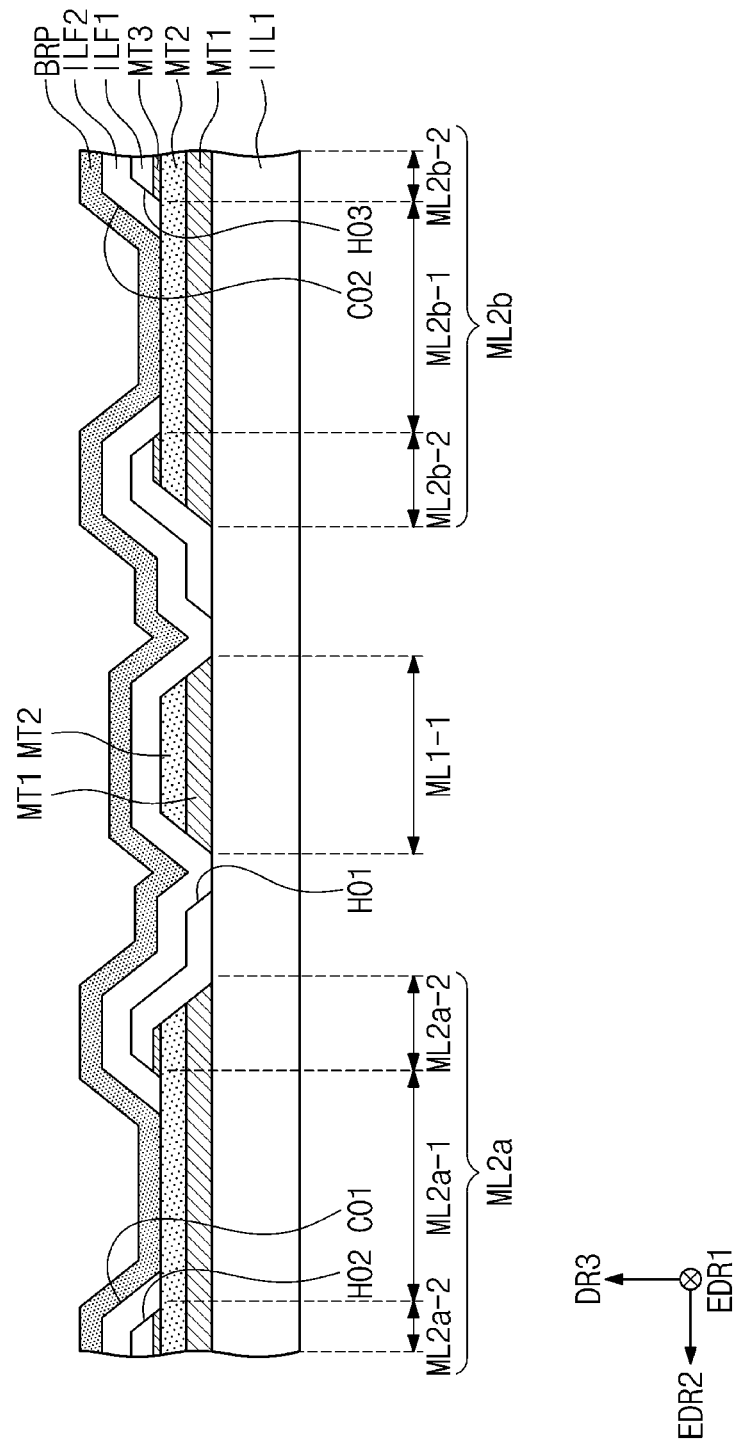
FIG. 18 is a cross-sectional view showing the manufacturing method of the electronic device according to an embodiment of the present disclosure.

FIG. 18 is a cross-sectional view showing the forming of the bridge pattern BRP (S50). The bridge pattern BRP may be formed on the second insulating layer ILF2. The bridge pattern BRP may include the conductive material. As an example, the bridge pattern BRP may include the transparent conductive material. Descriptions on the bridge pattern BRP are the same as those described above.

The bridge pattern BRP may cover the first and second contact holes CO1 and CO2 of the second insulating layer ILF2. The bridge pattern BRP may be formed by selectively depositing the conductive material on the second insulating layer ILF2 to cover the first and second contact holes CO1 and CO2, however, it should not be limited thereto or thereby. According to an embodiment of the present disclosure, the bridge pattern BRP may be formed by depositing the second conductive layer for the bridge pattern BRP over the second insulating layer ILF2 and patterning the second conductive layer using an etching process such as a photolithography process.

The bridge pattern BRP may be connected to the first line ML2a via the first contact hole CO1, may be connected to the second line ML2b via the second contact hole CO2, and may electrically connect the first line ML2a to the second line ML2b that is physically spaced apart from the first line ML2a. The bridge pattern BRP that electrically connects the insulated portions of the second mesh lines ML2 may form the second sensing electrode SE2.

The bridge pattern BRP may be electrically insulated from the first mesh line ML1. The bridge pattern BRP may be spaced apart from the first mesh line ML1 in the thickness direction with the second insulating layer ILF2 interposed therebetween, and the first mesh line ML1 may not be electrically connected to the second mesh lines ML2 via the bridge pattern BRP by the second insulating layer ILF2. For example, the first portion ML1-1 of the first mesh line ML1 overlapping the first hole HO1 in the thickness direction may be spaced apart from the bridge pattern BRP with the second insulating layer ILF2 interposed therebetween, and the second portion ML1-2 (refer to FIG. 11D) of the first mesh line ML1, which does not overlap the first hole HO1, may be spaced apart from the bridge pattern BRP with the first insulating layer ILF1 and the second insulating layer ILF2 interposed therebetween.

In the present embodiment, the bridge pattern BRP is shown as electrically connecting the second mesh lines ML2, however, it should not be limited thereto or thereby. According to an embodiment of the present disclosure, the bridge pattern BRP may electrically connect insulated portions of the first mesh line ML1 to each other. According to an embodiment of the present disclosure, the electronic device ED may include a plurality of bridge patterns BRP, some bridge patterns of the bridge patterns BRP may electrically connect the insulated portions of the first mesh line ML1 to each other, and the other bridge patterns may electrically connect the insulated portions of the second mesh lines ML2 to each other.

According to an embodiment of the present disclosure, the mesh lines of the input sensor may have the two metal layer structure in the area overlapping the bridge pattern and may have the three metal layer structure in the area that does not overlap the bridge pattern. Accordingly, the disconnection of the bridge pattern may be prevented, and the reliability of the input sensor may be increased.

According to an embodiment of the present disclosure, the manufacturing method of the electronic device may etch the portion of the outermost metal layer of the mesh lines in the process of forming the hole through the inorganic layer disposed on the mesh lines. In other words, the portion of the outermost metal layer of the mesh lines in the area where the bridge pattern is formed may be etched, and thus, the disconnection of the bridge pattern may be prevented. Accordingly, the electronic device including the input sensor with the increased reliability may be manufactured by the manufacturing method of the electronic device.

While embodiments of the present disclosure have been described, it is understood by one of ordinary skill in the art that various changes and modifications can be made thereto within the spirit and scope of the present disclosure as claimed.

Therefore, the disclosed subject matter should not be limited to any single embodiment described herein.

What is claimed is:

1. An electronic device, comprising:
a display panel; and
an input sensor disposed on the display panel, wherein the input sensor is configured to sense an external input, the input sensor comprising:
  a first sensing electrode comprising a plurality of first mesh lines; and
  a second sensing electrode comprising a plurality of second mesh lines insulated from the first mesh lines and a bridge pattern overlapping the first mesh lines, and
  wherein the first mesh lines comprise a plurality of metal layers, the first mesh lines comprise a first portion overlapping the bridge pattern and a second portion that does not overlap the bridge pattern,
  wherein the first portion comprises an outermost metal layer comprising a material different from a material of an outermost metal layer of the second portion, and
  wherein the outermost metal layers of the first and second portions are adjacent to a display surface of the electronic device.

2. The electronic device of claim 1, wherein the first mesh lines comprise first, second, and third metal layers, the outermost metal layer of the first portion corresponds to the second metal layer, and the outermost metal layer of the second portion corresponds to the third metal layer.

3. The electronic device of claim 2, wherein the first metal layer comprises a same material as a material of the third metal layer.

4. The electronic device of claim 2, wherein the second metal layer comprises a material different from a material of the first and third metal layers.

5. The electronic device of claim 2, wherein the second metal layer comprises gold, silver, copper, platinum, aluminum, or alloys thereof.

6. The electronic device of claim 2, wherein the third metal layer is thinner than the first metal layer and the second metal layer.

7. The electronic device of claim 1, wherein the first mesh lines are disposed on a same layer as the second mesh lines.

8. The electronic device of claim 1, wherein the input sensor further comprises a first insulating layer and a second insulating layer, which are disposed between the first mesh lines and the bridge pattern, the first insulating layer includes a first hole overlapping the first portion, and the second insulating layer covers the first hole.

9. The electronic device of claim 8, wherein the second mesh lines comprise a first line and a second line, which overlap the bridge pattern, and the first line and the second line are spaced apart from each other with the first portion interposed therebetween.

10. The electronic device of claim 9, wherein the first insulating layer further comprises a second hole overlapping the first line and a third hole overlapping the second line, and the second insulating layer further comprises a first contact hole overlapping the second hole and a second contact hole overlapping the third hole.

11. The electronic device of claim 9, wherein the second insulating layer further comprises a first contact hole and a second contact hole, and
  wherein the first hole overlaps each of the first line and second line, and the first contact hole overlaps each of the first hole and the first line, and the second contact hole overlaps each of the first hole and the second line.

12. The electronic device of claim 10, wherein the second hole has a size equal to a size of the third hole.

13. The electronic device of claim 10, wherein the second hole has a size different from a size of the third hole.

14. The electronic device of claim 10, wherein the first contact hole is provided in plural, and the first contact holes overlap the second hole.

15. The electronic device of claim 10, wherein each of the first contact hole and the second hole is provided in plural, and the first contact holes correspond to the second holes, respectively.

16. An electronic device, comprising:
a display panel; and
an input sensor disposed on the display panel, wherein the input sensor is configured to sense an external input, the input sensor comprising:
 a first sensing electrode comprising a plurality of first mesh lines;
 a second sensing electrode comprising a plurality of second mesh lines insulated from the first mesh lines and a bridge pattern overlapping the first mesh lines;
 a first insulating layer disposed between the first sensing electrode and the bridge pattern and including a first hole; and
 a second insulating layer disposed between the first sensing electrode and the bridge pattern and including a first contact hole, and
wherein the bridge pattern is connected to the second mesh lines via the first contact hole, and
wherein the first hole overlaps the bridge pattern or the first mesh lines.

17. The electronic device of claim 15, wherein the first hole extends in a first direction and has a width greater than a width of the bridge pattern in the first direction.

18. The electronic device of claim 15, wherein the first mesh lines comprise first, second, and third metal layers, and the third metal layer does not overlap the first hole.

19. A method of manufacturing an electronic device, comprising:
 forming a first conductive layer comprising first, second, and third metal layers on a display panel;
 patterning the first conductive layer to form first and second mesh lines;
 forming a first inorganic layer on the first and second mesh lines;
 forming a first hole through the first inorganic layer to expose a first portion of the first mesh lines and a second hole through the first inorganic layer to expose a second portion of the second mesh lines;
 removing the third metal layer of the first portion and the third metal layer of the second portion;
 forming a second inorganic layer on the first inorganic layer;
 forming a first contact hole through the second inorganic layer to expose the second portion; and
 forming a bridge pattern on the second inorganic layer to cover the first contact hole.

20. The method of claim 19, wherein the third metal layer of the first portion and the third metal layer of the second portion are simultaneously removed in the forming of the first and second holes.

21. An input sensor, comprising:
a base layer;
first sensing electrodes disposed on the base layer; and
second sensing electrodes comprising a bridge pattern crossing the first sensing electrodes and electrically insulated from the first sensing electrodes, and
wherein at least one of the first sensing electrodes includes a first portion overlapped by the bridge pattern and including first and second metal layers, and a second portion not overlapped by the bridge pattern and including the first and second metal layers and a third metal layer.

22. The input sensor of claim 21, further comprising an insulating layer disposed between the first portion and the bridge pattern.

23. The input sensor of claim 21, wherein the second sensing electrodes include a third portion connected to the bridge pattern and including the first and second metal layers, wherein the second metal layer of the second sensing electrodes contacts the bridge pattern.

24. The input sensor of claim 23, wherein the second sensing electrodes include a fourth portion extending from the third portion and including the third metal layer and the third metal layer of the second sensing electrodes is overlapped by an insulating layer.

25. The input sensor of claim 21, wherein the second metal layer and the third metal layer include different materials from each other.

* * * * *